(12) United States Patent
Dubin et al.

(10) Patent No.: US 11,222,371 B2
(45) Date of Patent: Jan. 11, 2022

(54) MANAGING TRANSACTIONS OF BROKER AFFILIATES

(71) Applicant: Stubhub, Inc., San Francisco, CA (US)

(72) Inventors: Jacob M. Dubin, San Francisco, CA (US); Jerry L. Thompson, San Francisco, CA (US)

(73) Assignee: Stubhub, Inc., San Francisco, CA (US)

( * ) Notice: Subject to any disclaimer, the term of this patent is extended or adjusted under 35 U.S.C. 154(b) by 0 days.

(21) Appl. No.: 14/062,322

(22) Filed: Oct. 24, 2013

(65) Prior Publication Data

US 2014/0324628 A1   Oct. 30, 2014

Related U.S. Application Data

(63) Continuation of application No. 13/489,310, filed on Jun. 5, 2012, now Pat. No. 8,577,743, which is a
(Continued)

(51) Int. Cl.
*G06Q 30/06*   (2012.01)
*G06Q 10/02*   (2012.01)

(52) U.S. Cl.
CPC ......... *G06Q 30/0607* (2013.01); *G06Q 10/02* (2013.01); *G06Q 30/06* (2013.01);
(Continued)

(58) Field of Classification Search
CPC ......... G06Q 30/00–08; G06Q 30/0607; G06Q 30/0623; G06Q 30/0601; G06Q 30/0613; G06Q 30/0627; G06Q 30/0643; G06Q 30/0641; G06Q 30/06; G06Q 30/0625; G06Q 10/02
See application file for complete search history.

(56) References Cited

U.S. PATENT DOCUMENTS 6,219,653 B1   4/2001   O'neill et al.
7,216,109 B1   5/2007   Donner
(Continued)

OTHER PUBLICATIONS

Tickets: In Line or Online? Carol Flake Chapman . New York Times , Late Edition (East Coast); New York, N.Y. [New York, N.Y]Feb. 24, 2000: G.1. (Year: 2000).*
(Continued)

*Primary Examiner* — Michael Misiaszek
(74) *Attorney, Agent, or Firm* — McDermott Will & Emery LLP

(57) ABSTRACT

A distributed network transaction system and method includes a central exchange computer connected via the Internet (world wide web) to multiple remote computers associated with, for example, individual brokers. A central database is provided with the exchange computer and each remote computer can have a respective database for information that the individual brokers was to maintain separate from the system. E-commerce transactions are conducted by the system, which performs a number of transaction-related functions, such as pushing tickets up to the system for sale, purchasing tickets online, shipping, web site-related and bookkeeping. The system and methodology accommodate price event functions where non real-time tickets can be sold and the orders filled with tickets acquired on the system.

19 Claims, 75 Drawing Sheets

| RULE | EFFECTS | WHERE | TYPE |
|---|---|---|---|
| SHOW MY TICKET GROUP(S) EVERYWHERE | MY TICKETS | EVERYWHERE | SHOW MODE |
| SHOW MY TICKET GROUP(S) ON MY WEBSITE | MY TICKETS | MY WEBSITE | SHOW MODE |
| DON'T SHOW MY TICKET GROUP(S) ON MY WEBSITE | MY TICKETS | MY WEBSITE | SHOW MODE |
| SHOW MY TICKET GROUP(S) ON THIS BROKER'S WEBSITE | MY TICKETS | OTHERS WEBSITE | SHOW MODE |
| DON'T SHOW MY TICKET GROUP(S) ON THIS BROKER'S WEBSITE | MY TICKETS | OTHERS WEBSITE | SHOW MODE |
| SHOW MY TICKET GROUP(S) ON MY EXCHANGE | MY TICKETS | MY EXCHANGE | SHOW MODE |
| DON'T SHOW MY TICKET GROUP(S) ON MY EXCHANGE | MY TICKETS | MY EXCHANGE | SHOW MODE |
| SHOW MY TICKET GROUP(S) ON THIS BROKER'S EXCHANGE | MY TICKETS | OTHERS EXCHANGE | SHOW MODE |
| DON'T SHOW MY TICKET GROUP(S) ON THIS BROKER'S EXCHANGE | MY TICKETS | OTHERS EXCHANGE | SHOW MODE |
| SHOW THIS BROKER'S TICKET GROUP(S) ON MY WEBSITE | OTHERS TICKETS | MY WEBSITE | SHOW MODE |
| DON'T SHOW THIS BROKER'S TICKET GROUP(S) ON MY WEBSITE | OTHERS TICKETS | MY WEBSITE | SHOW MODE |
| SHOW THIS BROKER'S TICKET GROUP(S) ON MY EXCHANGE | OTHERS TICKETS | MY EXCHANGE | SHOW MODE |
| DON'T SHOW THIS BROKER'S TICKET GROUP(S) ON MY EXCHANGE | OTHERS TICKETS | MY EXCHANGE | SHOW MODE |
| MARKUP MY TICKET GROUP(S) ON MY WEBSITE | MY TICKETS | MY WEBSITE | MARKUP |
| MARKUP THIS BROKER'S TICKET GROUP(S) ON MY WEBSITE | OTHERS TICKETS | MY WEBSITE | MARKUP |
| ONLY SHOW MY TICKET GROUP(S) ON MY WEBSITE | MY TICKETS/OTHERS TICKETS | MY WEBSITE | SHOW MODE |
| ONLY SHOW MY TICKET GROUP(S) ON MY EXCHANGE | MY TICKETS/OTHERS TICKETS | MY EXCHANGE | SHOW MODE |
| DON'T SHOW ANY TICKET GROUP(S) ON MY WEBSITE | MY TICKETS/OTHERS TICKETS | MY WEBSITE | SHOW MODE |
| DON'T SHOW ANY TICKET GROUP(S) ON MY EXCHANGE | MY TICKETS/OTHERS TICKETS | MY EXCHANGE | SHOW MODE |
| ONLY SHOW MY TICKET GROUP(S) ON MY WEBSITE (QTY LIMITED) | MY TICKETS/OTHERS TICKETS | MY WEBSITE | SHOW MODE |

Related U.S. Application Data continuation of application No. 12/876,216, filed on Sep. 6, 2010, now Pat. No. 8,204,796, and a continuation of application No. 10/606,086, filed on Jun. 25, 2003, now Pat. No. 7,792,700.

(52) U.S. Cl.
CPC ..... *G06Q 30/0601* (2013.01); *G06Q 30/0613* (2013.01); *G06Q 30/0623* (2013.01); *G06Q 30/0625* (2013.01); *G06Q 30/0627* (2013.01); *G06Q 30/0641* (2013.01); *G06Q 30/0643* (2013.01)

(56) References Cited

U.S. PATENT DOCUMENTS

| | | |
|---|---|---|
| 7,792,700 B2 | 9/2010 | Dubin et al. |
| 8,204,796 B2 | 6/2012 | Dubin et al. |
| 8,577,743 B2 | 11/2013 | Dubin et al. |
| 2002/0082956 A1 | 6/2002 | Peterson et al. |
| 2002/0120506 A1 | 8/2002 | Hagen |
| 2002/0128922 A1 | 9/2002 | Joao |
| 2002/0138399 A1 | 9/2002 | Hayes et al. |
| 2002/0174028 A1 | 11/2002 | Anderson et al. |
| 2003/0083895 A1 | 5/2003 | Wright |
| 2003/0236736 A1* | 12/2003 | Harmon ............... G06Q 10/02 705/37 |
| 2004/0111303 A1 | 6/2004 | Francis |
| 2005/0246245 A1 | 11/2005 | Satchell et al. |
| 2011/0218878 A1 | 9/2011 | Dubin et al. |
| 2012/0259733 A1 | 10/2012 | Dublin et al. |

OTHER PUBLICATIONS

"U.S. Appl. No. 10/606,086, Final Office Action dated Jun. 13, 2008", 14 pgs.
"U.S. Appl. No. 10/606,086, Final Office Action dated Oct. 15, 2009", 14 pgs.
"U.S. Appl. No. 10/606,086, Non Final Office Action dated Mar. 5, 2009", 19 pgs.
"U.S. Appl. No. 10/606,086, Non Final Office Action dated Mar. 21, 2007", 16 pgs.
"U.S. Appl. No. 10/606,086, Non Final Office Action dated Nov. 28, 2007", 22 pgs.
"U.S. Appl. No. 10/606,086, Notice of Allowance dated May 13, 2010", 11 pgs.
"U.S. Appl. No. 10/606,086, Notice of Allowance dated Jul. 23, 2010", 2 pgs.
"U.S. Appl. No. 10/606,086, Response filed Feb. 28, 2008 to Non Final Office Action dated Nov. 28, 2007", 7 pgs.
"U.S. Appl. No. 10/606,086, Response filed Mar. 15, 2010 to Final Office Action dated Oct. 15, 2009", 16 pgs.
"U.S. Appl. No. 10/606,086, Response filed Jul. 6, 2009 to Non Final Office Action dated Mar. 5, 2009", 14 pgs.
"U.S. Appl. No. 10/606,086, Response filed Aug. 21, 2007 to Non Final Office Action dated Mar. 21, 2007", 12 pgs.
"U.S. Appl. No. 10/606,086, Response filed Dec. 11, 2008 to Final Office Action dated Jun. 13, 2008", 15 pgs.
"U.S. Appl. No. 12/876,216, Non Final Office Action dated Sep. 27, 2011", 5 pgs.
"U.S. Appl. No. 12/876,216, Notice of Allowance dated Feb. 22, 2012", 6 pgs.
"U.S. Appl. No. 12/876,216, Response filed Dec. 23, 2011 to Non Final Office Action dated Sep. 27, 2011", 10 pgs.
"U.S. Appl. No. 13/489,310, Non Final Office Action dated Dec. 19, 2012", 5 pgs.
"U.S. Appl. No. 13/489,310, Notice of Allowance dated Jun. 27, 2013", 7 pgs.
"U.S. Appl. No. 13/489,310, Response filed Mar. 15, 2013 to Non Final Office Action dated Dec. 29, 2012", 10 pgs.
"Reexam Control No. 90/012,516, Complete File History", (Jun. 26, 2013), 200 pgs.
"Reexam Control No. 90/012,948, File History until Oct. 9, 2013", 543 pages.
Jones, Walter C, "Spring's the season for scalpers Bill would legalize ticket brokering", Florida Times Union, Jacksonville, (Apr. 2, 2000), 6 pgs.
McLennan, Scott, "The scramble for the best seat in the house", Telegram & Gazette. Worchester, Mass, Retrieved via ProQuest., (Apr. 27, 2003), 5 pgs.
U.S. Appl. No. 10/606,086, U.S. Pat. No. 7,792,700, filed Jun. 25, 2003, Methods and Computer-Readable Storage Devices for Managing Transactions With Multiple Broker Affiliates.
U.S. Appl. No. 12/876,216, U.S. Pat. No. 8,204,796, filed Sep. 6, 2010, Managing Transactions of Broker Affiliates.
U.S. Appl. No. 13/489,310, U.S. Pat. No. 8,577,743, filed Jun. 5, 2012, Managing Transactions of Broker Affiliates.
U.S. Appl. No. 90/012,516, U.S. Pat. No. 8,204,796, filed Sep. 12, 2012, (StubHub '796) Managing Transactions of Broker Affiliates.
U.S. Appl. No. 90/012,948, U.S. Pat. No. 8,204,796, filed Sep. 19, 2013, Managing Transactions of Broker Affiliates.
U.S. Appl. No. 90/013,557, filed Aug. 4, 2015, Managing Transactions of Broker Affillates.

* cited by examiner

| RULE | EFFECTS | WHERE | TYPE |
|---|---|---|---|
| SHOW MY TICKET GROUP(S) EVERYWHERE | MY TICKETS | EVERYWHERE | SHOW MODE |
| SHOW MY TICKET GROUP(S) ON MY WEBSITE | MY TICKETS | MY WEBSITE | SHOW MODE |
| DON'T SHOW MY TICKET GROUP(S) ON MY WEBSITE | MY TICKETS | MY WEBSITE | SHOW MODE |
| SHOW MY TICKET GROUP(S) ON THIS BROKER'S WEBSITE | MY TICKETS | OTHERS WEBSITE | SHOW MODE |
| DON'T SHOW MY TICKET GROUP(S) ON THIS BROKER'S WEBSITE | MY TICKETS | OTHERS WEBSITE | SHOW MODE |
| SHOW MY TICKET GROUP(S) ON MY EXCHANGE | MY TICKETS | MY EXCHANGE | SHOW MODE |
| DON'T SHOW MY TICKET GROUP(S) ON MY EXCHANGE | MY TICKETS | MY EXCHANGE | SHOW MODE |
| SHOW MY TICKET GROUP(S) ON THIS BROKER'S EXCHANGE | MY TICKETS | OTHERS EXCHANGE | SHOW MODE |
| DON'T SHOW MY TICKET GROUP(S) ON THIS BROKER'S EXCHANGE | MY TICKETS | OTHERS EXCHANGE | SHOW MODE |
| SHOW THIS BROKER'S TICKET GROUP(S) ON MY WEBSITE | OTHERS TICKETS | MY WEBSITE | SHOW MODE |
| DON'T SHOW THIS BROKER'S TICKET GROUP(S) ON MY WEBSITE | OTHERS TICKETS | MY WEBSITE | SHOW MODE |
| SHOW THIS BROKER'S TICKET GROUP(S) ON MY EXCHANGE | OTHERS TICKETS | MY EXCHANGE | SHOW MODE |
| DON'T SHOW THIS BROKER'S TICKET GROUP(S) ON MY EXCHANGE | OTHERS TICKETS | MY EXCHANGE | SHOW MODE |
| MARKUP MY TICKET GROUP(S) ON MY WEBSITE | MY TICKETS | MY WEBSITE | MARKUP |
| MARKUP THIS BROKER'S TICKET GROUP(S) ON MY WEBSITE | OTHERS TICKETS | MY WEBSITE | MARKUP |
| ONLY SHOW MY TICKET GROUP(S) ON MY WEBSITE | MY TICKETS/OTHERS TICKETS | MY WEBSITE | SHOW MODE |
| ONLY SHOW MY TICKET GROUP(S) ON MY EXCHANGE | MY TICKETS/OTHERS TICKETS | MY EXCHANGE | SHOW MODE |
| DON'T SHOW ANY TICKET GROUP(S) ON MY WEBSITE | MY TICKETS/OTHERS TICKETS | MY WEBSITE | SHOW MODE |
| DON'T SHOW ANY TICKET GROUP(S) ON MY EXCHANGE | MY TICKETS/OTHERS TICKETS | MY EXCHANGE | SHOW MODE |
| ONLY SHOW MY TICKET GROUP(S) ON MY WEBSITE (QTY LIMITED) | MY TICKETS/OTHERS TICKETS | MY WEBSITE | SHOW MODE |

FIG. 3

You can create non real-time tickets that will show up in the system. If the tickets are not real, you must mark them fake so they will not show up on other broker's websites. This is the default.

SEARCH SOS EVENTS

EVENT NAME [        ]
VENUE NAME [        ]
EVENT DATE [    ]

[SEARCH]

TICKET INFORMATION

| | |
|---|---|
| SECTION [    ] | ☑ SHOW ON THE WEB |
| ROW [    ] | ☐ SHOW ON EXCHANGE |
| FIRST SEATS (01-10) [    ] | |
| QUANTITY [1 ▽] | |
| LIST PRICE [    ] | ☑ FAKE TICKETS |
| FACE [    ] | ☑ ALLOW SPLITTING OF TICKET GROUP |

[ADD TICKETS]

*FIG. 6*

These rules denote how many tickets you will sell from a package of tickets. For example, if you have 4 tickets, you would by default sell 4 or 2 tickets, but not 3 or 1, which would leave you with a single. You can change this behavior here.

| Save | | Defaults |
|---|---|---|
| QTY | POSSIBLE SPLITS | |
| 2 | 2 | |
| 3 | 3,1 | |
| 4 | 4,2 | |
| 5 | 5,3,2,1 | |
| 6 | 6,4,2 | |
| 7 | 7,5,4,3,2,1 | |
| 8 | 8,6,4,2 | |
| 9 | 9,7,6,5,4,3,2,1 | |
| 10 | 10,8,6,4,2 | |
| 11 | 11,9,8,7,6,5,4,3,2,1 | |
| 12 | 12,10,8,6,4,2 | |
| 13 | 13,11,10,9,8,7,6,5,4,3,2,1 | |
| 14 | 14,12,10,8,6,4,2 | |
| 15 | 15,13,12,11,10,9,8,7,6,5,4,3,2,1 | |
| 16 | 16,14,12,10,8,6,4,2 | |
| 17 | 17,15,14,13,12,11,10,9,8,7,6,5,4,3,2,1 | |
| 18 | 18,16,14,12,10,8,6,4,2 | |
| 19 | 19,17,16,15,14,13,12,11,10,9,8,7,6,5,4,3,2,1 | |
| 20 | 20,18,16,14,12,10,8,6,4,2 | |

FIG. 7

BROKER SETTINGS

CREDIT CARD

This is the credit card that will be used to buy tickets from other brokers on credit card items:

CARD NUMBER:
NAME ON THE CARD:
CARD EXPIRATION:
CARD TYPE:

CREDIT CARD PROCESSOR

Be sure to leave this blank if you are not currently using a service.

PROCESSOR: ● Verisign  ○ Authorize Net  ○ None
PARTNER: Verisign
USERNAME:
PASSWORD:

DOMAINS:

| ID | DOMAIN | FULL CHARGE | AUTH 1S | NONE | CSC |
|---|---|---|---|---|---|
| 1 | ticketsolutions.com | ○ | ● | ○ | ☐ |
| 3 | priceeventweb.com | ○ | ○ | ● | ☐ |
| 45 | tickets4u.com | ○ | ○ | ● | ☐ |

WEBSITE

Rules for making up the price on your tickets and other broker tickets

DEFAULT MARKUP: 40%
DEFAULT MARKUP (MY TIX): 0%
MINIMUM MARKUP: 35
HANDLING FEE: 0%
WEBSALE CUTOFF: 48 Hours Update

*FIG. 8*

- SITE SELECTION
- UPLOAD
- URL BUILDER
- DEFAULT PAGE
- CHANGE HEADER
- CHANGE FOOTER
- ABOUT PAGE
- PRIVACY POLICY
- TERMS OF USE
- COLORS & FONTS
- CONFIRM E-MAIL
- CONTACT E-MAIL
- E-MAIL'S HEADER
- REFRESH WEBSITE
- EVENT CALENDAR
- HOTEVENTS EDITOR

WHICH WEBSITE DO YOU WANT TO EDIT?

TICKETSOLUTIONS.COM

SELECT DOMAIN

*FIG. 9*

TRANSACTION STEPS
_____

1) WEBSERVICE SENDS REQUEST
2) SERVER PARSES AND BUILDS REQUEST DOCUMENTS
3) SERVER SENDS REQUEST TO APP #1
4) APP #1 SENDS BACK TICKETS
5) SERVER SENDS SELL DOCUMENT TO APP #2
6) APP #2 ISSUES BACK CONFIRM
7) SERVER SENDS CONFIRM TO WEBSERVICE
8) WEBSERVICE ISSUES A CLOSE CON
9) SERVER SENDS ACKNOWLEDGMENT TO APP #2
10) APP #2 ISSUES CLOSE CON
11) SERVER SENDS ACKNOWLEDGMENT TO APP #1
12) APP #1 ACKNOWLEDGES CON CLOSED
13) SERVER SENDS ACKNOWLEDGMENT TO WEBSERVICE

Enterprise:

| File  Purchase  Sales  Manage  Reports  Windows |

Inventory Screen
- ☐ Default Group Pricing
- ☑ Sort by List Price
- ☑ Show Reserved In-Line Venue Map Path: http://
Report Path: C:\Program Files\Ticket Solutions\Enterprise\repre
TicketsNow Path: C:\Documents and Settings\Administrator\Desktop
Fax Auth. Comments: fax authorization comment

Broker Information
- Name
- Address
- City
- State   Zip Code
- Phone # (913)384-4751
- Fax # (913)451-7832
- ☑ Show this info on invoices

Invoice Disclaimer
- Line 1:
- Line 2:
- Line 3:
- Line 4:
- Sig:

Automatically Print Invoices received from Web Orders

Customer Requirements
- ☑ Upper Case    ☑ Last Name
- ☐ Fax           ☑ City
- ☐ E-Mail        ☑ Referral

Miscellaneous
- Print Web Invoices ☑   Auto Complete Sales ☐
- Tax Exempt Default ☑   BL Card pop up ☑
- Edit Handling Fee ☑    Grouped Invoice ☐
- Handling Default 10%   Cust Fax on Invoices ☑
-                        Cust P2 on Invoices ☑
- Location Default       Cust Cell on Invoices ☑
- Handling Text
- Notify me about new Enterprise versions ☑

Left: 0.25
Right: 0
Top: 0
Bottom: 0

Save

2. SEARCH POs

*File Purchases Sales Manage Reports Windows*

| HEADLINER: | DISNEY ON ICE (THEATRE) ▼ | | ENTER SEARCH CRITERIA TO LOCATE PURCHASE ORDER |
|---|---|---|---|
| EVENT: | | ▼ | EVENT: 4/6/2001 - TOY STORY @ KEMPER ARENA (OPEN FLOOR) |
| CATEGORY: | ▼ CONSIGNMENT: ☐ | All ▼ | PERIOD: 0 UN SOLD INVOICE: 0 QUOTED: 0 ALL INVOICE: 16 |
| VENUE: | | ▼ | |
| DATE: | | | PE TIX PO PUR    PE TIX PO PUR    PE TIX PO PUR |
| SECTION: | SALES: | | A ☐☐☐☐  B ☐☐☐☐  D ☐☐☐☐  G ☐☐☐☐ |
| PO #: | | | B ☐☐☐☐  E ☐☐☐☐  H ☐☐☐☐ |
| | SEARCH | CLEAR | C ☐☐☐☐  B ☐☐☐☐  F ☐☐☐☐  ? ☐☐☐☐ |

PO RESULTS

| PO ID | STATU | PO DATE | CUSTOMER | COMPANY | TOTAL | QTY | CAT | EVENT DATE | EVENT | VENUE | SECTION | ROW | SEATS |
|---|---|---|---|---|---|---|---|---|---|---|---|---|
| 3062 | COMP | 3/2/2001 | TICKET | TICKET MASTER | $166.00 | 5 | C | 4/7/2001 | TOY STORY | KEMPER ARENA (OPEN) | 115 | K | 08 |
| 3059 | COMP | 3/2/2001 | TICKET | TICKET MASTER | $186.00 | 8 | B | 4/7/2001 | TOY STORY (MATINEE 1) | KEMPER ARENA (OPEN) | 116 | J | 01 |
| 3061 | COMP | 3/2/2001 | TICKET | TICKET MASTER | $166.00 | | | | TOY STORY (MATINEE 2) | KEMPER ARENA (OPEN) | 116 | J | 01 |
| 4149 | COMP | 4/5/2001 | TICKET | TICKET MASTER | $214.50 | | | | | KEMPER ARENA (OPEN) | 114 | P | 14 |
| 4149 | COMP | 4/5/2001 | TICKET | TICKET MASTER | $214.50 | | | | | KEMPER ARENA (OPEN) | 114 | P | 15 |
| | | | | TICKET MASTER | $166.00 | | | | HE BEAST | KEMPER ARENA (OPEN) | 115 | H | 01 |
| | | | | TICKET MASTER | $94.00 | | | | HE BEAST | SAVVIS CENTER (CENTER) | 108 | D | 01 |
| | | | | | | | | | | TARGET CENTER (END | 140 | 08 | 15 |
| | | | | | | | | | | CONTINENTAL AIRLINES | 109 | 19 | 11 |
| XXXX | COMP | | TICKET | TICKET MASTER | $XX.XX | 1 | B | 3/29/2002 | DISNEY ONICE | KEMPER ARENA (OPEN) | 113 | M | 15 |
| 37002 | COMP | | TICKET | TICKET MASTER | $XX.XX | 1 | B | 3/29/2002 | DISNEY ONICE | KEMPER ARENA (OPEN) | 113 | M | 17 |
| 37002 | COMP | 9/18/2001 | TICKET | TICKET MASTER | $XX.XX | 1 | B | 9/19/2002 | DISNEY ONICE-PRINCESS | KEMPER ARENA (OPEN) | 113 | M | 14 |
| 37002 | COMP | 9/18/2001 | TICKET | TICKET MASTER | $XX.XX | 1 | B | 9/19/2002 | DISNEY ONICE-PRINCESS | KEMPER ARENA (OPEN) | 113 | M | 15 |
| | | | | TICKET MASTER | | | | | | DUNKIN DONUTS CENTER | 128 | B | 08 |
| | | | | TICKET MASTER | | | | | | DUNKIN DONUTS CENTER | 129 | B | 09 |

Callouts:
- OPENS THE CUSTOMER HISTORY & NOTES
- ABILITY TO CANCEL THE PO (IF IT HASN'T ALREADY BEEN CANCELED OR IS EXPIRED)
- ABILITY TO MODIFY INFO ENTERED ON THE PO
- ADD/VIEW PO NOTES
- PROVIDES A PO REPORT OF THE PROFIT MADE ON THE SELECTED PO

[ PO PROBABILITY ] [ PO NOTES ] [ HIST/ NOTES [F6] ] [ PRINT PO [F4] ] [ VIEW PO ] [ CANCEL PO ] [ VENUE MAP [F2] ]

FIG. 14

3. CREATE MASS PO TICKETS
✏ INPUT NEW INVENTORY

SEARCH/EVENT SELECTION

HEADLINER: [NHL ALL STAR GAME (NHL)              ▽]       ☐ SHOW EXPIRED
EVENTS:    [02/01/03 TBA 2003 NHL ALL STAR SATURDAY ONLY ▽]  [VENUE MAP [F2]]
VENUE:     [NATIONAL CENTER                      ▽]
EVENT DATE: [2/11/03]    EVENT SEARCH: [      ]

SECTION:   [E      ]     SEATING OVERS: [        ]
ROW:       [       ]     CONFIRMATION ID: [      ]
FIRST SEAT:[       ]     FACE:          [        ]    LIST PRICE: [      ]
QUANTITY:  [1  ▽]  ☐ ODD/EVEN   COST: [        ]

☑ IN HAND    ☐ WEB       ITEM STATUS: [OPEN ▽]
           ☐ WHOLESALE  ☐ EXCHANGE  LOCATION: [  ▽]    BUYER OVERS: [      ]
                                    TICKETS BUYER: [           ▽]

[CLOSE]              [CRAETE AND ADD TO MASS PO]  ←  WHEN VIEW HAS BEEN
                                                     COMPLETE, SELECT "CREATE
                                                     AND ADD TO MASS PO"

4. MASS PO

USE TO SEARCH FOR MASS POs, ADVANCED QUOTES OR CANCELLED POs

*FILE PURCHASES SALES MANAGE REPORTS WINDOWS*

HEADLINER: [ELLEN DEGENERES (CONCERTS) ▽] DATE: [____] [SEARCH] ☐ SHOW EXPIRED [CONSIGNMENTS] [EXPIRED ALL SOLD]

FOUND EVENTS: 1

[____▽] [SHOW ALL]

| | LIST | WHOLESALE |
|---|---|---|
| SET PRICE: | [__] | [__] |
| +/- $ CHANGE: | [__] | [__] |
| +/- % CHANGE: | [▽] | |

SECTION: [__] ○ WHOLESALE ○ RETAIL

LOCATION: [▽] ☑ IN HAND

CATEGORY: [▽] [UPDATE CAT] [CLEAR]

[UPDATE SELECTED] [ADD TO EXCHANGE] [UNSHARE]

[ADD TO PO] [VENUE MAP [F2]]

SEATING SELECTION

CATEGORY  SECTION  ROW

TICKET COUNT: 8

| IN | LOC | EVENT | VENUE | EVENT DATE | CAT | SECTION | ROW | SEAT | LIST | COST | SOLDPRICE | WHOLE |
|---|---|---|---|---|---|---|---|---|---|---|---|---|
| | | | | | | | | | | | | |
| | | | | | | | | | | | | |
| | | | | | | | | | | | | |

*FIG. 16*

5. ADVANCED QUOTES

FILE  PURCHASES  SALES  MANAGE  REPORTS  WINDOWS

TASKS

\* REVIEW SOLD TICKETS ON ADVANCED QUOTES

| PO | EVENT | EVENT DATE | VENUE | AVG FACE | AVG COST | AVG SOLDFOR | SECTION | ROW | SEATS | CUSTOMER |
|---|---|---|---|---|---|---|---|---|---|---|
| 40547 | DALLAS COWBOYS | 11/24/2002 | TEXAS STADIUM | $0.00 | $0.00 | $0.00 | 0 | 37 | 105-107 | ROBERT MARSHALL |
| 40547 | DALLAS COWBOYS | 11/24/2002 | TEXAS STADIUM | $0.00 | $0.00 | $0.00 | 06 | 38 | 105-106 | ROBERT MARSHALL |
| 40547 | xxxxxxxxxxxxxx | XXX/XXXX | XXXX XXXXXXX | $0.00 | $0.00 | $0.00 | X | L | X | XXXXX XXXXXXX |
| 44177 | GEORGE STRAIT | 2/28/2003 | FREEDOM HAL CENTER | $0.00 | $64.87 | $160.00 | SEC 11 | G | 07-08 | TICKET MASTER TICKE |
| 44177 | GEORGE STRAIT | 2/28/2003 | FREEDOM HAL CENTER | $0.00 | $0.00 | $180.00 | SEC 11 | B | 01-02 | TICKET MASTER TICKE |
| 40325 | HAIRSPRAY | 12/3/2003 | NEIL SIMON THEATRE | $0.00 | $0.00 | $200.00 | DRCH | S | 17-19 | WARREN KANTOR |
| 41XX | XXXXXXXX | XXX/XXXX | XXX XXXX XXXX | $0.00 | $0.00 | $0.00 | XXXX | X | XXXXX | XXXXX XXXXX |
| 42197 | PHISH | 2/18/2003 | PEPSI CENTER END | $0.00 | $42.11 | $90.00 | 308 | 15 | 10-11 | PHISH FAN CLUB |
| 42137 | PHISH | 2/18/2003 | PEPSI CENTER END | $0.00 | $42.75 | $75.00 | 324 | 06 | XX-XX | PHISH FAN CLUB |
| 42129 | PHISH | 2/18/2003 | PEPSI CENTER END | $0.00 | $42.20 | $75.00 | 328 | 11 | 09-12 | PHISH FAN CLUB |
| 4XXX | XXXXX | XXX/XXX/XXXXX | XXX XXX XXXXX | $0.00 | $42.04 | $107.00 | 0000 | XX | XX-XX | XXX XXX XXXX |
| 38320 | ROLLING STONES | 10/12/2002 | FARD FIELD (STONES) | $90.00 | $107.27 | $107.27 | 105 | 31 | 01-10 | TICKET MASTER TICKE |
| XXXX | XXXXXXXXXXXX | XXXXXXXXX | XXX XXX XXXXX | $0.00 | $0.00 | $0.00 | XXX | XX | XX-XX | XXX XXX XXXX |
| 43012 | ST LOUIS RAMA VS SAN | 12/30/2002 | EDWARD JONES DOME | $0.00 | $0.00 | $20.00 | 405 | A | 04-05 | NICK METZGER |

FIND PO's (CTRL+F)...
PRINT PO (CTRL+P)...
VIEW PO (CTRL+V)...
VIEW MASS PO (CTRL+M)

ABILITY TO SEARCH FOR A PARTICULAR PO, PRINT THE PO AND VIEW THE PO

\* FOR TICKETS SOLD ON AN ADVANCED QUOTE, PO MUST BE COMPLETE FOR ACCOUNTING PURPOSES

*FIG. 17*

6. PO QUEUE
CONTAINS QUEUED DATA FROM NON-REAL TIME SALES OFF THE EXCHANGE, WHICH CAN BE EDITED AND MATCHED AGAINST AN EVENT AND THEN COMPLETED INTO A COMPLETED PO

FILE  PURCHASES  SALES  MANAGE  REPORTS  WINDOWS

SEARCH
EVENT:            EVENT DATE:              [SEARCH] [PRINT INVOICE]
VENUE:            ASSIGNED TO: [UNASSIGNED ▽]  [CLEAR] [TRADER IMPORT]

QUEUED PURCHASE ORDERS - DOUBLE CLICK TO EDIT:
| ASSIGNED TO | REF NO. | INV ID | EVENT | VENUE | EVENT DATE-TIME | ODD | SEATING | QTY | COST | FACE | SOLD FOR | PURCHASED FROM |
|---|---|---|---|---|---|---|---|---|---|---|---|---|

EVENT: CMT FLAMEWORTHY VIDEO MUSIC    EVENT DATE: 4/7/2003   STATE: [ ]    [SEARCH] [ADD EVENT]
VENUE: [          ]                   CITY: [          ]     SHOW EXPIRED ☐    [CLEAR]

EVENTS
| EVENT | VENUE | EVENT DATE | EVENT TIME | CITY & STATE | EVENT_ID |
|---|---|---|---|---|---|
| CMT FLAMEWORTHY VIDEO MUSIC AWARDS | GAYLORD ENTERTAINMENT | 04/07/03 | 8:00 PM | NASHVILLE, TN | 222105 |

| STATUS | ASSIGNED | TYPE | SALES REP | CUSTOMER | EVENT-VENUE | EVENT DATE | ET | QTY | SEATING | SOLD FOR | SALE DATE | REFERRAL | COMMENT |
|---|---|---|---|---|---|---|---|---|---|---|---|---|---|
| | | ADV/ | JENNY | SOME COMPANY | | | | | | | | | |
| | | ADV/ | JENNY | TSI DAVE RING | ALAN JACKSON | | | 2 | ADV | $50.00 | 1/22/2003 | BLAH2 | |
| | | ADV/ | JAKE | TICKET SOLUTIONS | 10000 MARISON | 12/12/2002 | | 2 | ADV | $100.00 | 1/22/2003 | CURRENT CUSTOMER | |
| | | ADV/ | JENNY | MOVIE STAR KEVIN | SUPER BOWL | 1/26/2003 | | 2 | ADV XXXXX XXX | $125.00 $750.00 | 9/10/2002 1/16/2003 | TEST CURRENT CUSTOMER | XXXXXXX XXXXXXX |
| | | ADV/ | JAKE | MOVIE STAR KEVIN | SUPER BOWL | 1/26/2003 | | 2 | ADV LOWER | 2000.00 | 11/16/2002 | CURRENT CUSTOMER | LOWER LEVEL ENTRANCE |
| | | ADV/ | STEVE | HAMMER U. INC | SUPER BOWL | 2/2/2003 | | 2 | ADV | 2000.00 | 11/15/2002 | | |
| | | ADV/ | JAKE | MATT WATSON | 1994 THE TRIBUTE | 10/12/2003 | | 2 | ADV | $125.00 | 10/16/2002 | KQRC 98.9 THE | |

ONCE AN ORDER HAS BEEN SELECTED, VARIOUS OPTIONS WILL BECOME AVAILABLE

STATUS: OPEN
ASSIGNED TO: UNASSIGNED

VENUE MAP | PAYMENTS
ORDER COMPLETION | FILL ORDER
HIST/NOTES [F6] | PRINT [F4]
CANCEL ORDER

NOTES
XXXX

DELIVERY DATE:

*FIG. 19B*

2. ORDER COMPLETION

SORT BY: [FILTER]
INVOICE # ▽  STATUS [ALL ▽]   [PAYMENTS] [EDIT SELL]
ORDERS | ORDERS DETAIL
ORDERS TO COMPLETE                F5 TO FIND PO

| STATUS | ID | SELL DATE | COMPANY | FIRST NAME | LAST NAME | TOTAL | PAYMENT | SHIPPING | SALES REP | TRACKING # | COMMENTS | CU |
|---|---|---|---|---|---|---|---|---|---|---|---|---|
| OPEN | 283 | 11/20/02 | TSI | DAVE | RING | $300.00 | CREDIT CARD | FED-EX TWO DAY | DAVE | | INCLUDE MAP | |
| OPEN | 284 | 11/20/02 | TSI | DAVE | RING | $0.00 | CASH | WILL CALL | DAVE | | | |
| OPEN | 285 | 11/20/02 | TSI | DAVE | RING | $216.00 | CREDIT CARD | FED-EX INTERNATIONAL | STEVE | | | |
| OPEN | 286 | 11/21/02 | MOVIE STAR | KEVIN | SPACEY | $325.00 | CASH | FED-EX STANDARD | JAKE | | | |
| OPEN | 287 | 11/22/02 | HAMMER U | STEVE | KAMINSKI | $615.00 | DEPOSIT | FED-EX PRIORITY | JAKE | | | |
| OPEN | 288 | 11/27/02 | TSI | DAVE | RING | $425.00 | MULTIPLE | FED-EX STANDARD | DAVE | | | |
| OPEN | 290 | 12/02/02 | TSI | DAVE | RING | $860.00 | CREDIT CARD | FED-EX SATURDAY | DAVE | | | |
| OPEN | 291 | 12/02/02 | | MA | BROKER | $940.00 | CREDIT CARD | FED-EX TWO DAY | DAVE | | | |
| OPEN | 292 | 12/03/02 | TSI | DAVE | RING | $0.00 | AR | FED-EX PRIORITY | DAVE | | | |
| OPEN | 297 | 12/10/02 | TICKET | JEFF | JULIAN | $1,170.00 | CREDIT CARD | FED-EX STANDARD | DAVE | | | |
| OPEN | 299 | 12/12/02 | TSI | DAVE | RING | $210.00 | MULTIPLE | FED-EX PRIORITY | DAVE | | | |
| OPEN | 301 | 12/12/02 | TSI | DAVE | RING | $656.25 | MULTIPLE | FED-EX STANDARD | DAVE | | | |
| OPEN | 302 | 12/12/02 | TSI | DAVE | RING | $978.50 | MULTIPLE | FED-EX SATURDAY | DAVE | | | |
| OPEN | 306 | 01/02/03 | TICKETS.COM | TICKETS | COM | $175.00 | MULTIPLE | FED-EX EXPRESS | JAKE | | | |
| OPEN | 307 | 01/06/03 | TSI | DAVE | RING | $382.05 | DEPOSIT | US MAIL | DAVE | | | |
| OPEN | 311 | 01/09/03 | ROCK QUERY | STONE | ROCK | $61.55 | CASH | COURIER | | | | |
| OPEN | 312 | 01/10/03 | TSI | DAVE | RING | $131.25 | DEPOSIT | FED-EX PRIORITY | DAVE | | | |
| OPEN | 314 | 01/15/02 | | DAVE | RING | $40.00 | CREDIT CARD | FED-EX INTERNATIONAL | DAVE | | | |
| OPEN | 317 | 01/22/03 | TSI | DAVE | RING | $1,575.00 | DEPOSIT | FED-EX PRIORITY | DAVE | | | |
| OPEN | 318 | 01/22/03 | TSI | DAVE | RING | $630.00 | CREDIT CARD | FED-EX PRIORITY | DAVE | | | |
| OPEN | 319 | 01/22/03 | TSI | DAVE | RING | $674.10 | DEPOSIT | FED-EX PRIORITY | DAVE | | | |
| OPEN | 320 | 01/22/03 | TSI | DAVE | RING | $225.00 | CREDIT CARD | FED-EX STANDARD | DAVE | | | |
| OPEN | 321 | 01/22/03 | TSI | DAVE | RING | $0.00 | DEPOSIT | FED-EX SATURDAY | DAVE | | | |
| OPEN | 322 | 01/22/03 | | DAVE | RING | $337.05 | DEPOSIT | COURIER | DAVE | | | |

[PRINT GRID] [HIST/NOTES (F8)] [COMPLETE [F10]] [PRINT (F4)] [CLOSE] 01/22/03 ▽ [COMPLETED REPORT]

4. PRE ORDERS

FILE  PURCHASES  SALES  MANAGE  REPORTS  WINDOWS

ULTRA USERS WILL BEGIN HERE

HEADLINER: "ROCKIN ROADHOUSE TOUR" (CONCERTS)
EVENT:
VENUE:
DATE:

☐ SHOW EXPIRED  ☐ SCHEDULE ONLY   [SEARCH]  [CLEAR]   [SEARCH FOR EVENT]

EVENT NOTES

| SUBJECT | NOTES |
|---|---|

[SELECT SELL]

☐ USE CTRL/SHIFT MULTISELECT

PRICED EVENT CATEGORIES

| EVENT | VENUE | EVENT DATE | TIME | AVAL | CAT | PRICE | QTY | DESCR |
|---|---|---|---|---|---|---|---|---|
| "ROCKIN ROADHOUSE TOUR" | PEPSI ARENA (END STAGE) | 1/22/03 WE | TBA | 0 | A | $0.00 | 0 | FLOOR LEVEL FIRST 15 EL |
| "ROCKIN ROADHOUSE TOUR" | PEPSI ARENA (END STAGE) | 1/22/03 WE | TBA | 0 | C | $0.00 | 0 | LOWER LEVEL ELEVATED |
| "ROCKIN ROADHOUSE TOUR" | PEPSI ARENA (END STAGE) | 1/22/03 WE | TBA | 0 | D | $0.00 | 0 | LOWER LEVEL ELEVATED |
| "ROCKIN ROADHOUSE TOUR" | PEPSI ARENA (END STAGE) | 1/22/03 WE | TBA | 0 | E | $0.00 | 0 | LOWER LEVEL ELEVATED |
| "ROCKIN ROADHOUSE TOUR" | PEPSI ARENA (END STAGE) | 1/22/03 WE | TBA | 0 | F | $0.00 | 0 | UPPER LEVEL CLOSEST |
| "ROCKIN ROADHOUSE TOUR" | PEPSI ARENA (END STAGE) | 1/22/03 WE | TBA | 0 | G | $0.00 | 0 | UPPER LEVEL OPPOSITE |
| "ROCKIN ROADHOUSE TOUR" | BLUE CROSS ARENA (END STAGE) | 1/24/03 F | TBA | 0 | A | $0.00 | 0 | FLOOR LEVEL FIRST 15 |
| "ROCKIN ROADHOUSE TOUR" | BLUE CROSS ARENA (END STAGE) | 1/24/03 F | TBA | 0 | B | $0.00 | 0 | FLOOR LEVEL 16-40 ROWS |
| "ROCKIN ROADHOUSE TOUR" | BLUE CROSS ARENA (END STAGE) | 1/24/03 F | TBA | 0 | C | $0.00 | 0 | LOWER LEVEL ELEVATED |
| "ROCKIN ROADHOUSE TOUR" | BLUE CROSS ARENA (END STAGE) | 1/24/03 F | TBA | 0 | D | $0.00 | 0 | LOWER LEVEL ELEVATED |
| "ROCKIN ROADHOUSE TOUR" | BLUE CROSS ARENA (END STAGE) | 1/24/03 F | TBA | 0 | E | $0.00 | 0 | LOWER LEVEL ELEVATED |
| "ROCKIN ROADHOUSE TOUR" | FRAZE PAVILON-KETTERING, OH | 6/13/03 F | TBA | 0 | A | $0.00 | 0 | 1ST 10 ROWS FROM THE |
| "ROCKIN ROADHOUSE TOUR" | FRAZE PAVILON-KETTERING, OH | 6/13/03 F | TBA | 0 | B | $0.00 | 0 | ROWS 16 TO 25 FROM THE |
| "ROCKIN ROADHOUSE TOUR" | FRAZE PAVILON-KETTERING, OH | 6/13/03 F | TBA | 0 | C | $0.00 | 0 | TERRACE SEATING |
| "ROCKIN ROADHOUSE TOUR" | FRAZE PAVILON-KETTERING, OH | 6/13/03 F | TBA | 0 | D | $0.00 | 0 | LAWN SEATING |

[ADD TO PO]  [ADD NOTES]   [SELL]   [ADVANCED SALE]   [VENUE MAP (F2)]

FIG. 24

THE FOLLOWING WINDOWS ARE SPECIFIC TO DEPOSIT PAYMENT TYPE

✎ ADD PAYMENT

DAVE RING (1216)          INVOICE #324          INVOICE TOTAL      xxxx
TSI                       DATE: 1/22/2003                          xxxx
11500 COLLEGE                                                      xxxx
315
OVERLAND PARK, KS 66210                                            ADD
9133044751                        THE FOLLOWING WINDOWS
APPLY SELECTED DEPOSIT | ADD DA   ARE SPECIFIC TO DEPOSIT          EXTRA
                                  PAYMENT TYPE
DEPOSITS
| DATE       | TYPE   |
|------------|--------|
| 1/10/2003  | REFUND |
| 12/12/2002 | REFUND |

SELECT "ADD DEPOSIT"

---

✎ ADD DEPOSIT

AMOUNT: 75    PAYMENT: [ ▼ ]

MEMO: [          ]                ADD

DEPOSITS
| DATE       | TYPE   | AMOUNT   | EXTRA INFO | MEMO                         |
|------------|--------|----------|------------|------------------------------|
| 1/10/2003  | REFUND | $275.00  |            | STORE CREDIT FROM SALE #305  |
| 12/12/2002 |        |          |            | STORE CREDIT FROM SALE #295  |

INSERT DEPOSIT AMOUNT AND PAYMENT TYPE

---

✎ SELECT CREDIT CARD

CREDIT CARDS
| D | CARD TYPE | NUMBER             | EXP     | DESCRIPTION |
|---|-----------|--------------------|---------|-------------|
| ✓ |           |                    |         |             |
| ✓ | VISA      | 4444444444444444   | 4/4     | XXXXXXX     |
| ✓ | VISA      | 4456-5565-5656-6565| 05/2005 | CORPORATE   |
| ✓ | DISCOVER  | 654654654654654    | 05/2007 |             |

SELECT THE CREDIT CARD YOU WISH TO BILL TO, THEN SELECT THE "SELECT" BUTTON

[CANCEL] [SELECT]

FIG. 25

6. Exchange Brokers

| ← → ○ 🗎 🏠 | 🖨 | 21010 ▼ | Fill Order |

Broker ID #1
Ticket Solutions
11900 College Blvd
Suite 315
Overland park, KS

Phone: 800-477-5285
Phone2: 913-384-4751
Fax: 913-451-7832

E-Mail: support@tickstsolutions.com
Web: http://www.ticketsolutions.com/

1 Ticket Solution
Overland park, KS

2 Great Seats
College Park, MD

3 Stage Front
Laurel, MD

Click on broker name to retrieve address, phone number and futher information for particular broker

*FIG. 27*

MANAGE
1. INVENTORY

FILE  PURCHASES  SALES  MANAGE  REPORTS  WINDOWS

HEADLINER: [LION KING (THEATRE)]  ▽ DATE: [　] [SEARCH] ☐ SHOW EXPIRED  ☐ CONSIGNMENTS  ☐ EXPIRED

→ *SELECT EVENT FROM DROP DOWN LIST, CLICK "SHOW ALL"*

→ *INSERT SEARCH CRITERIA*

FOUND EVENTS: 1
LION KING – 3/14/2003 8:00 PM @ NEW AMSTERDAM THEATRE

| | LIST | WHOLESALE | | SECTION: | [　] | [SHOW ALL ▽] |
|---|---|---|---|---|---|---|
| SET PRICE: | [　] | [　] | | LOCATION: | [　] ▽ | ☑ IN HAND  ○ WHOLESALE  ○ RETAIL |
| +/– $ CHANGE: | [　] | | | CATEGORY: | [　] ▽ | [UPDATE CAT] [CLEAR] |
| +/– % CHANGE: | [　] ▽ | | | | | |

[UPDATE SELECTED]  [ADD TO EXCHANGE]  [UNSHARE]
[SPLIT TIX]  [VENUE MAP [F2]]

┌─ SEATING SELECTION ─────────────┐
│ CATEGORY   SECTION   ROW         │
│                                  │
│    B         ORCH      A         │
│                                  │
└──────────────────────────────────┘

TICKET COUNT: 3

| IN | LOC | EVENT | VENUE | EVENT DATE | CAT | SECTION | ROW | SEAT | LIST | COST | SOLD PRICE | WHOLE SALE | WHOLE SALE # | HOLE # AL | FACE | STATUS |
|---|---|---|---|---|---|---|---|---|---|---|---|---|---|---|---|---|
| ☑🔒 | KC | LION KING | NEW AMSTERDAM | MAR 14 | B | ORCH | A | 05 | $185.00 | $107.28 | $0.00 | $0.00 | | NO | $100.00 | OPEN |
| ☑🔒 | KC | LION KING | NEW AMSTERDAM | MAR 14 | B | ORCH | A | 07 | $185.00 | $107.28 | $0.00 | $0.00 | | NO | $100.00 | OPEN |

← *HIGHLIGHT & DOUBLE CLICK INVENTORY TO BE MODIFIED*

3. PRE ORDER PRICES (ULTRA USER OPTION)
ALLOWS USER TO SET PRICES & QUANTITY FOR SPECIFIC CATEGORIES

*FILE PURCHASES SALES MANAGE REPORTS WINDOWS*

EVENT/HEADLINER: [ ▽ ]

VENUE: [ ▽ ] DAY OF WEEK:
SUN
MON
TUE        CLOSE
WED    VENUE MAP (F2)
THU        SEARCH
FRI
SAT

CATEGORY: [ ▽ ]

EVENT DATE: [ ▽ ]

NEW PRICE [ ]  NEW QUANTITY [ ]  UPDATE GROUP  EXCLUDE  REFRESH

| EVENT | EVENT DATE | VENUE | CATEGORY | PRICE | QUANTITY | EV |
|---|---|---|---|---|---|---|
| 2003 KANSAS CITY CHIEFS SEASON TICKETS | FRIDAY, 08/15/03 | ARROWHEAD STADIUM (FOOTBALL) | A | 0 | 0 | |
| 2003 KANSAS CITY CHIEFS SEASON TICKETS | FRIDAY, 08/15/03 | ARROWHEAD STADIUM (FOOTBALL) | C | 0 | 0 | |
| 2003 KANSAS CITY CHIEFS SEASON TICKETS | FRIDAY, 08/15/03 | ARROWHEAD STADIUM (FOOTBALL) | D | 0 | 0 | |
| 2003 KANSAS CITY CHIEFS SEASON TICKETS | FRIDAY, 08/15/03 | ARROWHEAD STADIUM (FOOTBALL) | E | 0 | 0 | |
| 2003 KANSAS CITY CHIEFS SEASON TICKETS | FRIDAY, 08/15/03 | ARROWHEAD STADIUM (FOOTBALL) | F | 0 | 0 | |

6. Events
6.1 Headliners
   Add Headliners in database

Search Headliner: [          ] [Search]

Search for Headliner to verify that the Headliner needs to be added.

| Headliner | Category | EVENT HEADLINER ID |
|---|---|---|
| △ "Artist Empowerment Coalition" Benefit Concert | Concerts | 105023 |
| "CMT Music Marathon" | Concerts | 105024 |
| "Four Bitchin Babes" | Concerts | 105017 |
| 10 Gales Dancing | Theatre | 104671 |
| 100.3 The Beat Holiday Cooldown | Concerts | 105494 |
| 10000 Maniacs | Concerts | 102717 |
| 1964: the Tribute | | |
| 2002: New Years Eve Party | | |
| 2002 Peach State Classic | | |
| 2003 AHL All-Star game | | |

[Close]
[Add]
[Delete]

To add a Headliner, click Add, enter the Headliner Name & Category, select Add.

Add Headliner to Exchange [X]
Headliner: [          ]
Category: [        ▽]
[Add]  [Cancel]

FIG. 33

9. Shopping Cart

| | SALES REP | COMPUTER | TIMESTAMP | STATUS | EVENT | EVENT DATE | SECT | ROW | SEAT |
|---|---|---|---|---|---|---|---|---|---|
| ▷ | | ELAINE | | SOLD | Super Bowl XXXVII - Oakland | 01/26/2003 | FIELD 34 | 24 | 03 |
| | | ELAINE | | SOLD | Super Bowl XXXVII - Oakland | 01/26/2003 | FIELD 34 | 24 | 04 |
| | | ELAINE | | | Super Bowl XXXVII - Oakland | 01/26/2003 | FIELD 34 | 24 | 01 |
| | | ELAINE | | SOLD | Super Bowl XXXVII - Oakland | 01/26/2003 | FIELD 34 | 23 | 02 |

File Purchase Sales Manage Reports Windows

Buttons: Refresh | By Sales Rep | By Event | By Entry Time | Close

Complete List of Items in All Users Shopping Cart

FIG. 36

10. Exchange
   10.1 Broker to broker Settings
   Contains a list of all brokers that use the Exchange. Allows you to regulate
   the type of payment accepted for each broker and the Reserve Time.

File Purchase Sales Manage Reports Windows

| Broker | Payment | Reserve Hrs | Exclude | City | State |
|---|---|---|---|---|---|
| | Credit Card | | None | Chicago | IL |
| 2Tickets.com | COD | | None | Atlanta | GA |
| 24/7 (WebTickets.com) | Credit Card | | None | Atlanta | GA |
| A Worldwide Ticket co | COD | | None | Pompano Beach | FL |
| A1 Tickets | COD | | None | Carlos | CA |
| A1 Tickets (Houston) | COD | | None | Houston | TX |
| AAATIX (CHI) | AP | | None | Chicago | IL |
| AAATIX (AL) | AP | | None | Birmingham | AL |
| Access Entertainment inc. | Credit Card | | None | Toronto | OK |
| Ace Ticket (Boston) | AP | | None | Brockfield | MA |
| Ace Ticket Service (Chicago) | Credit Card | | None | Glenview | IL |
| ADVANTAGE SPORTS | COD | | None | RED BANK | NJ |
| Advantage Tickets | COD | | None | Adision | TX |
| All American Ticket Service | Credit Card | | None | Clairmount | NE |

Refresh | Save

3. EVENT REPORTS
3.1 EVENT RANGE
SELECT DATE RANGE, SORTS BY EVENT NAME

1/15/2003

EVENT REPORT

| DATE | EVENT | VENUE | SOLD | AVAILABLE |
|---|---|---|---|---|
| 1/12/03 | CHICAGO BLACKHAWKS VS NASHVILB PROD | UNITED CENTER (HOCKEY) | | 4 |
| 12/16/02 | CHICAGO BULLS VS BOSTON CELTICS | UNITED CENTER (BASKETBALL) | | 2 |
| 12/27/02 | CHICAGO BULLS VS MINNEEOTS TIMBERWOL | UNITED CENTER (BASKETBALL) | | 2 |
| 1/13/03 | CHICAGO BULLS VS NEW YORK KINKS | UNITED CENTER (BASKETBALL) | | 2 |
| 12/31/02 | CHICAGO BULLS VS PORTLAND TRAIL BLAZERS | UNITED CENTER (BASKETBALL) | | 2 |
| 12/18/02 | CHICAGO BULLS VS TORONTO RAPTORS | UNITED CENTER (BASKETBALL) | | 2 |
| 1/6/03 | CHICAGO BULLS VS UTAH JAZZ | UNITED CENTER (BASKETBALL) | 2 | |
| 12/22/02 | KANSAS CITY CHIEFS VS SUN DIEGO CHARG | ARROWHEAD STADIUM (FOOTBALL) | 16 | 35 |
| 1/4/03 | LOS ANGELES KINGS VS DOLLAR STARS | STAPLES CENTER (HOCKEY) | | 5 |
| 12/17/02 | LOS ANGELES KINGS VS ST LOUIS BLUES | STAPLES CENTER (HOCKEY) | 5 | |
| 1/10/03 | LOS ANGELES LAKES VS CLEVELAND CAVE | STAPLES CENTER (BASKETBALL) | 2 | |
| 1/12/03 | LOS ANGELES LAKES VS MIAMI HEAT | STAPLES CENTER (BASKETBALL) | | 4 |
| 12/30/02 | MISSOURI TIGERS VS VAMPIRES CREADER | HEARNES CENTER (BASKETBALL) | | 4 |
| 12/28/02 | NEW ENGLAND PATRIOTS VS MIAMI DOLOB | GILLETTE STADIUM (FOOTBALL) | 5 | |

FIG. 39

3.2 CURRENT EVENTS
AUTOMATICALLY GENERATES

EVENT REPORT

1/15/2003

| DATE | EVENT | VENUE | SOLD | AVAILABLE |
|---|---|---|---|---|
| 3/21/03 | 10 GATES DANCING | NATIONAL ARTS CENTRE | | 3 |
| 3/20/03 | 10 GATES DANCING/TEDD ROBINSON | NATIONAL ARTS CENTRE | | 4 |
| 3/22/03 | 10 GATES DANCING/TEDD ROBINSON | NATIONAL ARTS CENTRE | 4 | 5 |
| 2/15/03 | 2003 AMA SUPERCROSS | HHH METHADOME | | 5 |
| 3/29/03 | 2003 AMA SUPERCROSS | ROBERT ARENA | | 3 |
| 1/23/03 | CHICAGO BLACKHAWKS VS ST LOUIS BLUES | UNITED CENTER (HOCKEY) | | 4 |

FIG. 40

4. INVENTORY
4.1 SOLD TICKETS SEARCH UTILITY
PROVIDE SEARCH CRITERIA
SELECT EVENT BY HIGHLIGHTING THE ROW

FILE  PURCHASES  SALES  MANAGE  REPORTS  WINDOWS

EVENT: ▼
VENUE: ▼
SECTION:     ROW:
SEAT:

SEARCH   CLEAR

DATE:
INVOICE #:
ITEM #:
AMOUNT:

SOLD INVENTORY

| INVOICE | EVENT | VENUE | PURCH DATE | EVENT DATE | SECTION | ROW | SEAT |
|---|---|---|---|---|---|---|---|
| 88494 | NFL PRO BOWL | ALOHA STADIUM | 1/17/2001 | 2/4/2001 | C | 13 | 16 |
| 88914 | NFL PRO BOWL | ALOHA STADIUM | 1/26/2001 | 2/4/2001 | PP | 08 | 04 |
| 88914 | NFL PRO BOWL | ALOHA STADIUM | 1/26/2001 | 2/4/2001 | PP | 08 | 05 |
| 88926 | NFL PRO BOWL | ALOHA STADIUM | 1/26/2001 | 2/4/2001 | G | 31 | 03 |
| 88926 | NFL PRO BOWL | ALOHA STADIUM | 1/26/2001 | 2/4/2001 | G | 31 | 04 |

FIG. 41

BILL TO:

SHIP TO:

Invoice:            Customer No:

| Salesperson: | | Date of Order: |
| Payment Method: | | Date Order Shipped: |
| Credit Card: | Exp: | Shipping: |
| Instructions: | | Fed-Ex No: |

| Date | Time | Qty | Event | Venue | Section | Row | Seats | Price | Total |
|------|------|-----|-------|-------|---------|-----|-------|-------|-------|
|      |      |     |       |       |         |     |       |       |       |

Sub Total
Tax
Handling
Total Amount

*FIG. 42*

4.2 Reserved Ticket List
Automatically generates report.

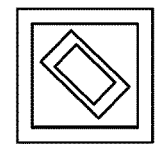

Reserved Tickets

| Event ID | Section | Row | Seat | | Cost | List | Reserved |
|---|---|---|---|---|---|---|---|
| 103,677 | Boston Red Sox vs Anaheim Angels | | | Fenway Park | Monday August 21, 2000 | | |
| | 24 | EE | 1 | DUPLICATE TICKETS | $0.00 | $155.00 | $155.00 |
| 103,706 | Boston Red Sox vs Seattle Mariners | | | Fenway Park | Saturday September 2, 2000 | | |
| | 11 | CC | 07 | DUPLICATE TICKETS | $0.00 | $95.00 | $0.00 |
| | 11 | CC | 08 | DUPLICATE TICKETS | $0.00 | $95.00 | $0.00 |
| 212,639 | Bruce Springsteen and the E Street Band | | | Dunkin Donuts Center (End Stage) | Monday March 10, 2003 | | |
| | 101# | C | 05 | KYLE STONE | $82.65 | $0.00 | $0.00 |
| | 101# | C | 06 | KYLE STONE | $82.65 | $0.00 | $0.00 |
| | 103# | EE | 01 | KYLE STONE | $81.83 | $0.00 | $0.00 |
| | 103# | EE | 02 | KYLE STONE | $81.83 | $0.00 | $0.00 |
| | 103# | EE | 03 | KYLE STONE | $81.83 | $0.00 | $0.00 |
| | 103# | EE | 04 | KYLE STONE | $81.83 | $0.00 | $0.00 |

*FIG. 43*

4.3 Expired Inventory
Automatically generates report

*Expired Inventory*

| *College World Series - Session: S (Rosenblatz Stadium)* | | | Monday, June 13, 2002 | Count: 2 |
|---|---|---|---|---|
| BB | Row | Seat | | Count |
| | 10 | 03 | | 2 |

| *Minnesota Vikings vs New York Giants (HHHH Metrodome (Footb)* | | | Sunday, November 10, 2002 | Count: 30 |
|---|---|---|---|---|
| | Row | Seat | | Count |
| 120 | 23 | 09 | | 2 |

4.4 PO Tickets
Automatically generates report.

1/15/2003

| Event ID | Section | Row | Seat | | Cost | List | S&H |
|---|---|---|---|---|---|---|---|
| [8],712 2002 Mainstay Independence Bowl - Independence Bowl Stadium Friday, December 23, 2002 | | | | | | | |
| Nebraska Cornhusker vs Mississippi Rebels | | | | | | | |
| 113 | | = | 01 | | $35.00 | $0.00 | $175.00 |
| 113 | | = | 02 | | $35.00 | $0.00 | $175.00 |
| 113 | | = | 03 | | $35.00 | $0.00 | $150.00 |
| 113 | | = | 04 | | $35.00 | $0.00 | $150.00 |
| 113 | | = | 05 | | $35.00 | $0.00 | $150.00 |

FIG. 45

4.5 Sold Tickets
Automatically generates report.

*Sold Tickets Report*

| Section | Row | Seat | Sold Date | Sold $$ | Rep | Inv # |
|---|---|---|---|---|---|---|
| 2003 AMA Supercross | | | HHH Metrodome (Football) | | Saturday, February 15, 2003 TBA | |
| 133 | 05 | 15 | 1/13/03 | $95.00 | | 155,700 |
| 133 | 05 | 16 | 1/13/03 | $95.00 | | 155,701 |
| 2003 NFL Pro Bowl | | | Aloha Stadium | | Saturday September 2, 2000 1:00 PM | |
| ORANGE K | 14 | 13 | 1/15/03 | $250.00 | | 155,820 |

4.6 Fax List
Provide Search Criteria

| Event Picker | | | |
|---|---|---|---|
| Headliner: | ▽ | Event: | |
| Venue: | ▽ | Date: | |
| Search  Print | | ☐ Show Deleted  ☐ Show Expired | |

| Event | Venue | Event Date | Event Time |
|---|---|---|---|
| ▷ AFC Conference Championship - Oakland | Network Associates | Sunday, 01/19/03 | 3:30 PM |
| NFC Conference Championship | Veterans Stadium | Sunday, 01/19/03 | 3:00 PM |
| Super Bowl Package | Qualcomm Stadium | Thursday, 01/23/03 | TBA |
| Championship Package 1/23/03 | Gaslamp Plaza Suites | Thursday, 01/23/03 | TBA |

Select event by highlighting. Select multiple events by suppressing the Control or Shift keys while highlighting with mouse.

FIG. 47

Select Print
Prompt "Include only shared ticket?, select "yes" or "no"

Ticket Solutions, Inc.
11900 College Blvd. Suite 315
Overland Park, KS 66210

Phone: (913)384-4751
Fax: 913-451-7832

January 26, 2003     3:00 PM

Super Bowl XXXVII at Qualcomm Stadium (Football)
San Diego, CA

| COUNT | SECTION | ROW | FACE | RETAIL |
|---|---|---|---|---|
| 2 | PLAZA 06 | 12 | $400.00 | $4,750.00 |
| 5 | FIELD 06 | 22 | $0.00 | $4,500.00 |

4.7 # DAYS FAX LIST
PROMPT "HOW MANY DAYS?"
PROMPT "INCLUDE ONLY SHARED TICKETS?"

| | TICKET SOLUTIONS, INC.<br>11900 COLLEGE BLVD. SUITE 315<br>OVERLAND PARK, KS 66210 | | PHONE: (913)384-4751<br>FAX: 913-451-7832 | |
|---|---|---|---|---|
| JANUARY 15, 2003 | DUKE BLUE DEVILS VS VIRGINIA CAVALIERS AT CAMERON INDOOR STADIUM<br>DURHAM, NC | | | |
| | COUNT | SECTION | ROW | FACE | RETAIL |
| | 2 | 11 | B | $0.00 | $175.00 |

*FIG. 49*

4.8 OPEN INVENTORY
4.9 OPEN INVENTORY (SELECTED EVENTS)
4.10 OPEN INVENTORY (NOT CATEGORIZED)
      AUTOMATICALLY GENERATES REPORT

DETAILED CURRENT INVENTORY

PRINT DATE & TIME: 1/15/2003 2:44:39 PM

AVRIL LAVIGNE
5/9/03    7:38 PM    SAVVIS CENTER (END STAGE)    ST. LOUIS    MO
118           G           LIST PRICE    $85.00    COST: $38.01
(05)    (06)    (07)    (08)

*FIG. 50*

5. Registers
5.1 FedEx History

FedEx Ship History

| Invoice | Comp. Date | Amount | Ship To | Payment | Shipping Type | Tracking # | Bill To |
|---|---|---|---|---|---|---|---|
| 155590 | 1/13/2003 | $3,185.00 | | Credit | FedEX Standard | 7900135252705 | Starcard |
| 155417 | 1/15/2003 | $2,277.76 | | Credit | FedEX Standard | 790677847563 | Standard |
| 155920 | 1/15/2003 | $6,000.00 | | COD U | FedEX Standard | 790077342000 | Recipient |
| 155621 | 1/15/2003 | $1,106.00 | | Credit | FedEX Standard | 790185633810 | Standard |
| 155178 | 1/17/2003 | $825.00 | | Credit | FedEX Next Day | 790135486898 | Starcard |
| 155727 | 1/15/2003 | $3,115.00 | | Credit | FedEX Priority | 790185628980 | Standard |
| 155315 | 1/15/2003 | $215.00 | | Credit | FedEX Priority | 790577648865 | Starcard |
| 155680 | 1/15/2003 | $765.00 | | Credit | FedEX Standard | 791277949777 | Standard |
| 155707 | 1/17/2003 | $214.00 | | Credit | FedEX Standard | 791835559998 | Starcard |
| 155807 | 1/15/2003 | $1,740.00 | | Credit | FedEX Standard | 791277648446 | Standard |
| 155468 | 1/15/2003 | $199.00 | | Multiple | FedEX Standard | 790135760269 | Starcard |
| 155818 | 1/15/2003 | $500.00 | | AR | FedEX Standard | 790185534284 | Recipient |
| 155726 | 1/15/2003 | $6,200.00 | | COD U | FedEX Standard | 791244109100 | Recipient |
| 155662 | 1/15/2003 | $905.00 | | Multiple | FedEX Standard | 790677813154 | Standard |
| 155801 | 1/15/2003 | $3,185.00 | | Credit | FedEX Standard | 700135854507 | Starcard |
| 152929 | 1/15/2003 | $1,115.00 | | Credit | FedEX Standard | 791277433231 | Standard |
| 155100 | 1/15/2003 | $5,285.00 | | AR | FedEX Standard | 700105577022 | Standard |
| 155829 | 1/15/2003 | $6,300.00 | | Credit | FedEX Next Day | 791277585069 | Standard |
| 155800 | 1/15/2003 | $515.00 | | Credit | FedEX Priority | 733185400134 | Standard |
| 155736 | 1/15/2003 | $1,566.00 | | Credit | FedEX Standard | 790185623680 | Standard |
| 15158 | 1/17/2003 | $417.00 | | Credit | FedEX Standard | 730677773908 | Starcard |

Delete | Track | Refresh | 01/15/03 ◁ ▷ | FedEx Report | Close

5.3 Purchase Order Register
Able to modify search criteria. Select Refresh after modifying search criteria. Select an item by highlighting the row. Select Print, this will generate a Complete Purchase Order.

File  Purchase  Sales  Manage  Reports  Windows

Date of POs to Show: 12/17/02 ▽ △  | Refresh | Print (F4) | F3 to Sort

| ID | Status | Sales Rep | Payment Type | PO Total | Event Venue | Event Date | Qty | Cost | Vendor |
|---|---|---|---|---|---|---|---|---|---|
| 41622 | Complete | | Credit Card | $179.55 | Yanni | 05/03/03 | 2 | $89.78 | TICKETMASTER |
| 41754 | Complete | | Credit Card | $162.50 | Shakira | 01/28/03 | 2 | $81.25 | TICKETMASTER |
| 41755 | Complete | | Credit Card | $162.50 | Shakira | 01/28/03 | 2 | $81.25 | TICKETMASTER |
| 41786 | Complete | | Credit Card | $205.00 | 2003 Nokia Sugar Bowl | 01/01/03 | 2 | $102.50 | TICKETMASTER |
| 41788 | Complete | | Credit Card | $205.00 | 2003 Nokia Sugar Bowl | 01/01/03 | 2 | $102.50 | TICKETMASTER |
| 41789 | Complete | | Credit Card | $205.00 | 2003 Nokia Sugar Bowl | 01/01/03 | 2 | $102.50 | TICKETMASTER |
| 41827 | Complete | | Credit Card | $355.75 | Cher | 03/13/03 | 4 | $88.94 | TICKETMASTER |
| 41865 | Complete | | Credit Card | $202.40 | Alan Jackson | 02/07/03 | 4 | $50.00 | TICKETMASTER |
| 41882 | Complete | | Credit Card | $102.70 | Alan Jackson | 02/07/03 | 2 | $51.35 | TICKETMASTER |

FIG. 53

5.4 WEB SALES REGISTER
ABLE TO MODIFY SEARCH CRITERIA. SELECT REFRESH AFTER MODIFYING THE SEARCH CRITERIA. SELECT AN ITEM BY HIGHLIGHTING THE ROW. SELECT PRINT, THIS WILL GENERATE A PRICED EVENT SALE REPORT

| FILE | PURCHASES | SALES | MANAGE | REPORTS | WINDOWS | | | | |
|---|---|---|---|---|---|---|---|---|---|
| | TYPE | FIRST NAME | LAST NAME | TOTAL | PUNCH DATE | SALES REP | COMPLETION DATE | TRACKING & |
| 155951 | PRICED | HOPE | GREEN | $65.00 | 1/17/2003 9:39:27 AM | | | |

| PRINT [F4] | HISTORY [F6] | REFRESH [F5] | FIND [CTRL+F] | START DATE | JANUARY 17, 2003 |

*FIG. 54*

5.6 EXCHANGE TRANSACTIONS

| | 21010 ▽ | | FBI ORDER | | | | |

| DISPLAY: | ALL TRANSACTIONS ▽ | | | BROKER TRANSACTIONAL DETAILS | | | |
|---|---|---|---|---|---|---|---|
| DATE | TRANSACTION | DATE | EVENT_ID | EVENT DATE/TIME | EVENT (VENUE) | QTY (SECT. ROW) | BUY PRICE SOLD PRICE | XXX | XXX | CUSTOMER CONF# |
| 1/16/2003 1:34:32 PM | TICKETS SOLD TO CUSTOMER | WEB | 187932 | 4/1/2003 TAs | JEEUS CNNSE SUPERSOS (FEATHER FUY THEATER (GA)) | 2 (ORCHC P) | $85 $120 | 0 | 0 | EXS1547-ADV |

*FIG. 55*

6. SALES REPORTS
6.1 DAILY SALES BY EVENT
SELECT DATE RANGE, SORTS BY EVENT NAME

EVENT SALES

2003 AMA SUPERCROSS ((HHH METRODOME (FOOTBALL)) SATURDAY, FEBRUARY 15, 2003 TBA

| INS# | SOLD | REP | CUSTOMER | LOCATION | SOLD | COST | PROFIT |
|---|---|---|---|---|---|---|---|
| 155700 | 1/13/03 | AMY HORTON | CHARLES DUNLAP | SECTION: 133 ROW:05 SEATS: 15 TO 16 | 190.00 | 130.00 | 60.00 |
| | | | | | 2  190.00 | 130.00 | 60.00 |

2003 FEDEX ORANGE HOWL-LEWA HOWKEYS VS USC TROJANS (PRO PLAYER STADIUM (FOOTBALL)) THURSDAY, JANUARY 2, 2003 8:00 PM

| INS# | SOLD | REP | CUSTOMER | LOCATION | SOLD | COST | PROFIT |
|---|---|---|---|---|---|---|---|
| 155187 | 1/2/03 | JALCE | WRITE OFF | SECTION: 44 ROW:04 SEATS: 20 TO 20 | 0.00 | 50.00 | (50.00) |
| 155187 | 1/2/03 | JALCE | WRITE OFF | SECTION: PKG ROW:ORANGE SEATS: 170 TO 171 | 0.00 | 0.00 | 0.00 |
| 155187 | 1/2/03 | JALCE | WRITE OFF | SECTION: TAILGATE ROW:PANTY SEATS: 187 TO | 0.00 | 0.00 | 0.00 |
| | | | | | 5  0.00 | 50.00 | (50.00) |

2003 ROSE BOWL-OKLAHOMA SOONERS VS WASHINGTON STATE COUGARS (ROSE BOWL) WEDNESDAY, JANUARY 1, 2003 2:00 PM

| INS# | SOLD | REP | CUSTOMER | LOCATION | SOLD | COST | PROFIT |
|---|---|---|---|---|---|---|---|
| 155175 | 1/1/03 | TIRU | OERARD O ESQUIVEL | SECTION: 09 ROW:12 SEATS: 01 TO 02 | 150.00 | 50.00 | 100.00 |
| | | | | | 2  150.00 | 50.00 | 100.00 |

TOTAL TICKETS PER EVENT → | TOTAL SOLD, COST, PROFIT PER EVENT

YAMNI (GAYLORD ENTERTAINMENT (END STAGE)) WEDNESDAY, MARCH 12, 2003 7:30 PM

| INS# | SOLD | REP | CUSTOMER | LOCATION | SOLD | COST | PROFIT |
|---|---|---|---|---|---|---|---|
| 155166 | 1/1/03 | | | SECTION: 02 ROW:A SEATS: 02 TO 06 | 420.00 | 300.00 | 120.00 |
| | | | | | 2  420.00 | 300.00 | 120.00 |

REPORT TOTALS → 1,002  282,751.97  210,357.63  72,384.34

TOTAL TICKETS FOR DATE RANGE | TOTAL SOLD, COST, PROFIT FOR DATE RANGE

*FIG. 56*

6.2 DAILY SALES BY PAYMENT TYPE
SELECT DATE RANGE, SORTS BY PAYMENT TYPE

PROVO

| | | | | | | | |
|---|---|---|---|---|---|---|---|
| 12486 | JANUARY 10, 2003 | 155551 | $80.00 | $0.00 | $0.00 | 0.00 | $0.00 |
| 13486 | JANUARY 10, 2003 | 155174 | $2001.00 | $800.00 | $0.00 | 0.00 | $0.00 |
| 14153 | JANUARY 11, 2003 | 155606 | $504.00 | $2000.00 | $0.00 | 0.00 | $0.00 |
| 73389 | JANUARY 13, 2003 | 155676 | $294.00 | $900.00 | $0.00 | 0.00 | $0.00 |
| 74173 | JANUARY 13, 2003 | 155729 | $3,301.00 | $790.00 | $0.00 | 0.00 | $0.00 |
| 74170 | JANUARY 13, 2003 | 155730 | $10,901.00 | $5,300.00 | $0.00 | 0.00 | $0.00 |
| | | | $70,300.00 | $10,600.00 | $0.00 | 0.00 | $0.00 |
| | | | $24,324.00 | $70,300.00 | $0.00 | 0.00 | $120.71 |
| 142139 | FEBRUARY 13, 2003 | 155707 | $4,101.00 | $64,124.00 | $0.00 | 0.00 | $5,800.00 |
| 79139 | FEBRUARY 13, 2003 | 155723 | $14,304.00 | $4,100.00 | $0.00 | 0.00 | $11,000.00 |
| | | | $18,400.00 | $14,100.00 | $0.00 | 0.00 | $15,800.00 |
| | | | $18,400.00 | $18,400.00 | $0.00 | 0.00 | $15,100.00 |

PAYMENT TYPE → CASH INVENTORY ← SALES REP

| | | | | | | | | |
|---|---|---|---|---|---|---|---|---|
| INVENTORY FROM FINAL | 144101 | DINNER C | JANUARY 15, 2003 | 133600 | $590.00 | $330.00 | $0.00 | 0.00 | $573.00 |
| | | | | | $590.00 | $330.00 | $0.00 | 0.00 | $675.00 |
| INVENTORY FROM FINAL | 131027 | | JANUARY 10, 2003 | 133649 | $1,111.00 | $1,100.00 | $0.00 | 0.00 | $0.00 |
| | 143943 | | JANUARY 15, 2003 | 133671 | $330.00 | $330.00 | $0.00 | 0.00 | $0.00 |
| | | | | | $1800.00 | $1830.00 | $0.00 | 0.00 | $0.00 |
| | | | | | $2251.00 | $2,000.00 | $0.00 | 0.00 | $220.00 |
| GRAND TOTAL | | | | | $1156.00 | $30929.00 | $51.00 | $810.00 0.00 | $39366.81 |

6.7 Chicago Sales Tax Report
Select Date Range
Prompt "show sales you charged $0.00 for?", selet yes or no
Prompt "Do you charge tax on handling?", selet yes or no
Prompt "Do you charge tax on shipping?", selet yes or no

| | Qty | Total Price | Face | Taxable | Should be Taxed | And Taxed for entire sale | Shipping | Handling |
|---|---|---|---|---|---|---|---|---|
| *Theatre* | | | | | | | | |
| Web | | | | | | | | |
| 155,667 | 2 | 420.00 | 0.00 | 435.00 | $13.05 | 0.00 | 15.00 | 0.00 0?? |
| | | | | | | $0.00 | | |
| | | | | | | $0.00 | | |

*FIG. 62*

6.8 Purchase for an Event
Provide seach criteria

Select event by highlighting, Select Multiple
events by suppressing the Control or Shift keys
while highlighting with mouse.

Click the Print button to generate the report

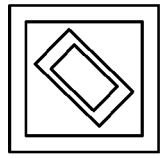

Purchase Orders by Event

| | Cost | List | Sold | Fee |
|---|---|---|---|---|

NFC Conference Championship - Philadelphia Eagles vs Tampa Bay Buccaneers. (Veterans Stadium (Football) Sunday,
January 19, 2002 3:00PM Profit: ($2,350.00)
Tickets, II Sold Tickets: 2

Purchase Order #43383    PO Date: 1/8/03 Payment: Check Confirm: $350 paid 1/8, save $500 if eagles
Tickets: 2
Profit: $350.00

| | | Cost | List | Sold | Fee | | |
|---|---|---|---|---|---|---|---|
| 304 | 01 | $250.00 | $425.00 | $425.00 | | Sold | In Hand |
| 304 | 01 | $250.00 | $425.00 | $425.00 | | Sold | In Hand |
| | 02 | $500.00 | $850.00 | $850.00 | | | |
| | 03 | | | | | | |

Purchase Order #43591    PO Date: 1/8/03 Payment: Ticket Deposit Confirm: BRENT
Tickets: 2
Profit: $700.00

| 364 | 05 | $350.00 | $650.00 | $0.00 | | In Hand |
| 364 | 05 | $350.00 | $650.00 | $0.00 | | In Hand |
| | 05 | $700.00 | $1,300.00 | $0.00 | | |
| | 06 | | | | | |

*FIG. 65*

6.9 EVENT SALES
PROVIDE SEARCH CRITERIA

EVENT PICKER

HEADLINER: NFL POST SEASON (NFL) ▶    EVENT:
VENUE: ▶    DATE:

[SEARCH] [PRINT]    ☐ SHOW DELETED    ☐ SHOW EXPIRED

| EVENT | VENUE | EVENT DATE | EVENT TIME |
|---|---|---|---|
| AFC CONFERENCE CHAMPIONSHIP – OAKLAND | NETWORK ASSOCIATES | SUNDAY, 01/19/03 | 3:30 PM |
| NFC CONFERENCE CHAMPIONSHIP – SUPER BOWL PACKAGE | VETERANS STADIUM QUALCOMM STADIUM | SUNDAY, 01/19/03 THURSDAY, 01/23/03 | 3:30 PM TBA |
| CHAMPIONSHIP PACKAGE 1/23/03 – FIELD GOAL PACKAGE 1/23/03 – 1/27/03 | GASLAMP PLAZA SUITES HAMPTON INN | THURSDAY, 01/23/03 THURSDAY, 01/23/03 | TBA TBA |
| TOUCHDOWN PACKAGE 1/23/03 – 1/27/03 SAFETY PACKAGE 1/23/03 – 1/27/03 | DOUBLE TREE CLUB RAMADA INN SOUTH | THURSDAY, 01/23/03 THURSDAY, 01/23/03 | TBA TBA |
| HYATT REGENCY ROOM: 1/23 – 1/27 SUPER BOWL XXXVII | HYATT REGENCY (SAN QUALCOMM STADIUM | THURSDAY, 01/23/03 SUNDAY, 01/26/03 | 3:00 PM 3:00 PM |
| SUPER BOWL PACKAGE EXTRA NIGHT SUPER BOWL XXXVII | QUALCOMM STADIUM RELIANT STADIUM (FOOTBALL) | MONDAY, 01/27/03 SUNDAY, 02/01/04 | TBA TBA |
| ▲ | | | |
| SUPER BOWL XI | FORD FIELD | SUNDAY, 02/05/06 | TBA |

SELECT EVENT BY HIGHLIGHTING. SELECT MULTIPLE EVENTS BY SUPPRESSING THE CONTROL OR SHIFT KEYS WHILE HIGHLIGHTING WITH MOUSE.

*FIG. 66*

CLICK THE PRINT BUTTON TO GENERATE THE REPORT

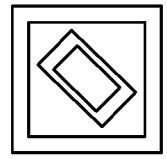

EVENT SALES

SUPER BOWL XXXVII (QUALCOMM STADIUM (FOOTBALL)) SUNDAY, JANURARY 26, 2003  3:00 PM

| INV# | SOLD | REP | CUSTOMER | LOCATION | SOLD | COST | PROFIT |
|---|---|---|---|---|---|---|---|
| 153880 | 12/12/02 | | | SECTION: FIELD 20 ROW:20 SEATS 13 TO 14 | 3,900.00 | 2,700.00 | 1,200.00 |
| 155735 | 1/13/03 | | | SECTION: CLUB 13 ROW: 01 SEATS: 11 TO 13 | 5,850.00 | 4,200.00 | 1,650.00 |
| 155150 | 1/14/03 | | | SECTION: FIELD 08 ROW: 23 SEATS: 07 TO 15 | 27,900.00 | 21,150.00 | 6,750.00 |
| 155689 | 1/15/03 | | | SECTION: CLUB 03 Row: 01 SEATS: 14 TO 15 | 5,900.00 | 4,300.00 | 1,600.00 |
| 155707 | 1/15/03 | | | SECTION: PLAZA 12 ROW: 07 SEATS: 01 TO 02 | 4,100.00 | 3,800.00 | 300.00 |
| 155718 | 1/15/03 | | | SECTION: CLUB 03 ROW: 01 SEATS: 16 TO 17 | 5,900.00 | 4,300.00 | 1,600.00 |
| 155685 | 1/13/03 | | | SECTION: CLUB 03 ROW: 02 SEATS: 08 TO 17 | 29,500.00 | 21,500.00 | 8,000.00 |
| 155725 | 1/13/03 | | | SECTION: VIEW 56 ROW: 13 SEATS: 05 TO 10 | 8,700.00 | 7,200.00 | 1,500.00 |
| 155225 | 1/13/03 | | | SECTION VIEW 56 ROW: 15 SEATS: 15 TO 20 | 5,800.00 | 4,800.00 | 1,000.00 |
| | | | | | 40  97,550.00 | 73,950.00 | 23,000.00 |
| | | | REPORT TOTALS: | | 40  97,550.00 | 73,950.00 | 23,000.00 |

*FIG. 67*

6.10 EVENT SALES TIMELINE (WEEKLY)
6.11 EVENT SALES TIMELINE (DAILY)

EVENT PICKER

HEADLINER: NFL POST SEASON (NFL) ▶  EVENT: _____
VENUE: _____ ▶  DATE: _____

[SEARCH] [PRINT]   ☐ SHOW DELETED   ☐ SHOW EXPIRED

| EVENT | VENUE | EVENT DATE | EVENT TIME |
|---|---|---|---|
| AFC CONFERENCE CHAMPIONSHIP –OAKLAND | NETWORK ASSOCIATES | SUNDAY, 01/19/03 | 3:30 PM |
| NFC CONFERENCE CHAMPIONSHIP- SUPER BOWL PACKAGE | VETERANS STADIUM QUALCOMM STADIUM | SUNDAY, 01/19/03 THURSDAY, 01/23/03 | 3:30 PM TBA |
| CHAMPIONSHIP PACKAGE 1/23/03- FIELD GOAL PACKAGE 1/23/03 – 1/27/03 | GASLAMP PLAZA SUITES HAMPTON INN | THURSDAY, 01/23/03 THURSDAY, 01/23/03 | TBA TBA |
| TOUCHDOWN PACKAGE 1/23/03 – 1/27/03- SAFETY PACKAGE 1/23/03 – 1/27/03 | DOUBLE TREE CLUB RAMADA INN SOUTH | THURSDAY, 01/23/03 THURSDAY, 01/23/03 | TBA TBA |
| HYATT REGENCY ROOM: 1/23 - 1/27 SUPER BOWL XXXVII | HYATT REGENCY (SAN QUALCOMM STADIUM | THURSDAY, 01/23/03 SUNDAY, 01/26/03 | 3:00 PM 3:00 PM |
| SUPER BOWL PACKAGE EXTRA NIGHT SUPER BOWL XXXVII | QUALCOMM STADIUM RELIANT STADIUM (FOOTBALL) | MONDAY, 01/27/03 SUNDAY, 02/01/04 | TBA TBA |
| ▲ | | | |
| SUPER BOWL XI | FORD FIELD | SUNDAY, 02/05/06 | TBA |

PROVIDE SEARCH CRITERIA.

SELECT EVENT BY HIGHLIGHTING, SELECT MULTIPLE EVENTS BY SUPPRESSING THE CONTROL OR SHIFT KEYS WHILE HIGHLIGHTING WITH MOUSE.

FIG. 68

SELECT THE PRINT BUTTON TO GENERATE THE REPORT

WEEKLY SALES BY CATEGORY

EVENT ID: 110,289  SUPER BOWL XXXVII  SUNDAY, JANUARY 26, 2003
              QUALCOMM STADIUM (FOOTBALL)  3:00 PM

WEEK 3  MONDAY, JANUARY 13, 2003

| | | QTY | AVG. PRICE | AVG. COST | PROFIT |
|---|---|---|---|---|---|
| LOWER LEVEL GOAL TO 30 YARD LINE | B | 27 | $2,985.48 | $2,231.48 | $20,350.00 |
| LOWER LEVEL CORNER ENDZONE | C | 16 | $1,901.56 | $1,525.00 | $6,025.00 |
| LOWER LEVEL ENDZONE | D | 8 | $1,806.25 | $1,176.25 | $5,040.00 |
| UPPER LEVEL ENDZONE | H | 10 | $1,450.00 | $1,200.00 | $2,500.00 |
| | | 61 | $139,975.00 | $106,060.00 | $33,915.00 |

*FIG. 69*

6.12 EVENT PURCHASES TIMELINE (WEEKLY)

EVENT PICKER

HEADLINER: NFL POST SEASON (NFL)  EVENT:
VENUE:  DATE:

SEARCH   PRINT        ☐ SHOW DELETED   ☐ SHOW EXPIRED

| EVENT | VENUE | EVENT DATE | EVENT TIME |
|---|---|---|---|
| AFC CONFERENCE CHAMPIONSHIP –OAKLAND | NETWORK ASSOCIATES | SUNDAY, 01/19/03 | 3:30 PM |
| NFC CONFERENCE CHAMPIONSHIP- SUPER BOWL PACKAGE | VETERANS STADIUM QUALCOMM STADIUM | SUNDAY, 01/19/03 THURSDAY, 01/23/03 | 3:30 PM TBA |
| CHAMPIONSHIP PACKAGE 1/23/03- FIELD GOAL PACKAGE 1/23/03 – 1/27/03 | GASLAMP PLAZA SUITES HAMPTON INN | THURSDAY, 01/23/03 THURSDAY, 01/23/03 | TBA TBA |
| TOUCHDOWN PACKAGE 1/23/03 – 1/27/03- SAFETY PACKAGE 1/23/03 – 1/27/03 | DOUBLE TREE CLUB RAMADA INN SOUTH | THURSDAY, 01/23/03 THURSDAY, 01/23/03 | TBA TBA |
| HYATT REGENCY ROOM: 1/23 - 1/27 SUPER BOWL XXXVII | HYATT REGENCY (SAN QUALCOMM STADIUM | THURSDAY, 01/23/03 SUNDAY, 01/26/03 | 3:00 PM 3:00 PM |
| SUPER BOWL PACKAGE EXTRA NIGHT SUPER BOWL XXXVII | QUALCOMM STADIUM RELIANT STADIUM (FOOTBALL) | MONDAY, 01/27/03 SUNDAY, 02/01/04 | TBA TBA |
|  |  |  |  |
| SUPER BOWL XI | FORD FIELD | SUNDAY, 02/05/06 | TBA |

▲

PROVIDE SEARCH CRITERIA.

SELECT EVENT BY HIGHLIGHTING, SELECT MULTIPLE EVENTS BY SUPPRESSING THE CONTROL OR SHIFT KEYS WHILE HIGHLIGHTING WITH MOUSE.

*FIG. 70*

SELECT THE PRINT BUTTON TO GENERATE THE REPORT.

EVENT ID: 110,289  SUPER BOWL XXXVII
QUALCOMM STADIUM (FOOTBALL)
SUNDAY, JANUARY 26, 2003
3:00 PM

WEEK 2  FRIDAY, JANUARY 10, 2003

| | | QTY | AVG. PRICE | AVG. COST |
|---|---|---|---|---|
| LOWER LEVEL CORNER ENDZONE | C | 2 | $1,775.00 | $1,350.00 |
| UPPER LEVEL CORNER ENDZONE | G | 4 | $0.00 | $1,250.00 |

WEEK 3  MONDAY, JANUARY 13, 2003

| | | QTY | AVG. PRICE | AVG. COST |
|---|---|---|---|---|
| LOWER LEVEL 25 TO 50 YARD LINE | A | 9 | $0.00 | $3,138.89 |
| LOWER LEVEL GOAL TO 30 YARD LINE | B | 28 | $2,878.57 | $2,201.79 |
| LOWER LEVEL CORNER ENDZONE | C | 26 | $1,304.81 | $1,448.08 |
| LOWER LEVEL ENDZONE | D | 12 | $1,204.17 | $1,217.50 |
| UPPER LEVEL CORNER ENDZONE | G | 2 | $0.00 | $1,250.00 |
| UPPER LEVEL ENDZONE | H | 10 | $1,450.00 | $1,200.00 |

GRAND TOTALS FOR EVENT

| | | QTY | AVG PRICE | AVG COST |
|---|---|---|---|---|
| LOWER LEVEL 25 TO 50 YARD LINE | A | 9 | $0.00 | $3,138.89 |
| LOWER LEVEL GOAL TO 30 YARD LINE | B | 28 | $2,878.57 | $2,201.79 |
| LOWER LEVEL CORNER ENDZONE | C | 28 | $1,338.39 | 1,441.07 |
| LOWER LEVEL ENDZONE | D | 12 | $1,204.17 | $1,217.50 |
| UPPER LEVEL CORNER ENDZONE | G | 6 | $0.00 | $1,250.00 |
| UPPER LEVEL ENDZONE | H | 10 | $1,450.00 | $1,200.00 |

FIG. 71

6.13 EVENT PROFIT/SITUATION
6.13.1 CURRENT EVENTS AUTOMATICALLY GENERATES

EVENT PROFIT SITUATION

1/11/2001

| EVENT ID | EVENT | # SOLD | # UNSOLD | SOLD TICKETS | | | EVENT TOTALS | | OPEN TICKET TOTALS | | FIRST SALE DATE & TIME |
|---|---|---|---|---|---|---|---|---|---|---|---|
| | | | | SOLD FOR | SUM COST | SOLD PROFIT | COST | PROFIT | LIST PRICE | COST | |
| 100,216 | XXXXXX VALID IS XXX LABOR LOCAL ENERGY COMBO BRIDGE 1/20/03 7:01 PM | 2 | | $150.00 | $100.00 | $200.00 | $190.00 | $100.00 | $0.00 | $0.00 | 1/14/03 XXX |
| | AVERAGE | | | $125.00 | $130.00 | $130.00 | $195.00 | $130.00 | $0.00 | $0.00 | |
| 100,216 | XXXXXX VALID IS XXX LABOR LOCAL ENERGY COMBO BRIDGE 1/20/03 7:01 PM | 4 | | $120.00 | $100.00 | $110.00 | $200.00 | $140.00 | $0.00 | $0.00 | 12/30/02 3:15 PM |
| | AVERAGE | | | $105.00 | $70.00 | $55.00 | $70.00 | $35.00 | $0.00 | $0.00 | |
| 100,216 | XXXXXX VALID IS XXX LABOR LOCAL ENERGY COMBO BRIDGE 1/20/03 7:01 PM | 2 | | $300.00 | $150.00 | $110.00 | $190.00 | $110.00 | $0.00 | $0.00 | 12/30/02 6:10 PM |
| | AVERAGE | | | $130.00 | $55.00 | $25.00 | $55.00 | $130.00 | $0.00 | $0.00 | |

*FIG. 72*

6.13.2 SELECTED EVENT

EVENT PICKER

HEADLINER: NFL POST SEASON (NFL)     EVENT:
VENUE:     DATE:

[SEARCH] [PRINT]    ☐ SHOW DELETED    ☐ SHOW EXPIRED

| EVENT | VENUE | EVENT DATE | EVENT TIME |
|---|---|---|---|
| AFC CONFERENCE CHAMPIONSHIP –OAKLAND | NETWORK ASSOCIATES | SUNDAY, 01/19/03 | 3:30 PM |
| NFC CONFERENCE CHAMPIONSHIP- SUPER BOWL PACKAGE | VETERANS STADIUM QUALCOMM STADIUM | SUNDAY, 01/19/03 THURSDAY, 01/23/03 | 3:30 PM TBA |
| CHAMPIONSHIP PACKAGE 1/23/03- FIELD GOAL PACKAGE 1/23/03 – 1/27/03 | GASLAMP PLAZA SUITES HAMPTON INN | THURSDAY, 01/23/03 THURSDAY, 01/23/03 | TBA TBA |
| TOUCHDOWN PACKAGE 1/23/03 – 1/27/03- SAFETY PACKAGE 1/23/03 – 1/27/03 | DOUBLE TREE CLUB RAMADA INN SOUTH | THURSDAY, 01/23/03 THURSDAY, 01/23/03 | TBA TBA |
| HYATT REGENCY ROOM: 1/23 - 1/27 SUPER BOWL XXXVII | HYATT REGENCY (SAN QUALCOMM STADIUM | THURSDAY, 01/23/03 SUNDAY, 01/26/03 | 3:00 PM 3:00 PM |
| SUPER BOWL PACKAGE EXTRA NIGHT SUPER BOWL XXXVII | QUALCOMM STADIUM RELIANT STADIUM (FOOTBALL) | MONDAY, 01/27/03 SUNDAY, 02/01/04 | TBA TBA |
| | | | |
| SUPER BOWL XI | FORD FIELD | SUNDAY, 02/05/06 | TBA |

▲

PROVIDE SEARCH CRITERIA.

SELECT EVENT BY HIGHLIGHTING. SELECT MULTIPLE EVENTS BY SUPPRESSING THE CONTROL OR SHIFT KEYS WHILE HIGHLIGHTING WITH MOUSE.

*FIG. 73*

| Daily Sales Report | | | |
|---|---|---|---|
| Date | S&H Price | Cost | Profit |
| Tuesday, January 14, 2003 | 90,965.00 | 67,968.00 | 22,997.00 |
| Monday, January 13, 2003 | 70,860.00 | 52,184.41 | 23,675.59 |
| Friday, January 10, 2003 | 22,105.00 | 14,834.58 | 7,270.42 |
| Thursday, January 9, 2003 | 29,343.25 | 18,987.22 | 10.356.03 |
| Wednesday, January 8, 2003 | 18,675.00 | 11,012.57 | 7,662.43 |
| Tuesday, January 7, 2003 | 27,690.00 | 18,040.32 | 9,649.68 |
| Monday, January 6, 2003 | 30,313.50 | 27,292.91 | 3,024.60 |
| Saturday, January 4, 2003 | 2,015.00 | 1,390.00 | 625.00 |

*FIG. 74*

MANAGING TRANSACTIONS OF BROKER AFFILIATES

CROSS-REFERENCE TO RELATED APPLICATIONS

This patent application is a continuation of U.S. patent application Ser. No. 13/489,310 titled "MANAGING TRANSACTIONS OF BROKER AFFILIATES" filed on Jun. 5, 2012, which is a continuation of U.S. patent application Ser. No. 12/876,216 titled "MANAGING TRANSACTIONS OF BROKER AFFILIATES" filed on Sep. 9, 2010, which issued as U.S. Pat. No. 8,204,796 on Jun. 19, 2012, which is a continuation of U.S. patent application Ser. No. 10/606,086 titled "METHODS AND COMPUTER-READABLE STORAGE DEVICES FOR MANAGING TRANSACTIONS WITH MULTIPLE BROKER AFFILIATES" filed on Jun. 25, 2003, which issued as U.S. Pat. No. 7,792,700 on Sep. 7, 2010, and which are incorporated herein by reference as part of the present disclosure.

BACKGROUND OF THE INVENTION

1. Field of the Invention

The present invention relates generally to automated transaction management, and in particular to a system and method for managing e-commerce transactions using an Internet (world wide web) based distributed network with a central exchange server networked to multiple broker computers.

2. Discussion of the Related Art

Various systems and methodologies have previously been developed for managing commercial transactions involving buyers, sellers, brokers, agents and other participants. The objects of the transactions can comprise goods and/or services.

The Internet (world wide web) has produced many opportunities for transacting business quickly and efficiently, as compared to more traditional business transaction methods. Transacting business via the Internet is sometimes referred to as "electronic commerce" or "e-commerce". Among its many advantages is the ability to provide virtually instantaneous, i.e. "real-time", communication among the participants. Orders can be instantly taken and processed online from Internet-linked terminals located all over the world.

The instantaneous, real-time aspect of e-commerce particularly lends itself to date-sensitive transactions, i.e. those presenting relatively limited opportunities for concluding transactions. For example, tickets to date-specific events and for date-specific services generally become worthless after expiration. Sporting and entertainment events are typically booked months in advance and tickets are presold through various distribution trade channels and ticket outlets, including e-commerce. The sports and entertainment industries allocate considerable resources to matching ticket demand and supply in order to maximize event attendance and revenue. Although large portions of available seats are presold months in advance, tickets are often in high demand up to the last minute. Therefore, an efficient distribution model for tickets to date-specific events and services would match sellers holding tickets with buyers in the largest possible customer base, and provide instantaneous, real-time access to such information.

Ticket brokers operating in many areas buy and sell tickets to various sports and entertainment events. Although the markets tend to be somewhat localized to particular venues, transactions are routinely done on a national or even international basis. For example, through their web pages ticket brokers may encounter opportunities to purchase tickets from sellers and sell tickets to buyers in global markets. Moreover, ticket distribution lends itself to broker-to-broker ("B2B") transactions as different brokers trade amongst themselves in order to fulfill specific customer requests. However, automating ticket transactions among brokers with different inventories and marketing objectives can involve handling large amounts of data. A need therefore exists for automating the management of e-commerce transactions involving tickets and other goods and services.

Heretofore there has not been available a transaction management system and method with the advantages and features of the present invention.

BRIEF DESCRIPTION OF THE INVENTION

In the practice of one aspect of the present invention, a system is provided for managing commercial transactions. The system includes a distributed network comprising a central exchange computer linked to multiple customer/vendor computer systems. Transaction objects comprising goods and/or services can be bought and sold using various flexible, redefinable rules governing various aspects of the transactions. The system is adapted to interface with other automated business systems, including shipping and bookkeeping.

BRIEF DESCRIPTION OF THE DRAWINGS

The drawings constitute a part of this specification and include exemplary embodiments of the present invention and illustrate various objects and features thereof.

FIG. 3 is a table showing broker transaction rules.

FIG. 6 is a block diagram showing components of the system.

FIGS. 7-9 are screen displays from a special order system (SOS) showing examples of functions.

FIG. 10 is a flowchart of a point-of-sale (POS) system transaction.

FIG. 12 illustrates an example screen display for another version of the software from the point-of-sale (POS) system.

Figure 13A:
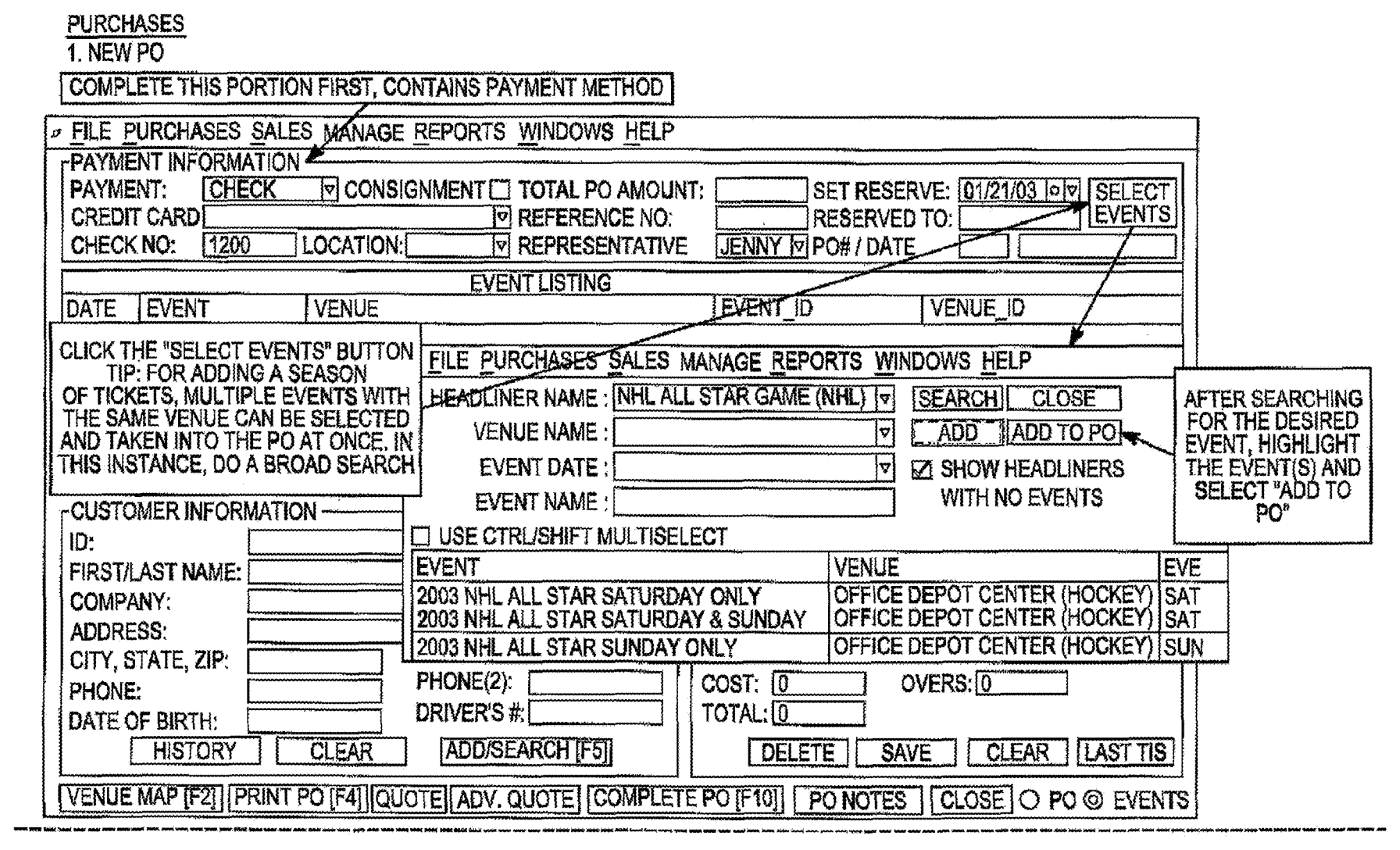
Figure 13B:
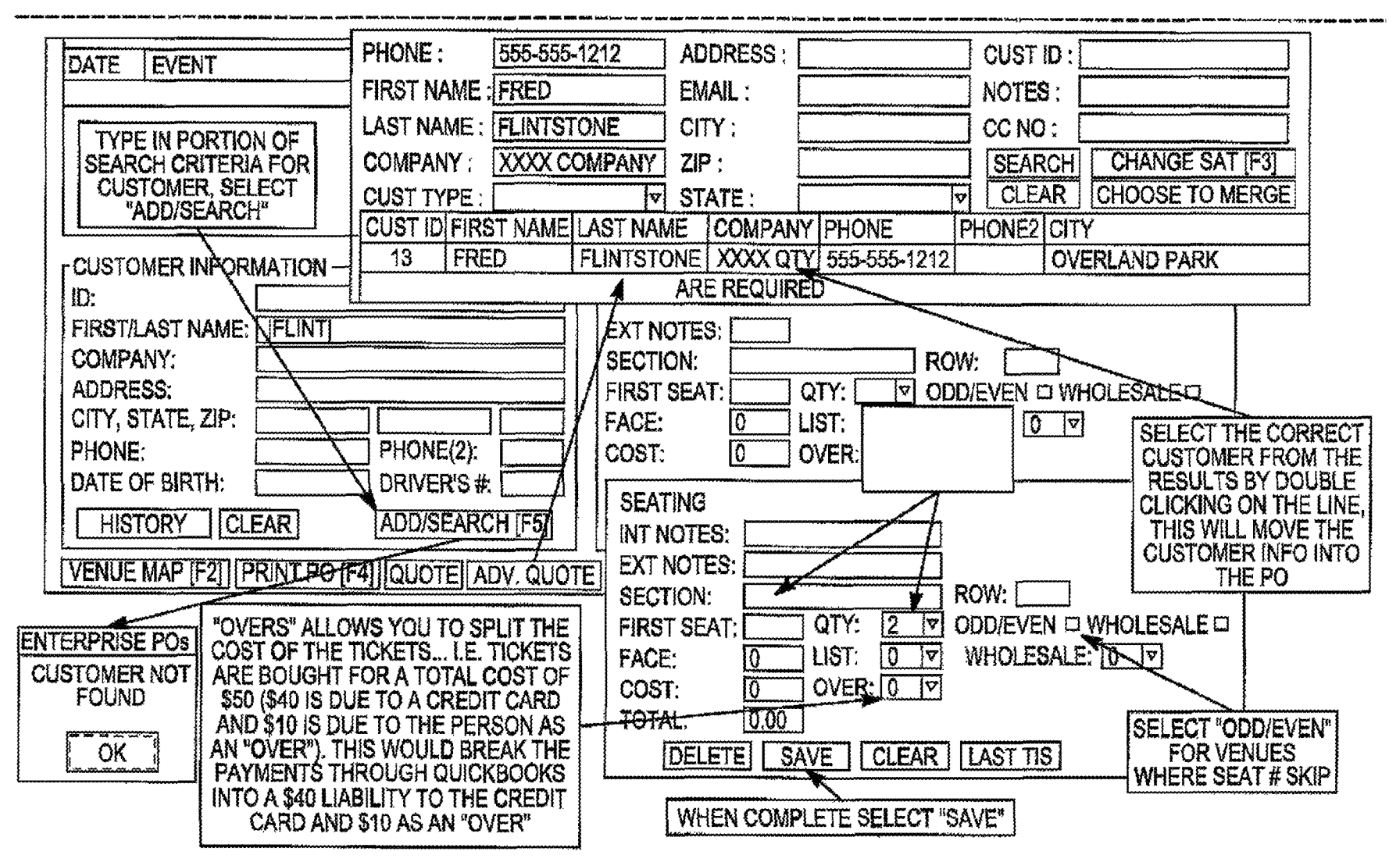

FIGS. 13A-13B illustrate an example screen display for entering a new purchase order (PO), with FIG. 13A representing a first portion of the screen display and FIG. 13B representing a second portion of the screen display from the point of sale (POS) system.

FIG. 14 illustrates an example screen display for searching POs from the point of sale (POS) system.

Figure 15B:
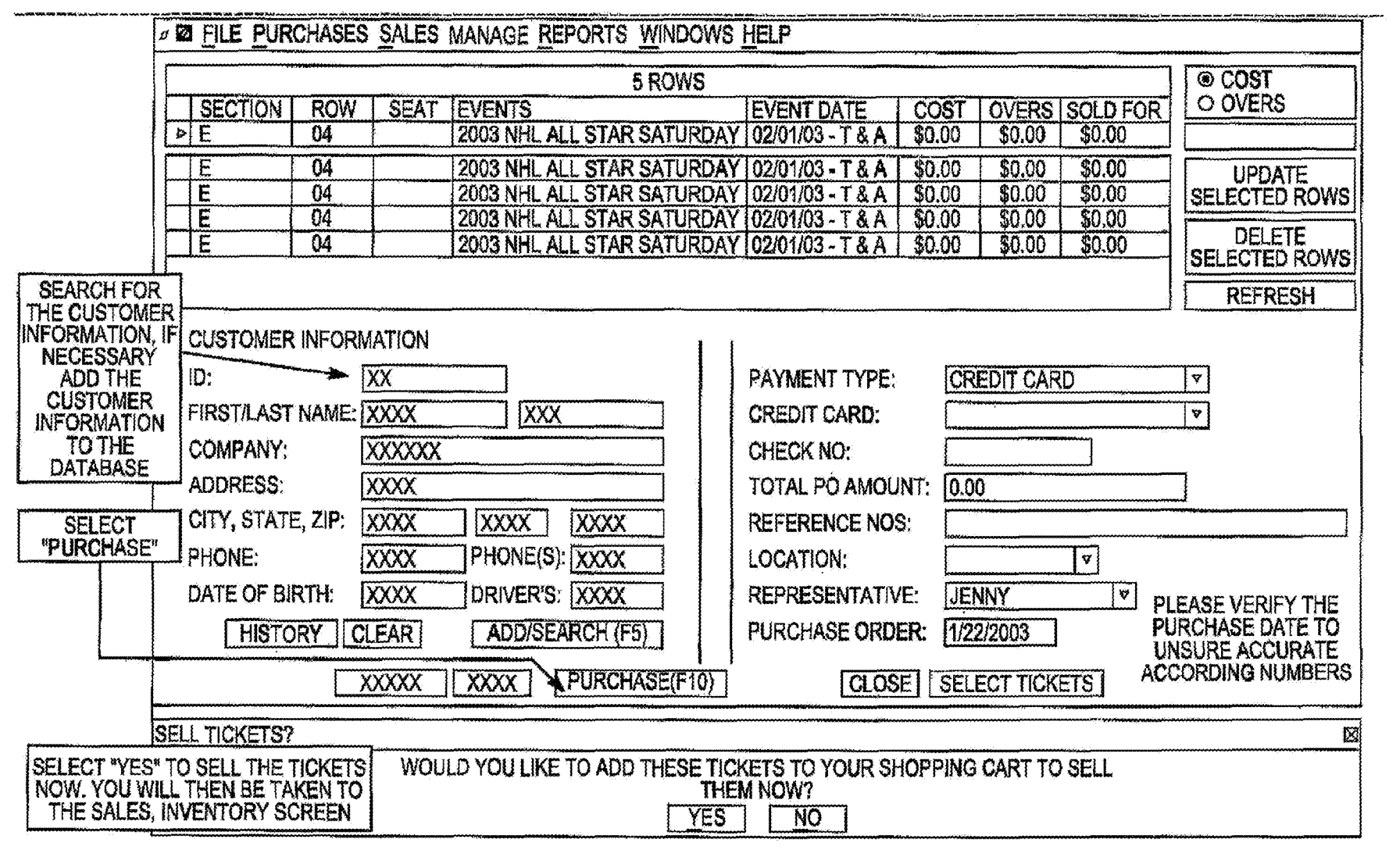

FIG. 15A-15B illustrate an example screen display for creating mass PO tickets, with FIG. 15A representing a first portion of the screen display and FIG. 15B representing a second portion of the screen display from the point of sale (POS) system.

FIG. 16 illustrates an example screen display for searching for mass POs, advanced quotes or cancelled POs from the point-of-sale (POS) system.

FIG. 17 illustrates an example screen display for reviewing sold tickets on advanced quotes from the point-of-sale (POS) system.

FIG. 18 illustrates an example screen display for the PO queue from the point-of-sale (POS) system.

Figure 19A:
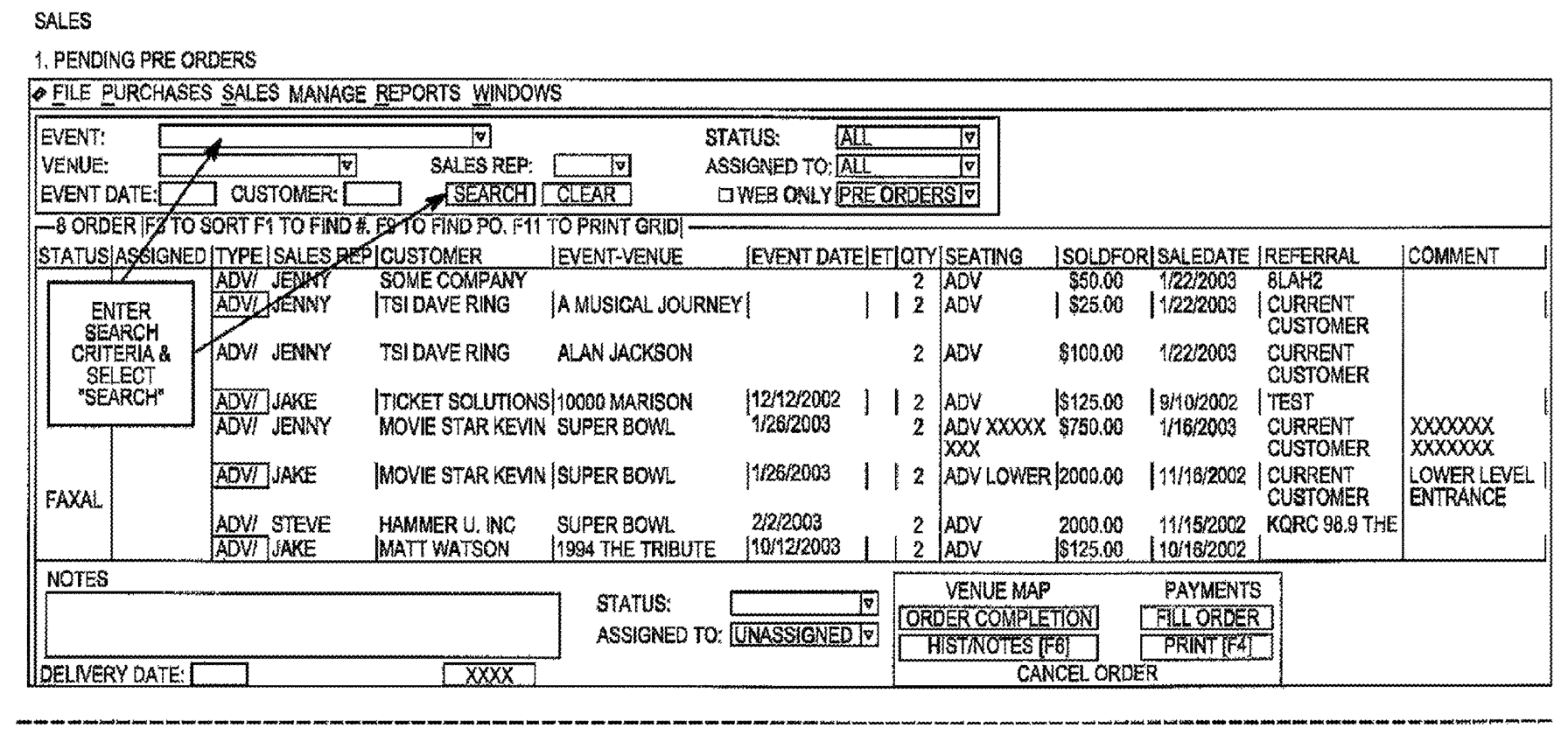

FIG. 19A-19B illustrates an example screen display for searching pending preorders, with FIG. 19A representing a first portion of the screen display and FIG. 19B representing a second portion of the screen display from the point of sale (POS) system.

FIG. 20 illustrates an example screen display for reviewing order completion from the point-of-sale (POS) system.

Figure 21:
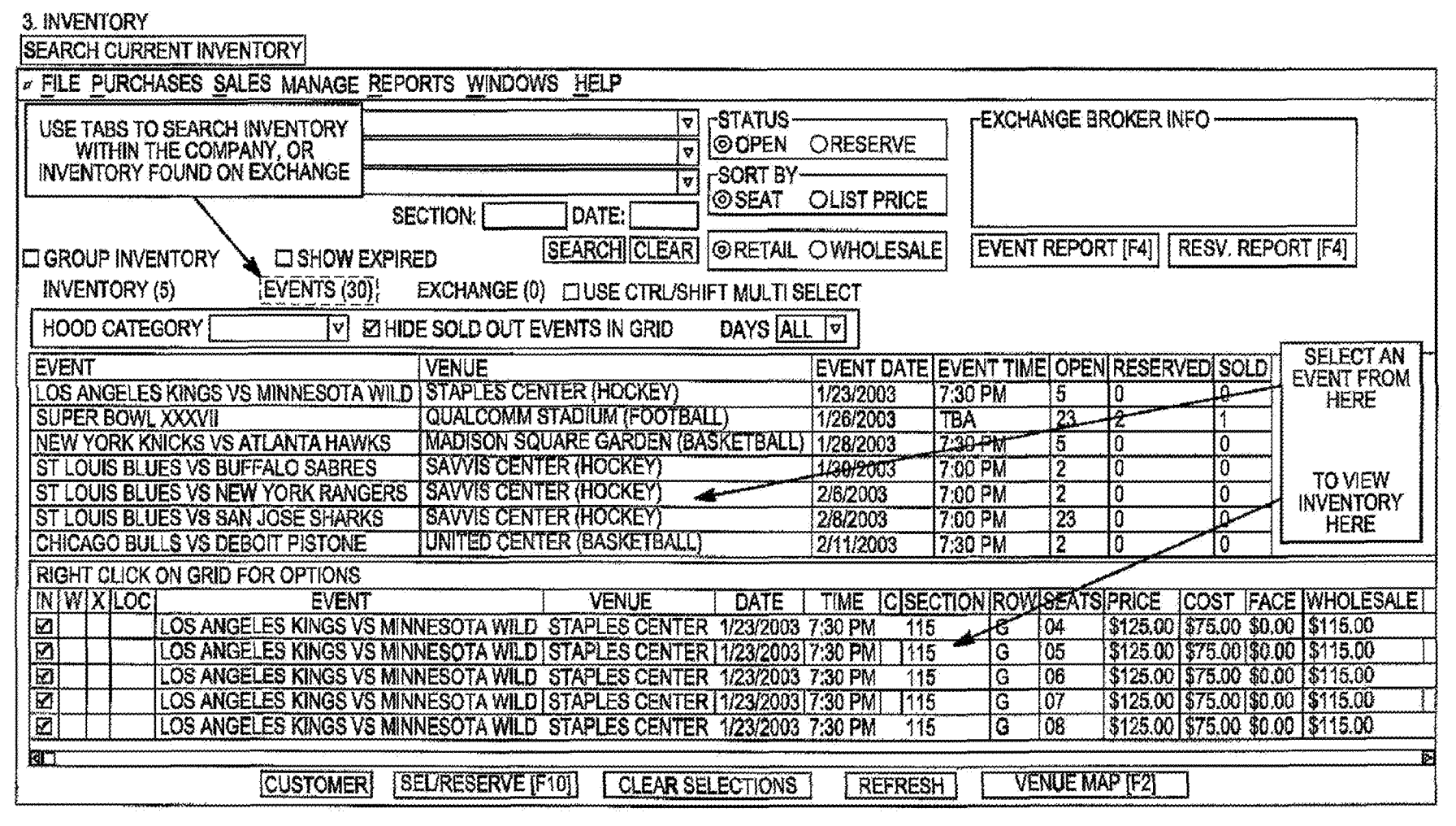

FIG. 21 illustrates an example screen display for searching inventory from the point-of-sale (POS) system.

Figure 22:
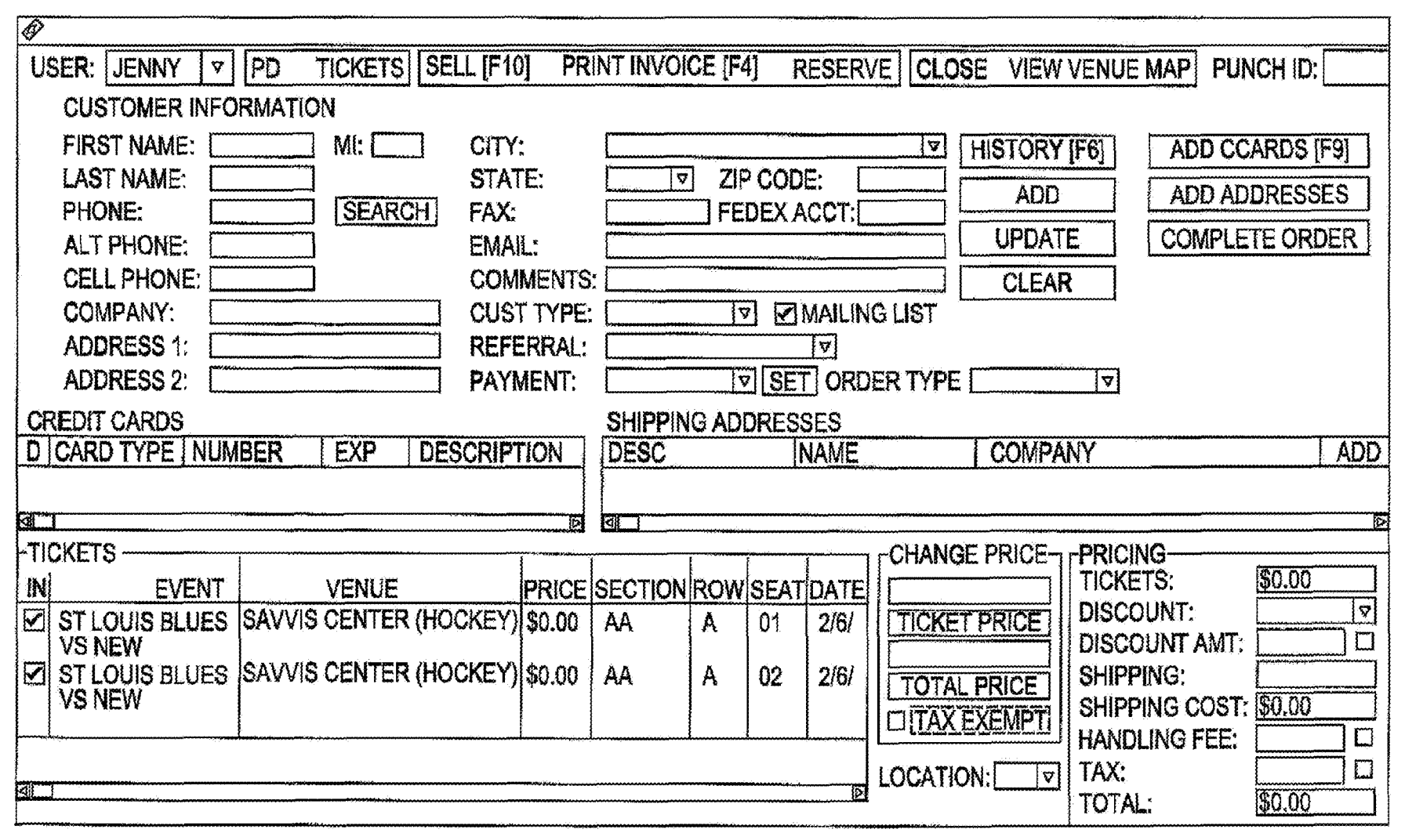

FIG. 22 illustrates an example screen display when the "Set/Reserve" option is selected from the point-of-sale (POS) system.

FIG. 23 illustrates an example screen display for event pre orders from the point of sale (POS) system.

FIG. 24 illustrates another example screen display for event pre orders from the point of sale (POS) system.

FIG. 25 illustrates example screen displays for deposit payment types from the point of sale (POS) system.

FIG. 27 illustrates an example screen display for retrieving exchange broker information from the point of sale (POS) system.

FIG. 28 illustrates an example inventory management screen display from the point of sale (POS) system.

FIG. 29 illustrates another example inventory management screen display from the point of sale (POS) system.

FIG. 31 illustrates an example screen display for pre order pricing with price and quantity settings from a point of sale (POS) system.

FIG. 32 illustrates an example screen display for a buyers credit card list from a point of sale (POS) system.

FIG. 33 illustrates an example screen display for adding headliners for events to the brokers' databases from a point of sale (POS) system.

FIG. 36 illustrates an example shopping cart screen display from a point of sale (POS) system.

FIG. 37 illustrates an example broker-to-broker (B2B) screen display for broker to broker settings from a point of sale (POS) system.

Figure 38A:
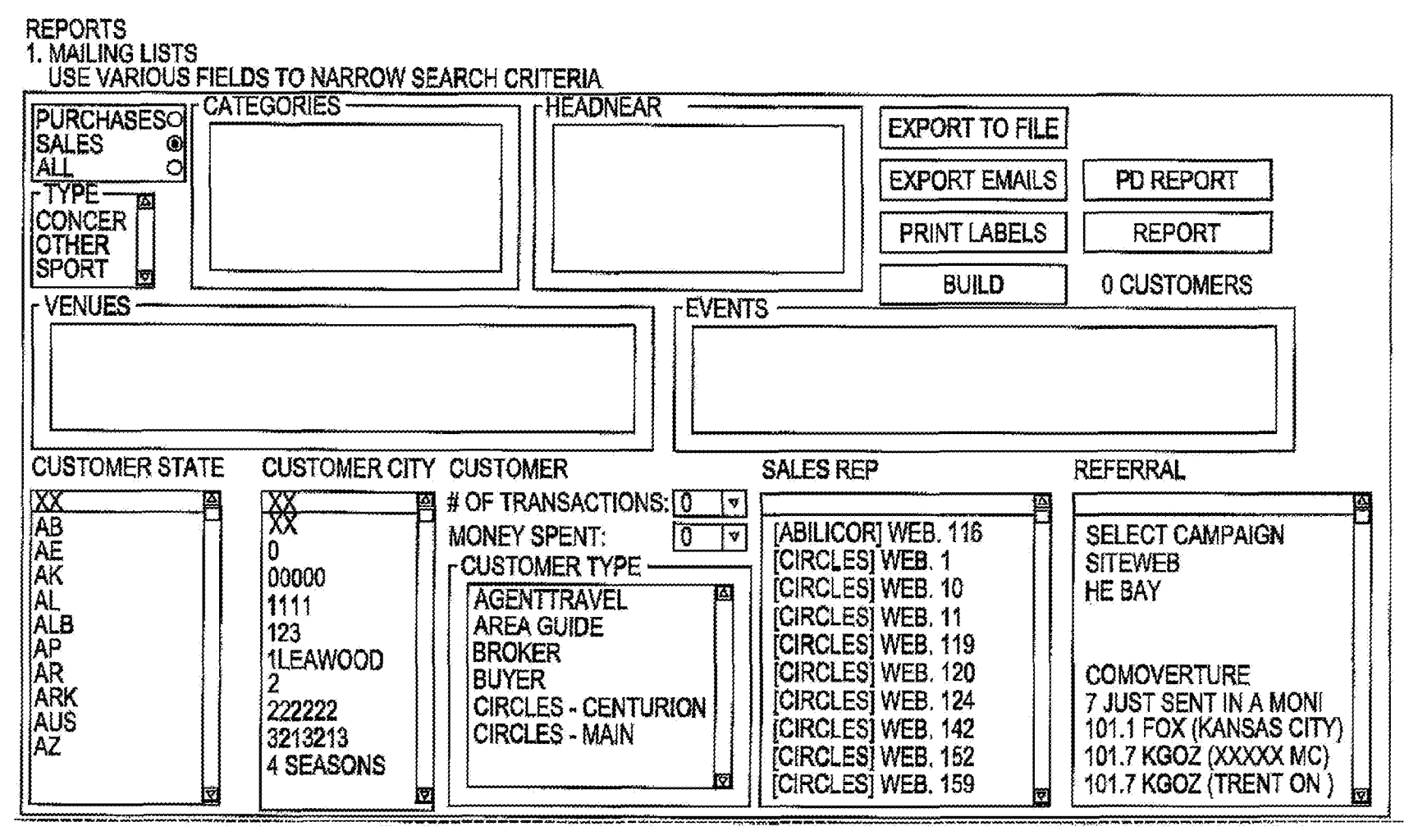
Figure 38B:
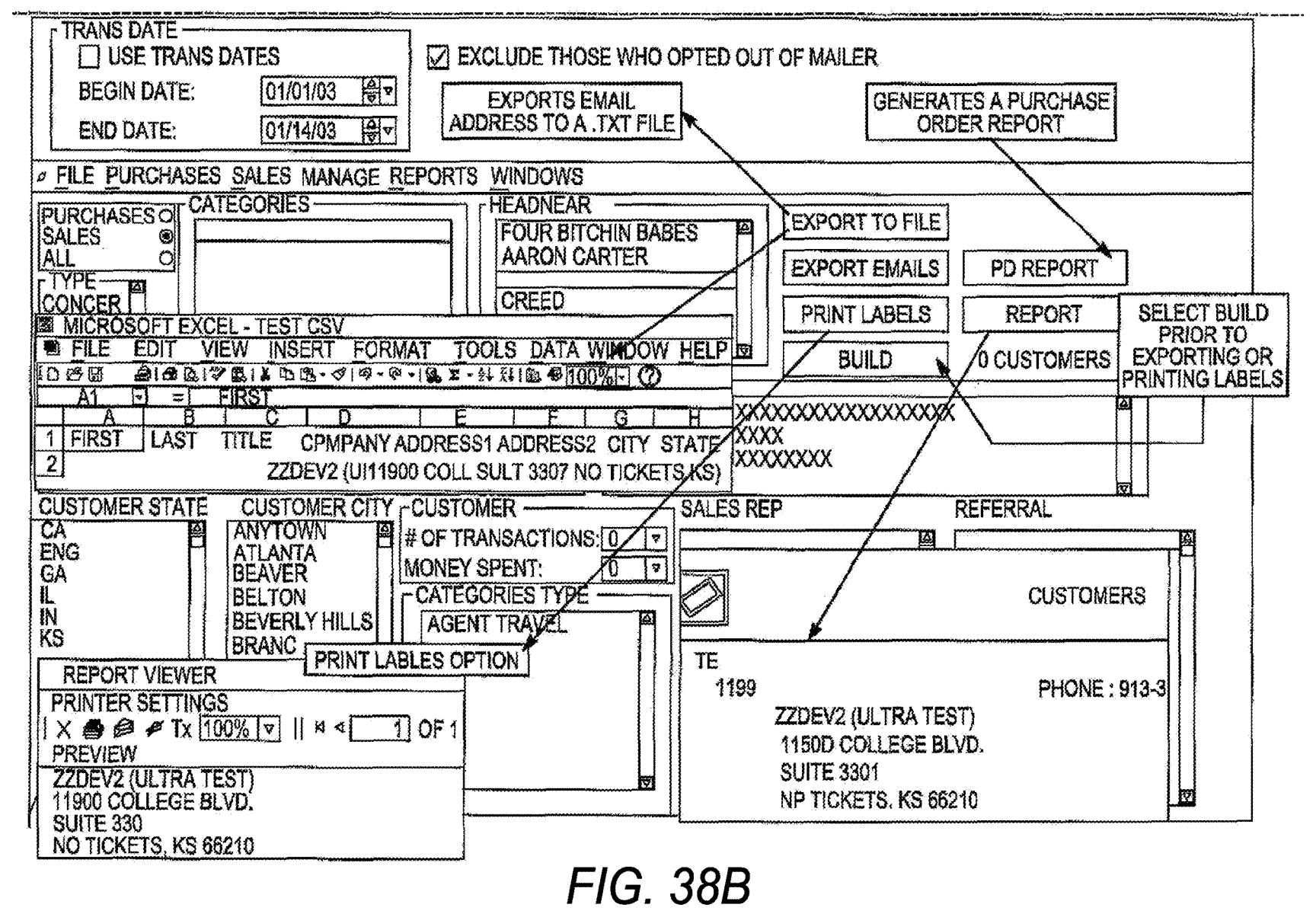

FIG. 38A-38B illustrate a mailing list screen display for reporting, with FIG. 38A representing a first portion of the mailing list screen display and FIG. 38B representing a second portion of the mailing list screen display from the point of sale (POS) system.

FIG. 39 illustrates an example screen display for reporting events from a point of sale (POS) system.

FIG. 40 illustrates an example screen display for current events from a point of sale (POS) system.

FIG. 41 illustrates an example screen display for a sold tickets search utility from a point of sale (POS) system.

FIG. 42 illustrates an example screen display for reporting a sold ticket from a point of sale (POS) system.

FIG. 43 illustrates an example screen display for reporting a reserve ticket list from a point of sale (POS) system.

FIG. 45 illustrates an example screen display for reporting tickets with no purchase orders from a point of sale (POS) system.

FIG. 47 illustrates an example screen display for reporting a fax list search from a point of sale (POS) system.

FIG. 49 illustrates an example screen display for reporting a fax list for a number of days from a point of sale (POS) system.

FIG. 50 illustrates an example screen display of a sample inventory report from a point of sale (POS) system.

FIG. 51 illustrates an example screen display for a shipping register from a point of sale (POS) system.

Figure 52:
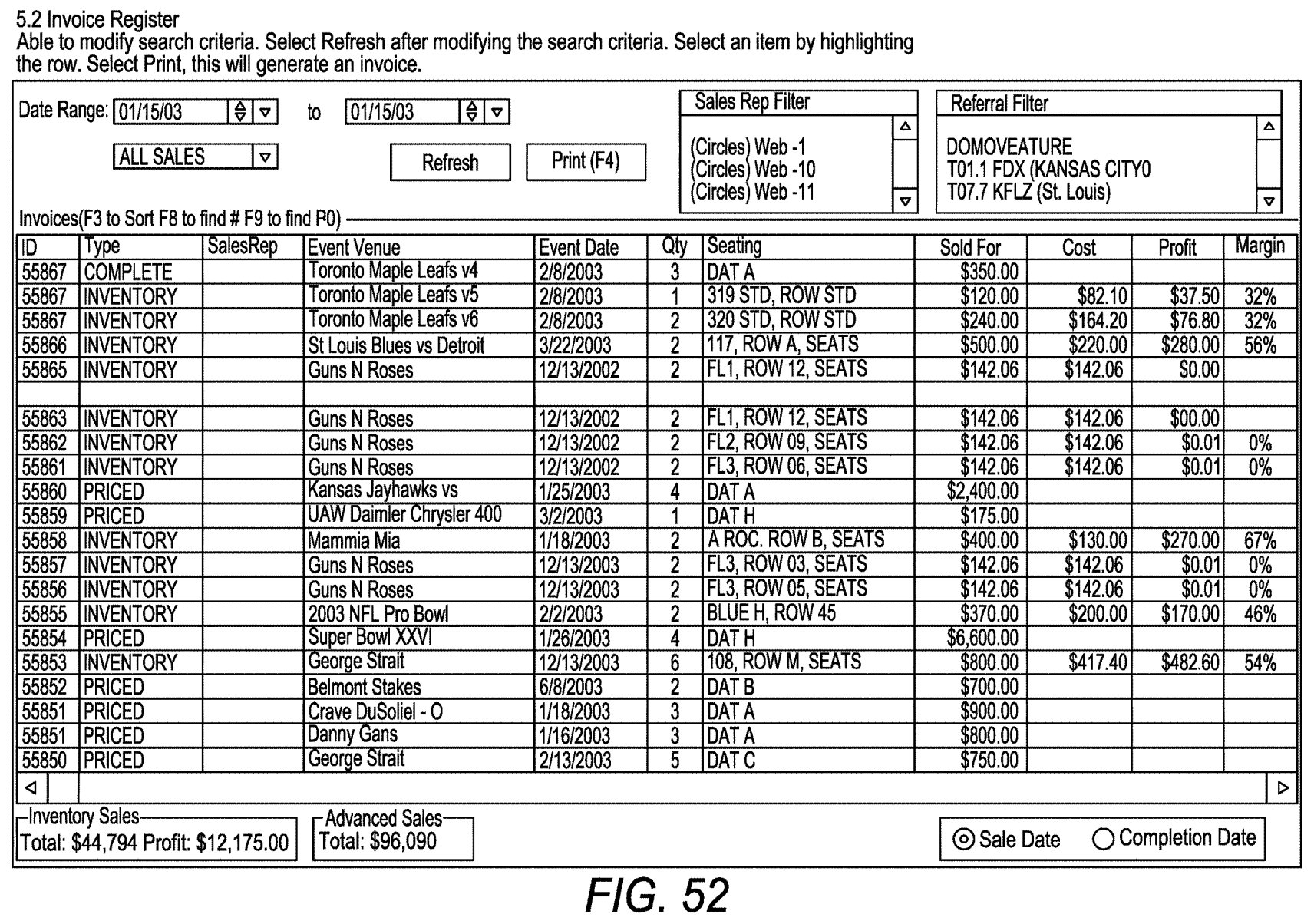

FIG. 52 illustrates an example screen display for an invoicing register from a point of sale (POS) system.

FIG. 53 illustrates an example screen display for a PO register from a point of sale (POS) system.

FIG. 54 illustrates an example screen display for a web sales register from a point of sale (POS) system.

FIG. 55 illustrates an example screen display for exchange transactions from a point of sale (POS) system.

FIG. 56 illustrates an example screen display for reporting sales by event from a point of sale (POS) system.

FIG. 57 illustrates an example screen display for reporting sales by payment type from a point of sale (POS) system.

Figure 61:
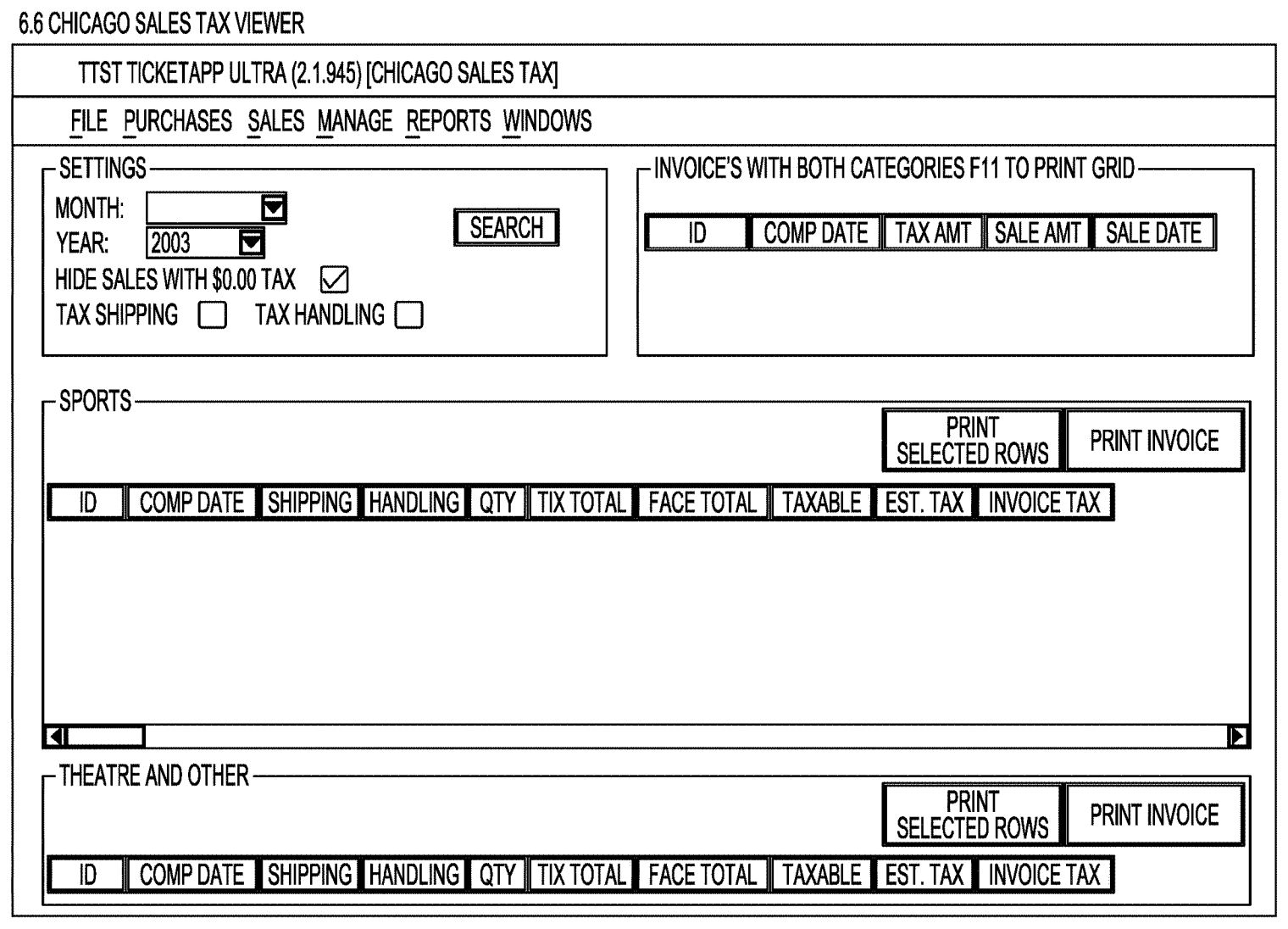

FIG. 61 illustrates an example screen display for reporting tax information pertinent to the city of Chicago from a point of sale (POS) system.

FIG. 62 illustrates another example screen display for reporting tax information pertinent to the city of Chicago from a point of sale (POS) system.

FIG. 65 illustrates an example screen display for reporting POs by event from a point of sale (POS) system.

FIG. 66 illustrates an example screen display for searching events sales from a point of sale (POS) system.

FIG. 67 illustrates an example screen display for reporting event sales from a point of sale (POS) system.

FIG. 68 illustrates an example screen display for weekly event sales timeline from a point of sale (POS) system.

FIG. 69 illustrates an example screen display for reporting weekly sales by category from a point of sale (POS) system.

FIG. 70 illustrates an example screen display for searching weekly event purchases from a point of sale (POS) system.

FIG. 71 illustrates an example screen display for reporting weekly purchases from a point of sale (POS) system.

FIG. 72 illustrates an example screen display for reporting event profits from a point of sale (POS) system.

FIG. 73 illustrates an example screen display for searching selected events from a point of sale (POS) system.

FIG. 74 illustrates an example screen display for reporting daily sales from a point of sale (POS) system.

DETAILED DESCRIPTION OF THE INVENTION

As required, detailed embodiments and/or aspects of the present invention are disclosed herein; however, it is to be understood that the disclosed embodiments/aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
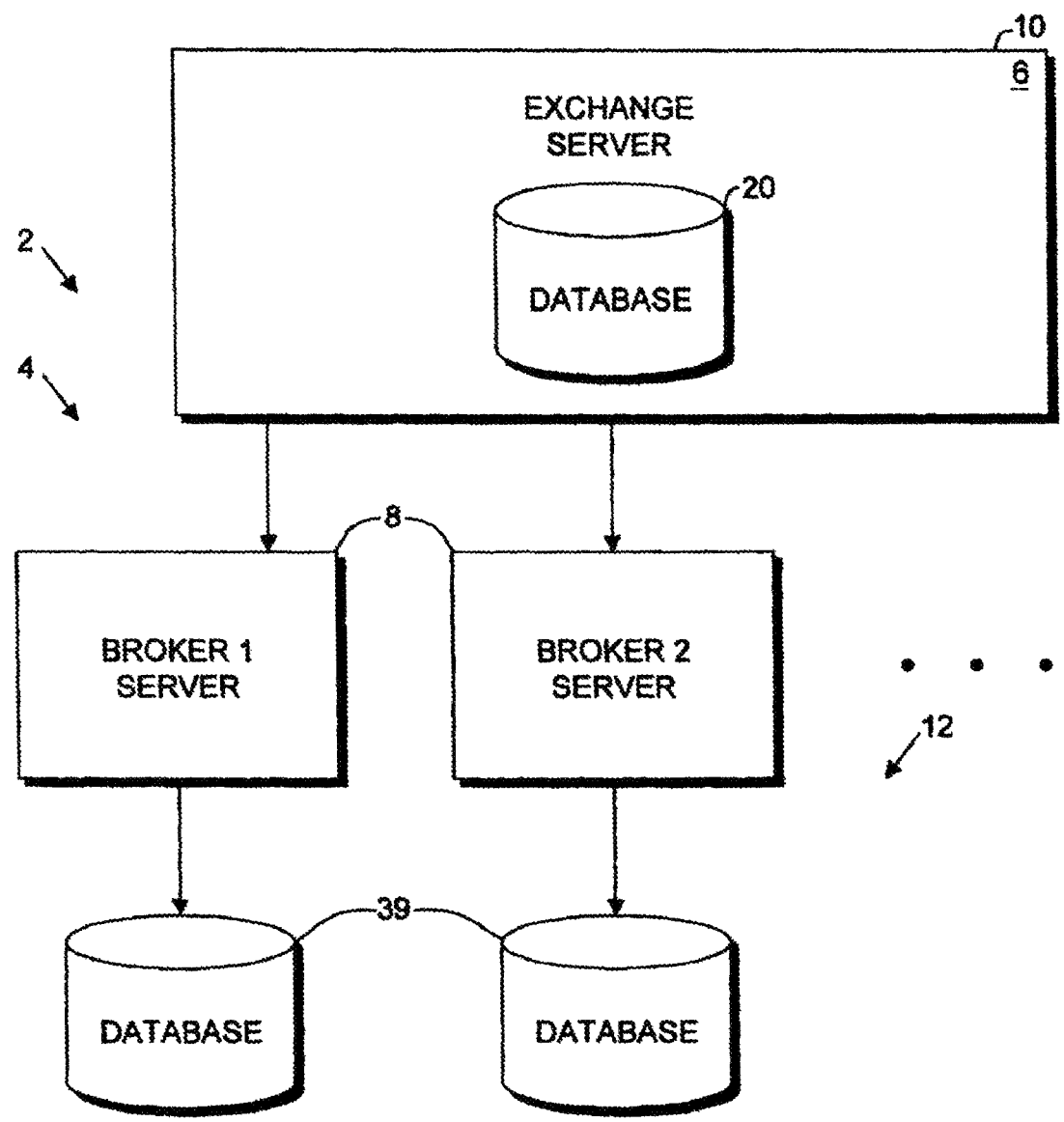
FIG. 1 is a block diagram showing a distributed network embodying one aspect of the system of the present invention.

Referring to the drawings in more detail, the reference numeral 2 generally designates a system for managing e-commerce transactions utilizing a distributed network 4 with a central exchange computer system 6 and multiple remote computer systems 8 (FIG. 1), Without limitation on the generality of useful applications of the system 2, an exemplary aspect or application thereof is described in connection with transactions involving tickets to events, such as sporting events, entertainment and theater. The distribution system for such merchandise includes a central administrator 10 associated with the central exchange computer 6 and a network of point-of-sale (POS) ticket brokers, affiliates or dealers 12 associated with respective remote computers 8. The ticket brokers 12 typically buy from and sell to their respective customers, who can comprise individual end users 14. The customers can also comprise other brokers 12 in connection with broker-to-broker (B2B) transactions.

Figure 2:
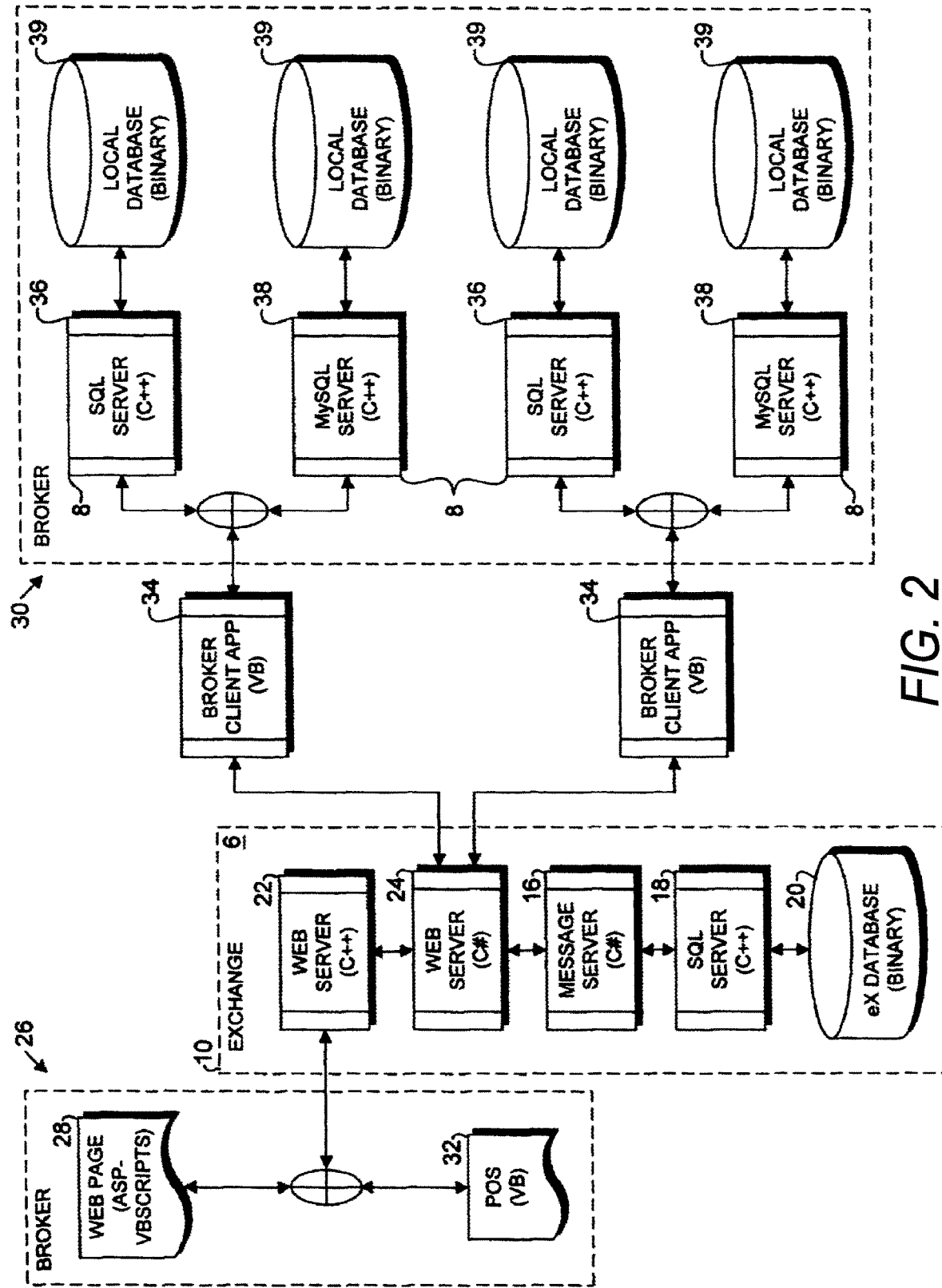
FIG. 2 is a block diagram of the distributed network, showing components thereof.

FIG. 2 shows the central exchange system 6 with a message server 16 connected to an SQL server 18, which accesses an exchange database 20. An exchange web service 22 connects the message server 16 to a web server 24. The components of the system 2 can be programmed with a number of different programming languages using various suitable programming techniques including, but not limited to, variations of C (e.g., C++, C#, etc.).

A web side 26 includes a web page 28 for direct interaction with other brokers 12 and with end users 14. A broker side 30 includes point-of-sale (POS) software 32 adapted for managing broker operations. The brokers 12 can interface with the central exchange system 6 through broker client applications 34, which can also be programmed with a number of different programming languages using various suitable programming techniques including, but not limited to, Visual Basic (VB). The brokers' POS software can comprise different levels of features and functionalities, such as the SQL server 36 with a full range of features and functionalities, and a MySQL server 38 for a reduced-feature application. The broker-controlled servers 36, 38 can access data in respective local databases 40 whereby the broker subscribers control their perspective data in their own databases 39, which are connected to respective remote computers 8 and can be physically located at the brokers' respective places of business. The brokers' computers 8 are adapted for downloading ticket information from and uploading or "pushing up" ticket information to the central exchange system 6 according to predetermined rules, at least some of which are controlled by the brokers 12, as described in more detail below.

Transactions

Without limitation on the generality of useful applications of the invention, an exemplary set of transactions, which can be managed by the system 2, is described as follows:

a) Buying and selling tickets directly to the central exchange system 6.

b) Posting tickets to the exchange 6 in either real-time (RT) corresponding to the tickets actually possessed (i.e., in inventory) by the broker 12, or in non real-time (NRT) representing orders for tickets to be fulfilled using the system's resources.

c) Adding customers, which can comprise either end-user customers 14 or other brokers 12, to the exchange database 20.

d) Reserving tickets.

e) Buying tickets.

f) Selling tickets.

g) Buying tickets and reselling to customers (single transaction).

h) Obtaining customer information.

i) Unreserving tickets.

j) Verifying ticket existence.

k) Updating exchange application through message server 16.

l) Remote debugging through the SQL 18.

m) Checking status of pending orders.

n) Obtaining remote order listing.

o) Generic exchange, i.e. getting invoice data, purchase order data and/or billing data including markups, without building a customer record.

p) Getting global updates and of events including downloading latest event lists from the central exchange server 6 and pushing up event lists from brokers 12 for comparison with current lists and updating same, if necessary.

Ticket Grouping

The ticket grouping function forms groups of tickets by internally matching certain criteria, such as event, date, time, section, row, face value and price. For example, when the queue record indicates that tickets are to be added to the exchange, the broker's local database 20 is searched for internal matches whereby groups are created. Customers requesting certain blocks of adjacent or contiguous seats at specific events can thus be accommodated. Moreover, the system forms such groups based on price whereby all of the tickets within particular groups have common pricing. Pricing can be considered in connection with face value, customer list price (corresponding to broker selling price) and broker wholesale price. Moreover, certain entities, such as the city of Chicago, impose sales tax on ticket sales, which is calculated by the system 2 and added to the ticket selling price. Moreover, certain states restrict prices for reselling tickets, which restrictions can be accommodated by the system 2 in connection with ticket pricing.

The ticket grouping function can increase system efficiency and transaction speed in connection with posting tickets. In particular, groups of tickets comprise less data than the same tickets handled individually, whereby less data is pushed back and forth and greater speed is realized when the grouping function is utilized for posting tickets.

Priced Events

Priced event transactions involve non real time (NRT) ticket inventory whereby brokers 12 can offer for sale tickets that they don't actually possess. Priced event tickets can be ordered by customers 14 in real-time (RT) transactions. The brokers 12 then procure the necessary presold, priced event tickets by using the resources of the system 2, or by procuring them from their own sources. Real-time (RT) inventories, by contrast, comprise tickets actually possessed by the brokers 12.

Priced event sales occur in real-time when customers place orders for specific numbers of tickets to specific events. The system generally accommodates selecting seating areas in priced events. For example, seats are commonly located by section, row and seat number in many venues, with ticket pricing corresponding to seat locations. Thus, priced event customers can order tickets online with a particular broker 12 or with the central exchange 6. The orders can specify the seating areas. The central database 20 is then searched by the system and the orders are filled as tickets become available. The central exchange 6 provides seating section information for venues. For example, broker affiliates 12 can access graphical displays of seating in particular venues, with seating sections designated alphanumerically or in colors to assist in ticket selection for priced events and real-time purchases. For example, the information in a priced event order can comprise an identification of the event, the desired seating sections (e.g., by letter or color designation), ticket quantity and ticket price.

The priced event function of the present invention facilitates sharing inventory by the broker affiliates 12 to the exchange 6, thus broadening the potential customer base system-wide. However, the broker affiliate 12 relinquishes tickets from its own inventory, thus possibly losing the opportunity for direct sales. The system accommodates the broker affiliates by enabling them to set certain rules for offering and selling their tickets on the exchange. These rules are listed in FIG. 3, and generally provide control over such variables as the web sites on which particular ticket groups are shown, showing ticket groups on the exchange, which brokers' tickets are shown on other brokers' web sites, pricing markups and quantity, event and other variable restrictions.

Other System Components

Figure 4:
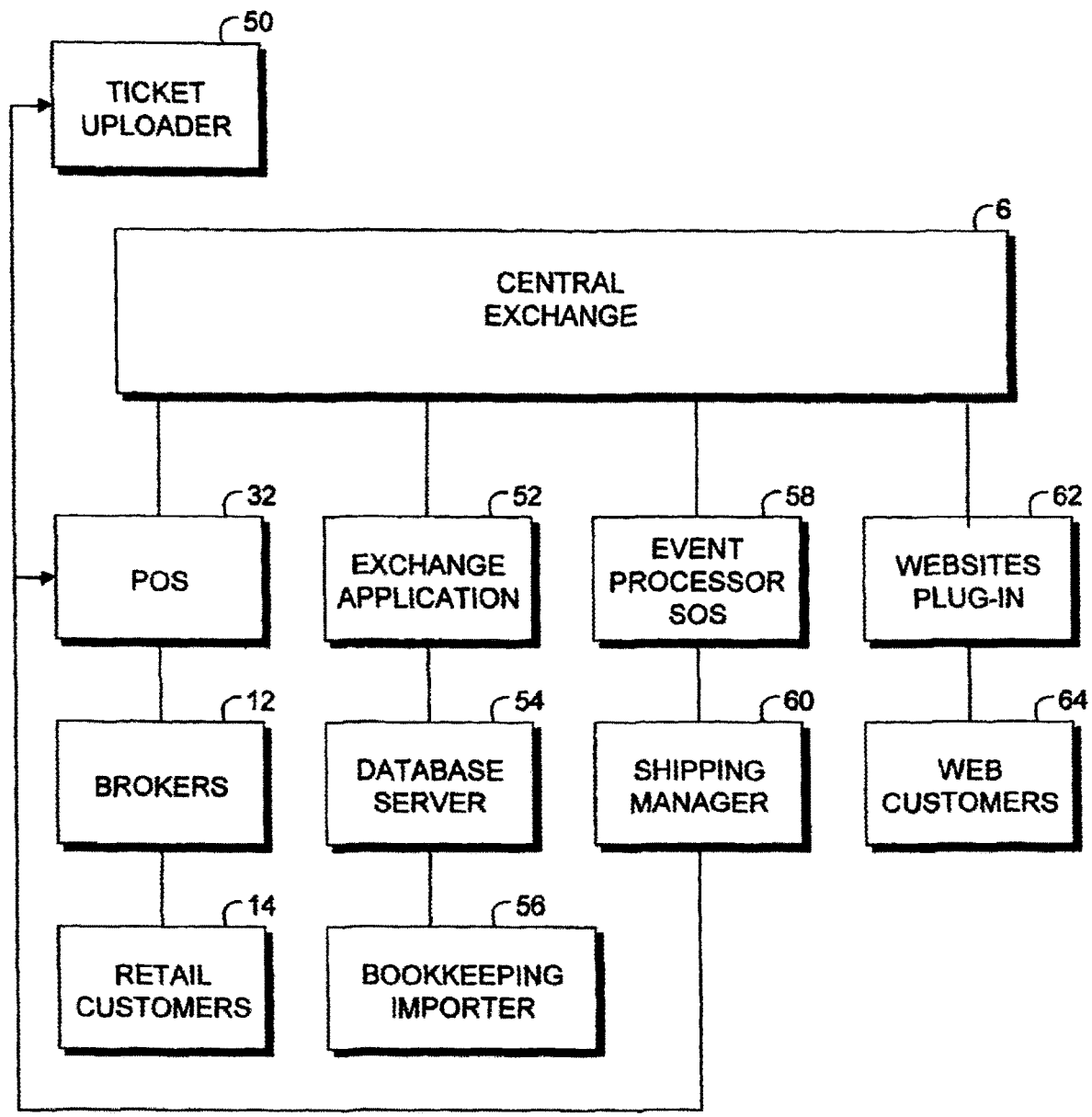
FIG. 4 is a flowchart showing the steps in a typical transaction.

FIG. 4 shows the central exchange 6 in relation to other components of the system 2. The POS 32 is described in more detail below and generally manages transactions for the brokers 12, who interface with customers 14. An exchange application 52 connects to a database server 54, which in turn connects to a bookkeeping importer 56. The system can be adapted to interface with bookkeeping systems, including but not limited to QuickBooks software available from Intuit, Inc. of Mountain View, Calif. 94039. The bookkeeping importer 56 provides for automated record insertion for financial accounting software. Other suitable bookkeeping software can be used with the system 2.

An event processor or special order system (SOS) 58 consists of a web-based bulletin board through which ticket inventories can be uploaded and is described in more detail below. The system further provides general exchange management, web site content management and shipping management. For example, a shipping manager system 60 can interface with various third party shipping service providers, such as overnight mail and courier services. The shipping manager system can ship, track and delete packages; print labels; provide customer information; generate various logs and reports; and print airbills. The central exchange system 6 provides RT and office-to-office order processing services.

A ticket uploader 50 is provided for uploading ticket inventories from other point-of-sale (POS) systems. Therefore, a broker utilizing another POS system can participate in the distributed network 4 of the present invention. The participating broker installs a ticket uploader (TU) program and sets certain variables, such as the timing of automatic uploading at predetermined intervals. Alternatively, ticket inventories can be uploaded manually. The tickets uploaded from these other sources are automatically placed on the network. Therefore, an extensive inventory of tickets placed on the web can be placed on the central exchange 6 for distribution by the brokers 12. Software in the central exchange 6 is adapted for interfacing with other vending and distribution systems, such as online auctions. Thus, brokers can push up their inventories for sale through online, live auctions. The broker can control various aspects of auction participation, such as providing templates and managing content. Moreover, the central exchange 6 takes tickets off the exchange while they are involved in online auctions and returns them to the central exchange inventory after the auctions close, all under the direction of the participating broker 12, which can set rules for such transactions.

Figure 5:
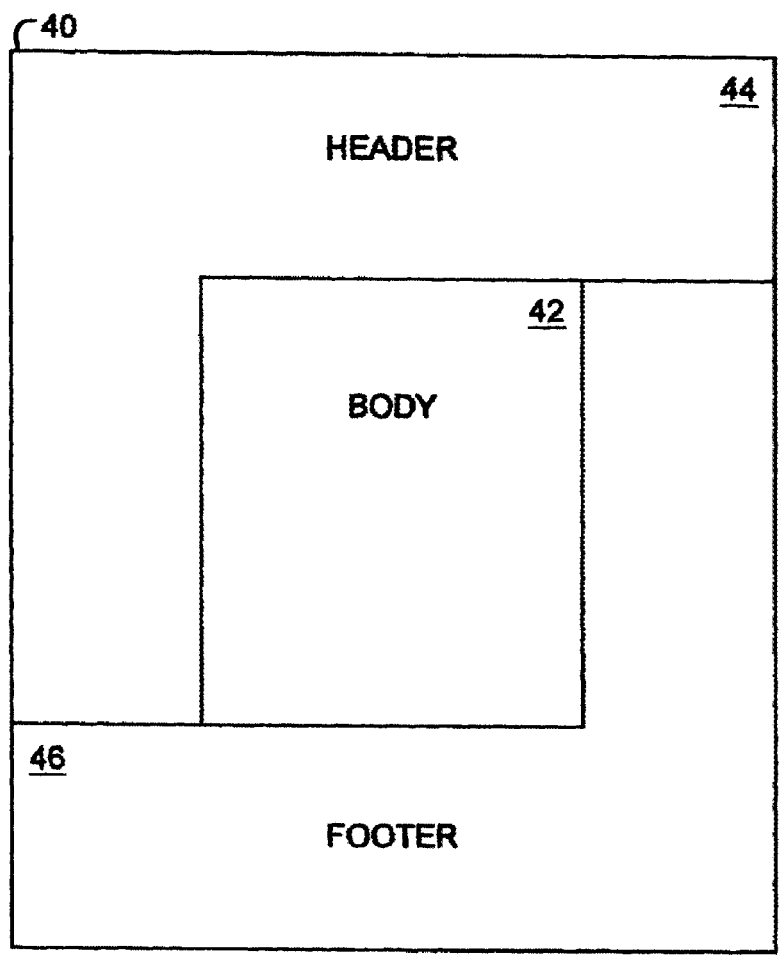
FIG. 5 is a diagram of a broker web page.

A website plug-in component 62 is available for the use of web customers 64 in creating their own websites for e-commerce utilizing the exchange network and the distributed network. A web page template 40 is shown in FIG. 5 and includes a body 42, which can display a default body provided by the system 2, or can be customized by the broker 12. A header 44 and a footer 46 are also provided and are adapted for customizing by a particular broker 12 or web customers 64. As shown in FIG. 5, the header 44 and the footer 46 wrap the body 42 and show on all pages of the web site. Examples of features available for customization by the brokers include plug-in fonts, sizes, colors, etc. Brokers 12 are thus able to graphically individualize their web sites for promoting their respective businesses and for distinguishing them from other web sites. The body 42 typically includes a search page, search results, ASP events page and category lists. The HTML information is stored in the system database.

Special Order System (POS)

FIGS. 6-9 show special order system (SOS) components and functionalities. FIG. 6 shows the screen displays for searching SOS events and providing ticket information, including "fake" tickets as described above. FIG. 7 is an SOS screen display showing possible ticket splits based on rules governing sales from packages of tickets. FIG. 8 shows broker settings, including markups. FIG. 9 shows web settings.

Point-of-Sale (POS)

Figure 11:
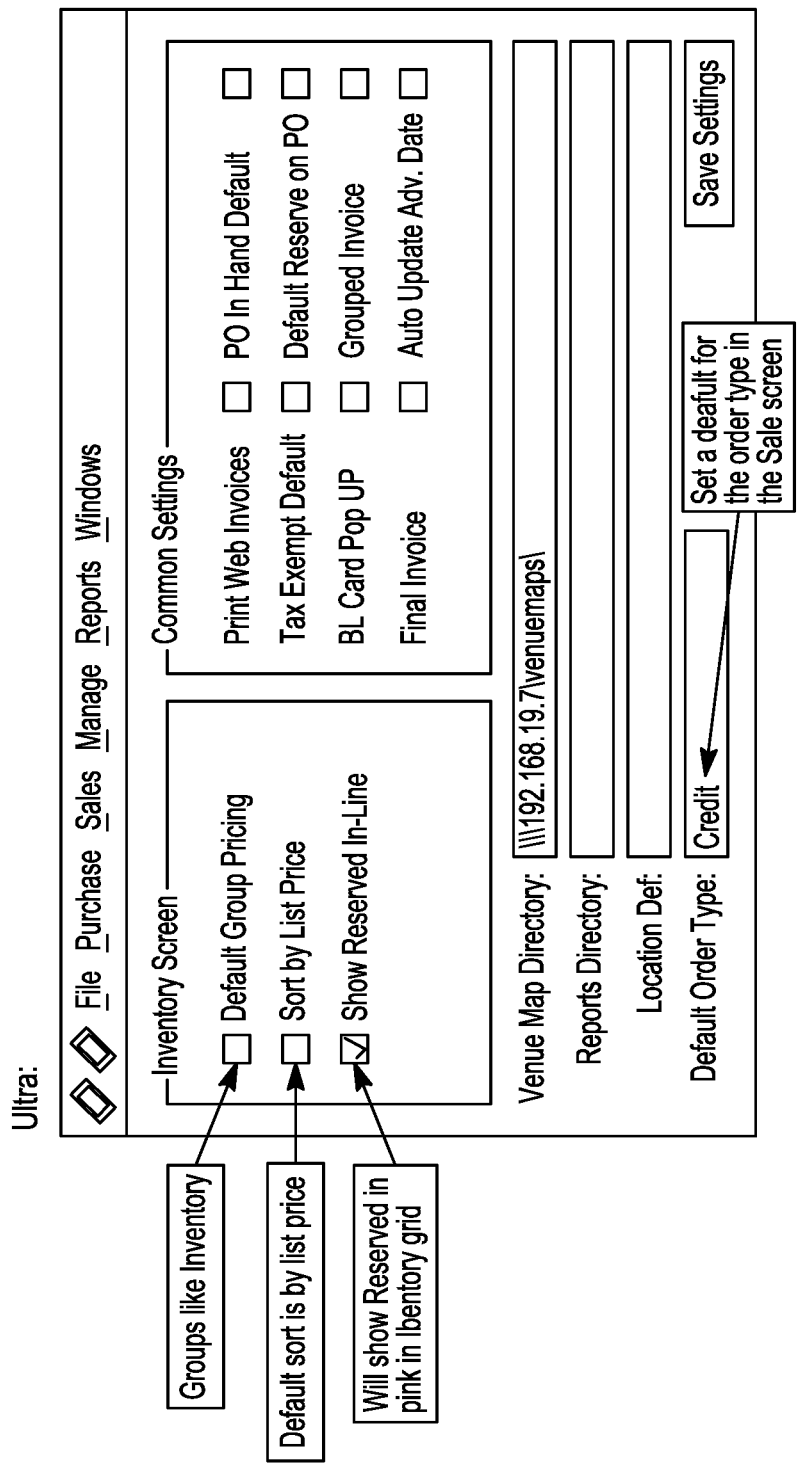
FIG. 11 illustrates an example screen displays for a version of the software from the point-of-sale (POS) system.

FIG. 10 is a flowchart showing a typical transaction handled by the POS system associated with a broker 12. The following description of the point-of-sale (POS) system and methodology applies to the management of transactions by a broker affiliate 12, FIG. 11 is a screen display of settings for a full-featured version of the software, including transactional defaults. FIG. 12 shows the settings screen for a reduced-feature version of the software, which implements the system and methodology of the present invention. FIG. 13A and FIG. 13B show the screens for entering a new purchase order (PO). FIG. 14 shows the screen for searching POs. FIG. 15A and FIG. 15B show the screen for creating mass PO tickets. FIG. 16 shows the screen for searching for mass POs, advanced quotes or cancelled POs. FIG. 17 shows the screen for advanced quotes. FIG. 18 shows the screen for the PO queue. FIG. 19A and FIG. 19B show the sales screen for pending preorders, utilizing the value event pricing function described above. FIG. 20 shows the screen for order completion. FIG. 21 shows the inventory screen. The screen that is presented by selecting the "Set/Reserve" option is shown in FIG. 22.

Within the inventory/exchange grid different colors and icons can be used to provide certain information about the applicable tickets. For example, italics can indicate consignment inventory. Pink can identify reserved inventory. Green designates a block or group of tickets with section, row and seat information. Cost highlighted with yellow indicates that the PO has not yet been completed. NRT brokers are highlighted in yellow, and RT brokers are highlighted in green. The broker's name in pink indicates the broker's own tickets. "In" with a checkmark indicates that the tickets were added as "In Hand". "W" with a mouse icon indicates that the tickets are shared to the web. "X" with a red ticket icon indicates that the tickets are shared to the exchange. "Loc" indicates the office locations from which the tickets were added.

Figure 24:
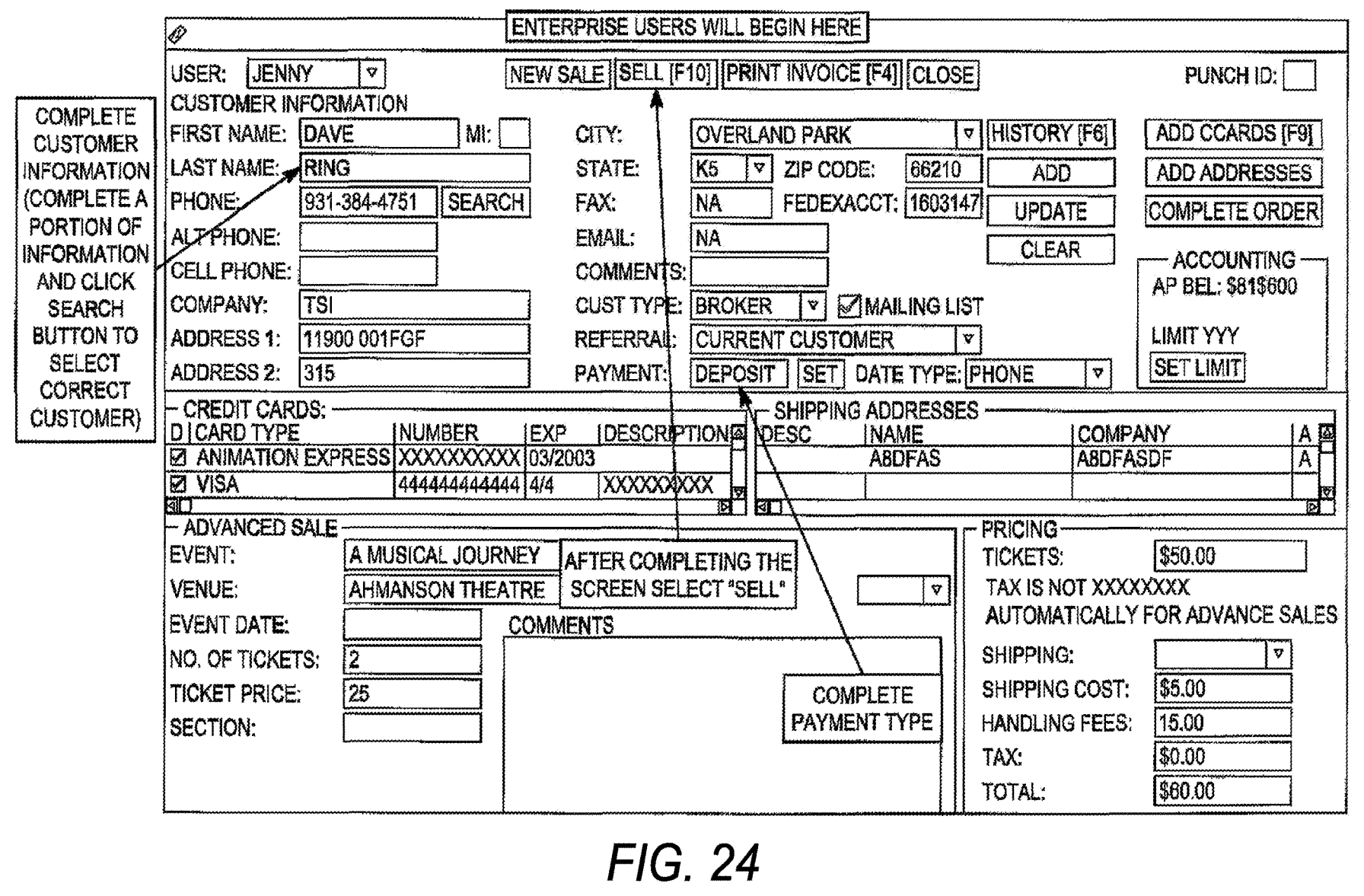
Figure 26:
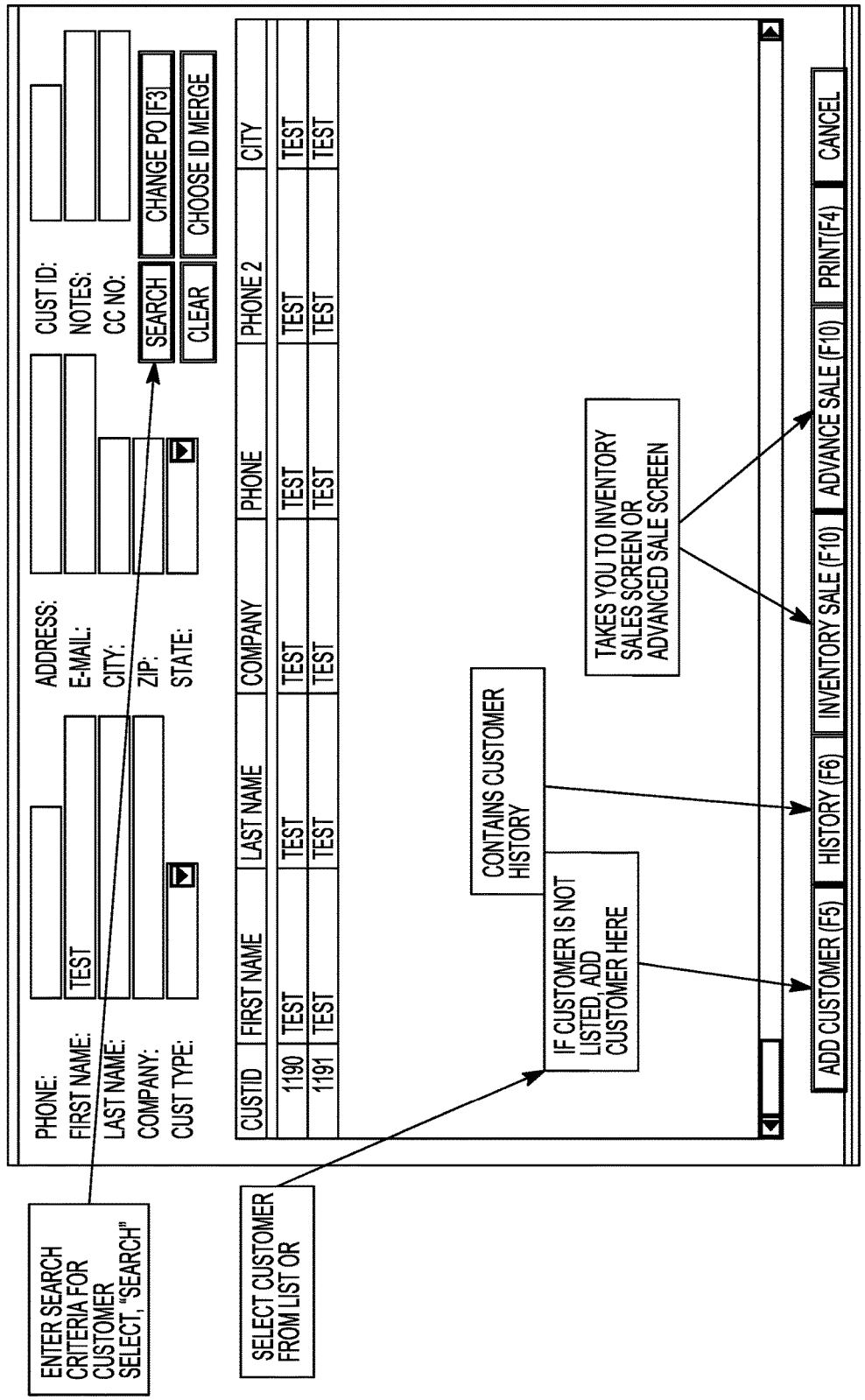
FIG. 26 illustrates an example screen display for adding new customers, searching for customer information, modifying an existing sale or PO, or creating a new sale from the point of sale (POS) system.
Figure 29:
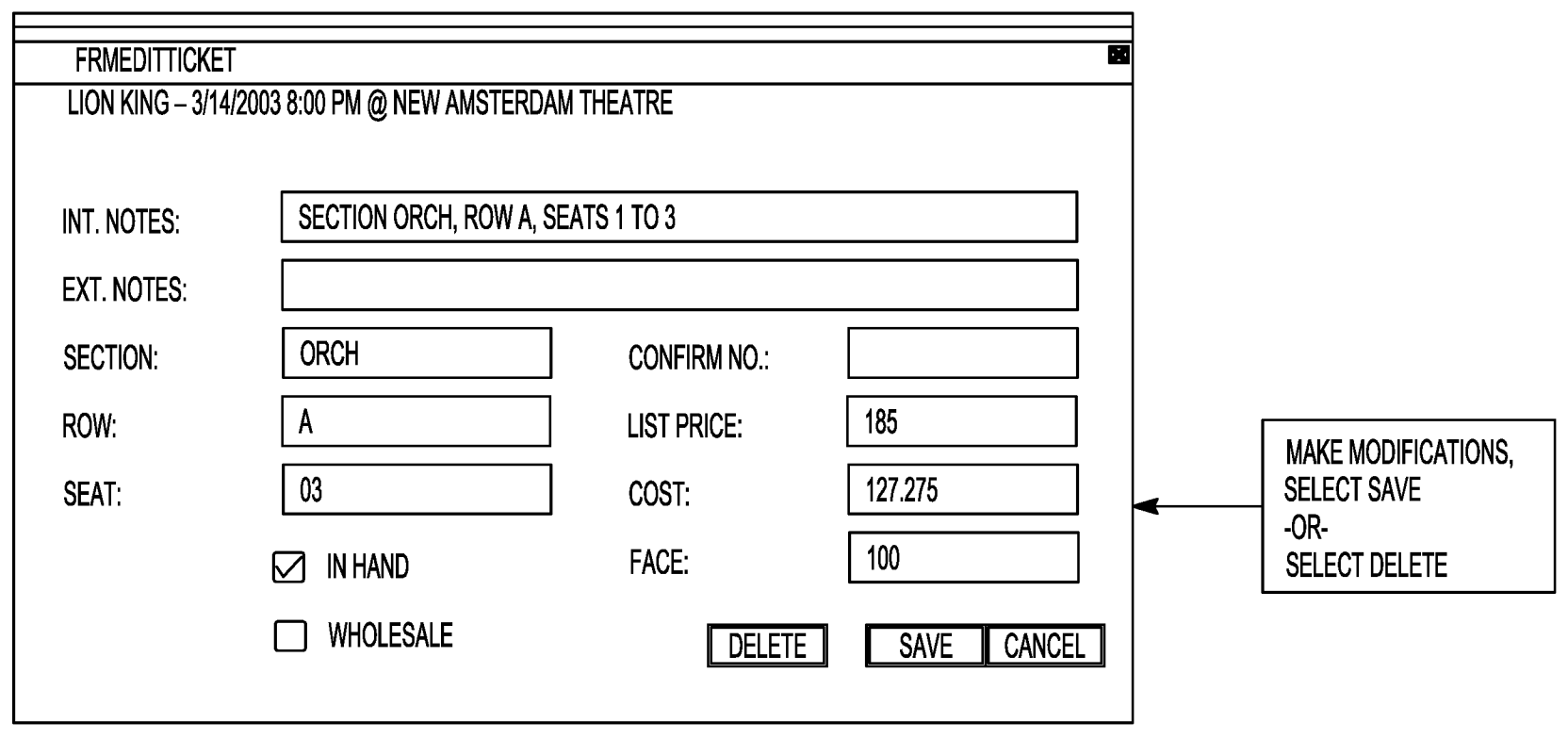

FIG. 23 shows a pre orders screen, and FIG. 24 shows the comparable screen from the reduced-feature software version. FIG. 25 shows the screens that are applicable to types of deposit payments. FIG. 26 shows the screen for adding new customers, searching for customer information, modifying an existing sale or PO or creating a new sale. FIG. 27 shows the screen for retrieving exchange broker information. FIGS. 28 and 29 are inventory management screens.

Figure 30:
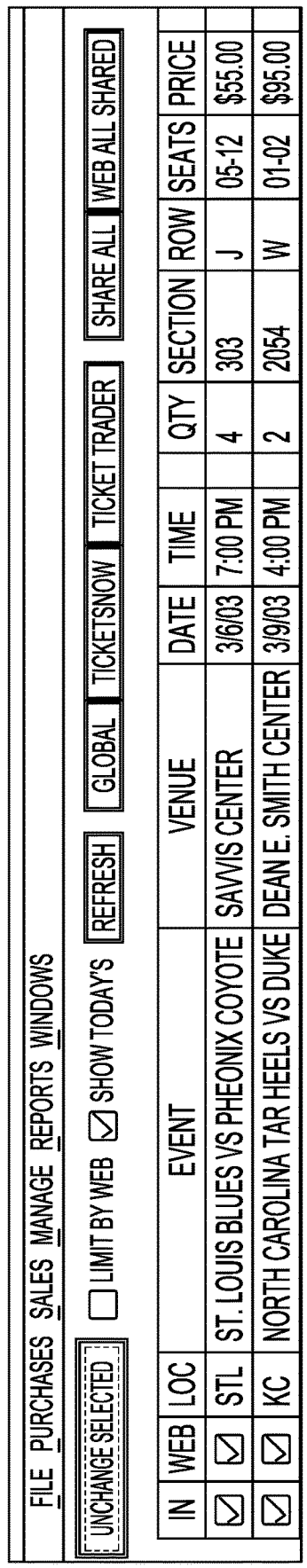
FIG. 30 illustrates an example shared inventory screen display from a point of sale (POS) system.
Figure 32:
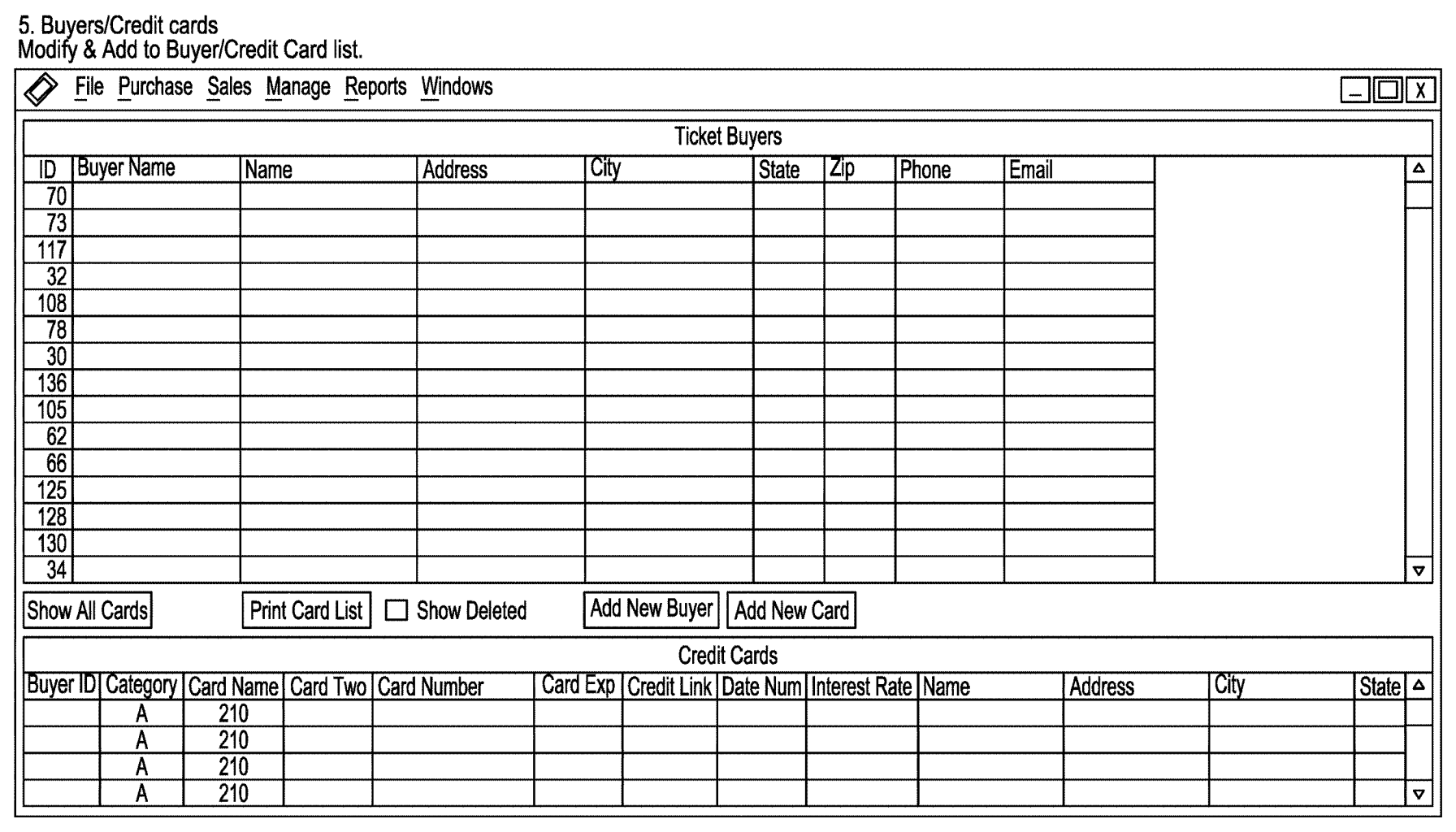
Figure 34:
FIG. 34 illustrates an example screen display for adding, deleting and modifying options for customer types, office locations, shipping types and the discounts to the database from a point of sale (POS) system.
Figure 35:
FIG. 35 illustrates an example screen display for adding and deleting customer referrals from a point of sale (POS) system.

The system accommodates sharing tickets with other exchange systems through the screen shown in FIG. 30. Pre order pricing with price and quantity settings is shown in FIG. 31. FIG. 32 shows the screen for categorizing ticket inventory. FIG. 33 shows the screen for adding headliners for events to the brokers' databases. FIG. 34 shows the screen for adding, deleting and modifying options for customer types, office locations, shipping types and the discounts to the database. FIG. 35 is a referral list screen for adding and deleting customer referrals. FIG. 36 is a shopping cart screen. The broker-to-broker (B2B) screen FIG. 37 permits regulating payment types and reserved times individually for all of the brokers 12 who use the exchange.

Figure 44:
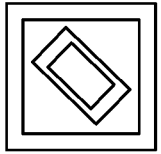
FIG. 44 illustrates an example screen display for reporting expired inventory from a point of sale (POS) system.
Figure 46:
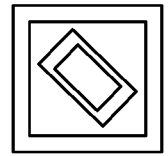
FIG. 46 illustrates an example screen display for reporting sold tickets from a point of sale (POS) system.
Figure 48:
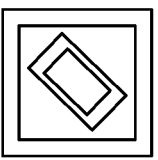
FIG. 48 illustrates an example screen display for a fax form from a point of sale (POS) system.
Figure 58:
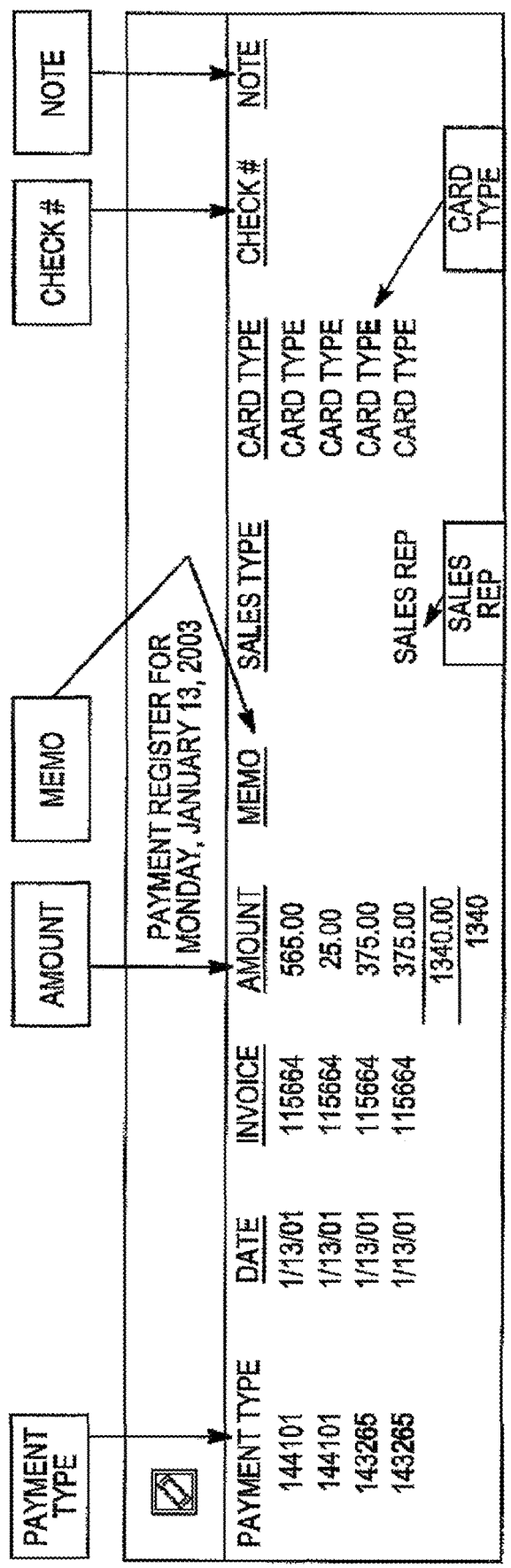
FIG. 58 illustrates an example screen display for reporting sales daily payments and deposits from a point of sale (POS) system.
Figure 59:
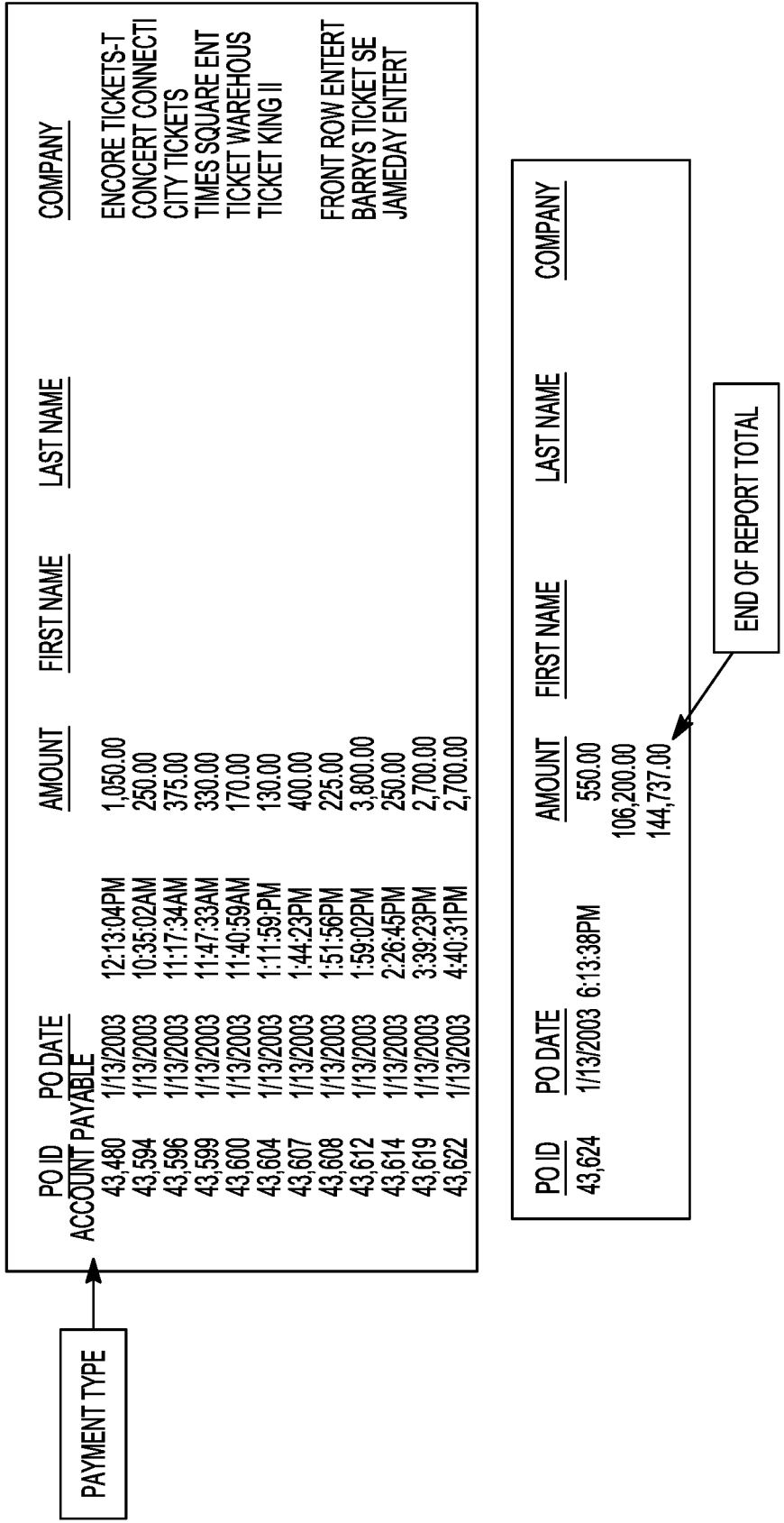
FIG. 59 illustrates an example screen display for reporting daily purchases by payment type from a point of sale (POS) system.
Figure 60:
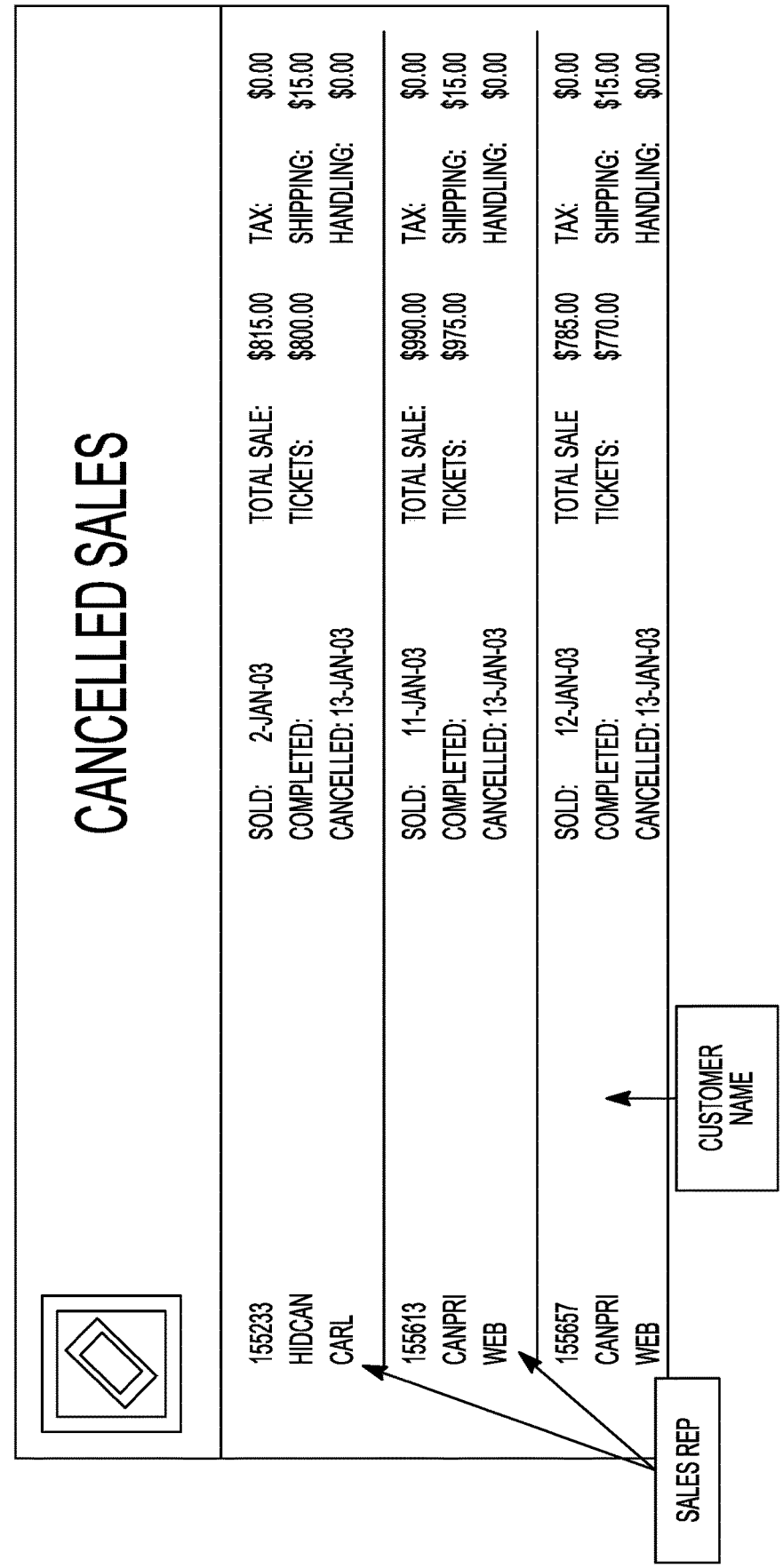
FIG. 60 illustrates an example screen display for reporting canceled orders from a point of sale (POS) system.
Figure 63:
FIG. 63 illustrates an example screen display for searching events from a point of sale (POS) system.
Figure 64:
FIG. 64 illustrates another example screen display for searching events from a point of sale (POS) system.
Figures 75, 76:
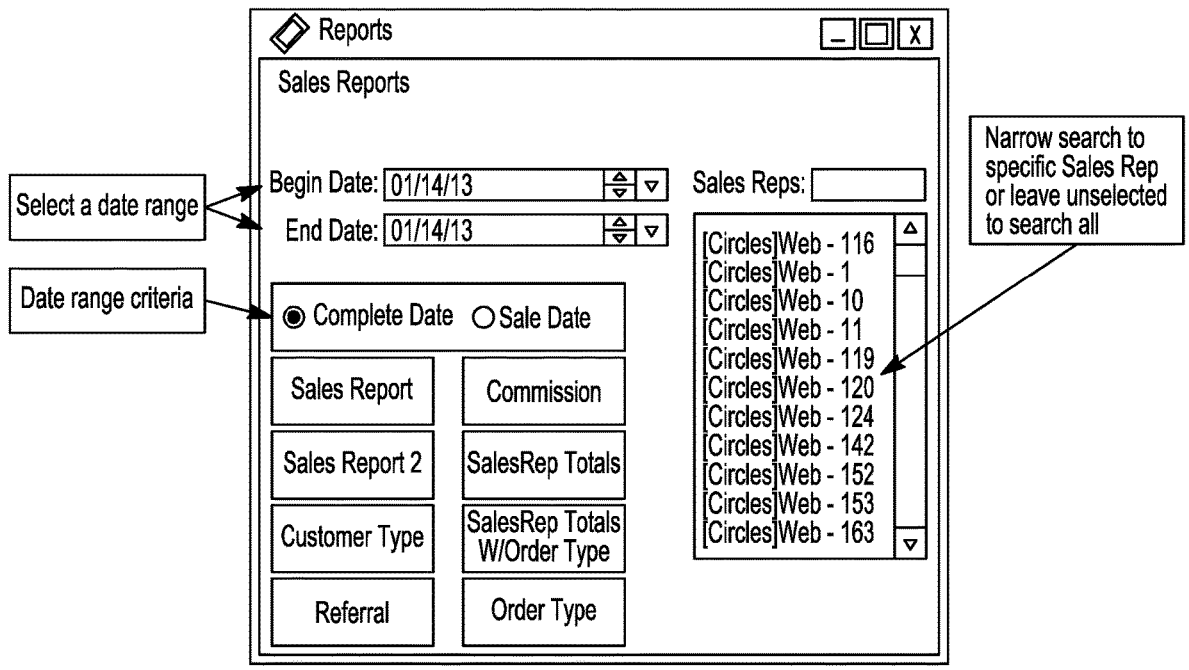
FIG. 75 illustrates an example screen display for reporting a custom web sales representatives and dates from a point of sale (POS) system.
FIG. 76 illustrates an example screen display for reporting sales by sales representative from a point of sale (POS) system.

FIG. 38A and FIG. 38B illustrate a report mailing list screen. FIG. 39 is a screen for event reporting and FIG. 40 shows current events. FIG. 41 is a sold tickets search utility and FIG. 42 shows a sold tickets report. FIG. 43 shows a reserve ticket list. FIG. 44 shows an expired inventory report, which is automatically generated. FIG. 45 shows an automatically generated report of tickets with no purchase orders. FIG. 46 shows an automatically generated sold tickets report. FIG. 47 shows a fax list search report. FIG. 48 shows a sample fax form. FIG. 49 shows a fax list for a number of days and FIG. 50 shows the automatically generated report. FIGS. 51-54 show shipping, invoice, PO and web sales register screens respectively. FIG. 55 shows exchange transactions. FIG. 56 shows sales by event and FIG. 57 shows sales by payment type. FIG. 58 shows daily payments and deposits. FIG. 59 shows daily purchases by payment type. FIG. 60 shows canceled orders. FIGS. 61 and 62 show tax information pertinent to the city of Chicago. FIG. 63 shows purchases for an event. FIG. 64 is an event picker, FIG. 65 shows purchase orders by event. FIG. 66 shows an example of a screen displaying event sales. FIG. 67 shows an event sales report. FIGS. 68-71 show weekly sales report information. FIG. 72 shows an event profit/situation screen. FIG. 73 shows selected events. FIG. 74 shows a daily total report. FIG. 75 shows a custom web sales representatives and dates report. FIG. 76 shows a sales report, including a breakdown by representative.

It is to be understood that while certain embodiments and/or aspects of the invention have been shown and described, the invention is not limited thereto and encompasses various other embodiments and aspects.

We claim:

1. A system comprising:
   a memory device for storing instructions; and
   one or more processors, which, when executing the instructions, causes the system to perform operations comprising:
   receiving, at the system, a first rule associated with a first digital data stored by a first remote system of a plurality of remote systems configured to communicate with the system, the first digital data representing a group of tickets in an individual ticket inventory stored on the first remote system, wherein each of the plurality of remote systems is associated with a different ticket broker;
   based upon the first rule, obtaining an upload of the first digital data from the first remote system into a general database of the system that includes other digital data from other of the plurality of remote systems, the other digital data representing tickets of other ticket inventories stored on the plurality of remote systems;
   maintaining, at the system, a second set of rules for the first digital data, the second set of rules defining use of the first digital data, the use including use by one or more websites and/or other of the plurality of remote systems; and
   managing, by the system, use of the first digital data based upon the second set of rules, wherein:
   managing the use includes providing the first digital data for presentation by one or more websites in accordance with the second set of rules, and
   the first rule and the second set of rules comprise digital operations for downloading or uploading ticket information to and from an online ticket exchange including one or more ticket broker website.

2. The system of claim 1, wherein the operations further comprise:
   maintaining software in the system adapted for interfacing with other vending and distribution systems, including online auctions;
   receiving, from broker client applications executing on broker systems associated with the plurality of remote systems, an updated ticket information and the first rule and the second set of rules, each of the broker systems associated with a broker affiliate of a plurality of broker affiliates;
   updating a shared ticket inventory with the updated ticket information;
   posting tickets available from the shared ticket inventory on sites associated with the plurality of broker affiliates in accordance with each second set of rules defined by a respective broker affiliate in the plurality of broker affiliates, the posting including posting the tickets utilizing a grouping function that forms groups of tickets based on multiple criteria;

removing auctioned tickets from the shared ticket inventory while the auctioned tickets are involved in online auctions interfacing with the software, and returning the auctioned tickets to the shared ticket inventory after the online auctions close;

receiving order information for orders placed on the sites for priced event tickets, the order information including at least some non-real time tickets;

searching the shared ticket inventory for availability of the at least some non-real time tickets; and fulfilling the orders placed as the at least some non-real time tickets become available on the system.

3. The system of claim 2, wherein the orders placed for the priced event tickets represent ticket orders for specific numbers of tickets to specific events.

4. The system of claim 2, wherein the posting the tickets utilizing the grouping function comprises transmitting less data than posting the tickets in the shared ticket inventory individually without the group function.

5. The system of claim 2, wherein the certain criteria includes at least one of an event, date, time, section, row, or face value or price.

6. The system of claim 2, wherein the grouping function forms the groups of tickets based on price such that all the tickets within particular groups have common pricing.

7. The system of claim 2, wherein the updated ticket information includes the ticket information and the first rule and the second set of rules for new tickets to be uploaded to the system for distribution and sales in accordance with the second set of rules, modifications to the ticket information and the first rule and the second set of rules stored in the shared ticket inventory, or a combination thereof.

8. The system of claim 2, wherein the second set of rules includes site posting rules defining sites for selling the tickets from the individual ticket inventory associated with a broker affiliate, at least some of the sites representing sites associated with other broker affiliates.

9. The system of claim 2, wherein the second set of rules includes pricing rules for defining pricing markups and other fees for the tickets.

10. A non-transitory machine-readable storage medium including instructions that, when executed by a system, cause the system to perform operations comprising, at least:

receiving a first rule associated with a first digital data stored by a first remote system of a plurality of remote systems configured to communicate with the system, the first digital data representing a group of tickets in an individual ticket inventory stored on the first remote system, wherein each of the plurality of remote systems is associated with a different ticket broker;

based upon the first rule, obtaining an upload of the first digital data from the first remote system into a general database of the system that includes other digital data from other of the plurality of remote systems, the other digital data representing tickets of other ticket inventories stored on the plurality of remote systems;

maintaining a second set of rules for the first digital data, the second set of rules defining use of the first digital data, the use including use by one or more websites and/or other of the plurality of remote systems; and managing use of the first digital data based upon the second set of rules, wherein:

managing the use includes providing the first digital data for presentation by one or more websites in accordance with the second set of rules, and the first rule and the second set of rules comprise digital operations for downloading or uploading ticket information to and from an online ticket exchange including one or more ticket broker website.

11. The non-transitory machine-readable storage medium of claim 10, wherein the operations further comprise:

maintaining software in the system adapted for interfacing with other vending and distribution systems, including online auctions;

receiving, from broker client applications executing on broker systems associated with the plurality of remote systems, updated ticket information and the first rule and the second set of rules associated with each respective remote system, each of the broker systems associated with a broker affiliate of a plurality of broker affiliates;

updating a shared ticket inventory with the updated ticket information;

posting tickets available from the shared ticket inventory on sites associated with the plurality of broker affiliates in accordance with each second set of rules defined by a respective broker affiliate in the plurality of broker affiliates, the posting including posting the tickets utilizing a grouping function that forms groups of tickets based on multiple criteria;

removing auctioned tickets from the posted shared ticket inventory while the auctioned tickets are involved in online auctions interfacing with the software in the system, and returning the auctioned tickets to the posted shared ticket inventory after the online auctions close;

receiving order information for orders placed on the sites for priced event tickets, the order information including at least some non-real time tickets;

searching the shared ticket inventory for availability of the at least some non-real time tickets; and fulfilling the orders placed as the at least some non-real time tickets become available on the system.

12. The non-transitory machine-readable storage medium of claim 11, wherein the posting the tickets utilizing the grouping function comprises transmitting less data than posting the tickets in the shared ticket inventory individually without the group function.

13. The non-transitory machine-readable storage medium of claim 11, wherein the criteria includes at least one of an event, date, time, section, row, face value, or price.

14. The non-transitory machine-readable storage medium of claim 11, wherein the grouping function forms the groups of tickets based on price such that all the tickets within particular groups have common pricing.

15. A method comprising:

receiving a first rule associated with a first digital data stored by a first remote system of a plurality of remote systems configured to communicate with a system, the first digital data representing a group of tickets in an individual ticket inventory stored on the first remote system, wherein each of the plurality of remote systems is associated with a different ticket broker;

based upon the first rule, obtaining an upload of the first digital data from the first remote system into a general database of the system that includes other digital data from other of the plurality of remote systems, the other digital data representing tickets of other ticket inventories stored on the plurality of remote systems;

maintaining a second set of rules for the first digital data, the second set of rules defining use of the first digital data, the use including use by one or more websites and/or other of the plurality of remote systems; and managing use of the first digital data based upon the second set of rules, wherein:

managing the use includes providing the first digital data for presentation by one or more websites in accordance with the second set of rules, and the first rule and the second set of rules comprise digital operations for downloading or uploading ticket information to and from an online ticket exchange including one or more ticket broker website.

16. The method of claim 15, further comprising:

maintaining software adapted for interfacing with other vending and distribution systems, including online auctions;

receiving, from broker client applications executing on broker systems associated with the plurality of remote systems, updated ticket information and the first rule and the second set of rules, each of the broker systems associated with a broker affiliate of a plurality of broker affiliates;

updating a shared ticket inventory with the updated ticket information;

posting tickets available from the shared ticket inventory on sites associated with the plurality of broker affiliates in accordance with each second set of rules defined by a respective broker affiliate in the plurality of broker affiliates, the posting including posting the tickets utilizing a grouping function that forms groups of tickets based on multiple criteria;

removing auctioned tickets from the posted shared ticket inventory while the auctioned tickets are involved in online auctions interfacing with the software, and returning the auctioned tickets to the shared ticket inventory after the online auctions close;

receiving order information for orders placed on the sites for priced event tickets, the order information including at least some non-real time tickets;

searching the shared ticket inventory for availability of the at least some non-real time tickets; and fulfilling the orders placed as the at least some non-real time tickets become available.

17. The method of claim 16, wherein the posting the tickets utilizing the grouping function comprises transmitting less data than posting the tickets in the shared ticket inventory individually without the group function.

18. The method of claim 16, wherein the certain criteria includes at least one of an event, date, time, section, row, face value, or price.

19. The method of claim 16, wherein the grouping function forms the groups of tickets based on price such that all the tickets within particular groups have common pricing.

* * * * *

UNITED STATES PATENT AND TRADEMARK OFFICE
CERTIFICATE OF CORRECTION

PATENT NO. : 11,222,371 B2
APPLICATION NO. : 14/062322
DATED : January 11, 2022
INVENTOR(S) : Jacob M. Dubin et al.

It is certified that error appears in the above-identified patent and that said Letters Patent is hereby corrected as shown below:

In the Claims

At Column 12, Line 29 for Claim 11: Please delete "posted" after "...removing auctioned tickets from the..."

At Column 12, Line 33 for Claim 11: Please delete "posted" before "...shared ticket inventory after the online auctions close;"

At Column 14, Line 22 in Claim 18: Please delete "certain" after "The method of claim 16, wherein the..."

Signed and Sealed this
Seventh Day of March, 2023

*Katherine Kelly Vidal*

Katherine Kelly Vidal
*Director of the United States Patent and Trademark Office*